(12) United States Patent
Gupta et al.

(10) Patent No.: US 10,922,740 B2
(45) Date of Patent: *Feb. 16, 2021

(54) GRAPH PROCESSING SERVICE COMPONENT IN A CATALOG SERVICE PLATFORM

(71) Applicant: Amazon Technologies, Inc., Seattle, WA (US)

(72) Inventors: Divij Gupta, Seattle, WA (US); Quan Binh To, Redmond, WA (US); Julien Jacques Ellie, Issaquah, WA (US); Benjamin David Newman, Seattle, WA (US); Zachary Thomas Crowell, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 194 days.

This patent is subject to a terminal disclaimer.

(21) Appl. No.: 16/148,956

(22) Filed: Oct. 1, 2018

(65) Prior Publication Data

US 2019/0108575 A1  Apr. 11, 2019

Related U.S. Application Data

(63) Continuation of application No. 14/575,383, filed on Dec. 18, 2014, now Pat. No. 10,089,676.

(Continued)

(51) Int. Cl.
*G06Q 30/00* (2012.01)
*G06Q 30/06* (2012.01)

(52) U.S. Cl.
CPC .............................. *G06Q 30/0633* (2013.01)

(58) Field of Classification Search
CPC .................................................. G06Q 30/06–08
(Continued)

(56) References Cited

U.S. PATENT DOCUMENTS 10,089,676 B1 * 10/2018 Gupta ................ G06Q 30/0633
2011/0138047 A1    6/2011 Brown et al.
(Continued)

OTHER PUBLICATIONS

U.S. Appl. No. 14/538,718, filed Nov. 11, 2014, Quan Binh To.
(Continued)

*Primary Examiner* — Ethan D Civan
(74) *Attorney, Agent, or Firm* — Robert C. Kowert; Kowert, Hood, Munyon, Rankin & Goetzel, P.C.

(57) ABSTRACT

A service provider system may implement an enterprise catalog service that manages software products and portfolios of software products on behalf of service provider customer organizations. A graph processing service of the enterprise catalog service may create a graph representation of the enterprise catalog service data, including principals, product listings, portfolios, and constraints (and the relationships between them) that may be used to manage access control, launch contexts, and searches within the enterprise catalog service. A primary (key-value) store may maintain an adjacency list and a secondary index of de-normalized edges. A secondary (document) store may maintain the de-normalized edges. In response to various queries directed to the graph processing service, the service may query the adjacency list or the secondary index. For example, one query may return a list of products that an end user can access, and another may return a count of products within a portfolio.

20 Claims, 30 Drawing Sheets

Related U.S. Application Data

(60) Provisional application No. 62/078,377, filed on Nov. 11, 2014.

(58) Field of Classification Search
USPC .............................................. 705/26.1–27.2
See application file for complete search history.

(56) References Cited

U.S. PATENT DOCUMENTS

| | | |
|---|---|---|
| 2011/0320605 A1 | 12/2011 | Kramer et al. |
| 2012/0042256 A1 | 2/2012 | Jamjoom et al. |
| 2012/0089485 A1 | 4/2012 | Williams et al. |
| 2012/0290678 A1 | 11/2012 | Dawson et al. |
| 2013/0218946 A1 | 8/2013 | Colbert et al. |
| 2014/0040121 A1* | 2/2014 | Robb .................... G06Q 30/08 705/39 |
| 2014/0095721 A1 | 4/2014 | Arwe et al. |
| 2014/0201017 A1 | 7/2014 | Catalano et al. |
| 2014/0280961 A1 | 9/2014 | Martinez et al. |
| 2014/0280964 A1 | 9/2014 | Farooq et al. |
| 2014/0282536 A1 | 9/2014 | Dave et al. |
| 2014/0324882 A1* | 10/2014 | Giovanni ............ G06F 16/2246 707/742 |
| 2014/0344006 A1 | 11/2014 | Biazetti et al. |
| 2014/0365662 A1 | 12/2014 | Dave et al. |
| 2014/0372761 A1 | 12/2014 | Cherukuri et al. |
| 2016/0063590 A1* | 3/2016 | Subramanya ....... G06F 16/9024 705/26.61 |

OTHER PUBLICATIONS

U.S. Appl. No. 14/538,719, filed Nov. 11, 2014, Quan Binh To.
U.S. Appl. No. 14/538,714, filed Nov. 11, 2014, Frederik Christophe Delacourt.

* cited by examiner

600

⇦ ⇧ ✕ ⇩  service provider console / catalog service / create portfolio

| ingest products | assign products to users | create portfolio | reports | notifications

Create New Portfolio

Portfolio Name: *Bob's team*

Portfolio Owner: *Central IT Admin*

Description: *software for project XYZ*

Tags:

Catalog type:  ○ Desktop applications  ● Server products

Set Portfolio Policies

Default auto-update policy
● Apply minor revisions  ○ Notify only
○ Apply major revisions  ● Notify only Default installation policy
○ Required
● Optional Display policies
○ Show all discoverable products
● Show prices

[Create and Continue]

[Cancel]

*FIG. 6A*

FIG. 6B service provider console / catalog service / add products to portfolio desktop applications | server products | subscriptions | reports

[Search products] | notifications (3)

Add Products to Portfolio

Portfolio Name: Bob's team

Categories:
- ☑ Web Publishing
- ☐ Computation
- ☐ Collaboration
- ☐ SW Development Pricing:
- ☑ Monthly
- ☐ Manage my License
- ☐ Free Operating System:
- ☐ OS A version 2.0
- ☐ OS A version 3.2
- ☑ OS A version 4.1
- ☐ OS B
- ☐ OS C ☐ Line of Business Applications

| Product | Price | Last updated |
|---|---|---|
| website design package A v3 by vendor ABC | $2.94/hour | 08-14-2014 |
| website design package D by vendor LMN | $3.27/hour | 01-01-2014 |
| blog publishing package Q by vendor JKL | $1.93/hour | 09-21-2013 |
| newsletter design package R by vendor PQR | $0.98/hour | 11-21-2012 |
| ... | | |

Back to Search Results | Select & Continue

600

← → × ⇧  service provider console / catalog service / add constraints to portfolio

[environmental]  [input parameters]  [quotas]  [billing]

[notifications (3)]

Add Constraints to Portfolio

Portfolio Name  [Bob's team]

🔍 Search parameters

Products:
- ☑ website design package A
- ☐ database package C
- ☐ collaboration utility QRS
- ☐ newsletter design package Users:
- ☑ All
- ☐ Bob
- ☐ Sue
- ☐ Mary
- ☐ Tim
- ☐ Fred

| parameter | value | max value |
|---|---|---|
| front end instance type | B-med | C-xlarge |
| middle tier instance type | HTML | N/A |
| data type | XML | N/A |
| data type | | |
| number of users to support | | 100,000 👆 |
| ... | | |

Back to Constraint types        Select & Continue

*FIG. 6C*

900 service provider console / constraints / create constraint

Create New Constraint

Constraint Name: Dev. team X constraint

Description: rules for the software products used by Development team X.

Create and Continue

Cancel

Back to Constraints (main)

FIG. 9A

*Add Rule: Dev. team X constraint*

○ Restrict users and permissions

● Restrict launch parameters

*Rule details*

Rule Name: [restrict instance type]

Rule: this restriction applies:

☑ always apply this restriction
☐ for a specific user
☐ for a specific user group
☐ for a specific IAM role
☐ when product input parameter has a specific value Description: [front end instance type is B-med]

service provider console / constraints / add rule / launch constraints

[environmental] [user input parameters] [quotas] [billing]

[Add Rule]

[Cancel]

Back to Constraints (main)    Next rule

FIG. 9C

900 manage constraints  ✕  ⇧  service provider console / catalog service / products / manage constraints users & permissions 🔍 launch constraints
Search constraints

Edit Product Constraints

Products:
☑ website design package A
☐ database package C
☐ collaboration utility QRS
☐ newsletter design package

| | constraint | value | max value |
|---|---|---|---|
| ☑ | Dev. team X constraint | | |
| ☐ | Region 7 constraint | | |
| ☐ | front end instance type | | C-xlarge |
| ☐ | middle tier instance type | HTML | N/A |
| ☐ | data type | | |
| ☐ | number of users to support | | 100,000 |

Back to Products (main)    Select & Continue 👆

FIG. 11A a graph processing service of an enterprise catalog service platform maintains, on behalf of a customer, a graph structure comprising data representing principals (e.g., users), listings (e.g., products) and portfolios (e.g., containers), as vertices, and constraints that apply to the edges between those vertices
1210 the graph processing service receives a query, directed to the data in the graph structure, for information usable to control access to a listing, to determine a launch context for a listing, or to return information about listings or portfolios
1220 the graph processing service traverses an adjacency list within the graph structure and/or, in some cases, queries a corresponding search index within the graph structure, dependent on the query type
1230 the graph processing service returns the requested information to the component of the enterprise catalog service platform or product fulfillment platform from which the query was received
1240

FIG. 12

GRAPH PROCESSING SERVICE COMPONENT IN A CATALOG SERVICE PLATFORM

This application is a continuation of U.S. patent application Ser. No. 14/575,383, filed Dec. 18, 2014, now U.S. Pat. No. 10,089,676, which claims benefit of priority to U.S. Provisional Application Ser. No. 62/078,377, entitled "GRAPH PROCESSING SERVICE COMPONENT IN A CATALOG SERVICE PLATFORM", which was filed Nov. 11, 2014, and which are incorporated herein by reference in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

Many large companies are attempting to move data center resources to cloud computing environments. These companies may use large amounts of desktop computing software that must be procured, kept up-to-date, and distributed across many desktop computers in multiple locations. For a large enterprise, it can be difficult to keep all of the applications they may wish to use up to date using the traditional approach of physically installing applications on each machine. For example, deploying and managing applications at scale is difficult, complex and requires expensive on premise infrastructure. In addition, updates and patches are complex to deploy without affecting user productivity, and legacy applications typically only run on older operation system versions. It can also be difficult for a large enterprise to deploy applications on-demand and their own line-of-business applications. In many cases, there is a lack of transparency into cost controls, spending and usage related to desktop applications and software services. Therefore, large enterprises can miss opportunities for license synergies across the organization.

For example, within a large enterprise, individual business units often procure their own software and services. When this is not done in a controlled fashion, the resulting sprawl of unapproved products creates compliance risks that administrators have to address. Different organizations have taken a variety of approaches to increase standardization and enforce compliance. Some attempted to address these issues by setting policies centrally, educating users, and relying on them to comply. Often, users had to bear most of the burden for compliance, impacting productivity and increasing risk. Other organizations attempted to address these issues by centralizing control, so that only a small and trusted set of users could have access to the most powerful tools, sacrificing agility and self-service.

BRIEF DESCRIPTION OF THE DRAWINGS

FIGS. 6A-6D illustrate examples of the information presented through a service provider console of an enterprise catalog service, according to at least some embodiments.

FIGS. 9A-9D illustrate examples of the information presented through a service provider console of an enterprise catalog service when creating a constraint, according to at least some embodiments.

FIGS. 11A-11B illustrate examples of the information presented through a service provider console of an enterprise catalog when adding a constraint to a product and to a portfolio, respectively, according to at least some embodiments.

FIG. 12 is a flow diagram illustrating one embodiment of a method for managing access control, launch contexts, and searches within an enterprise catalog service.

Figure 1:
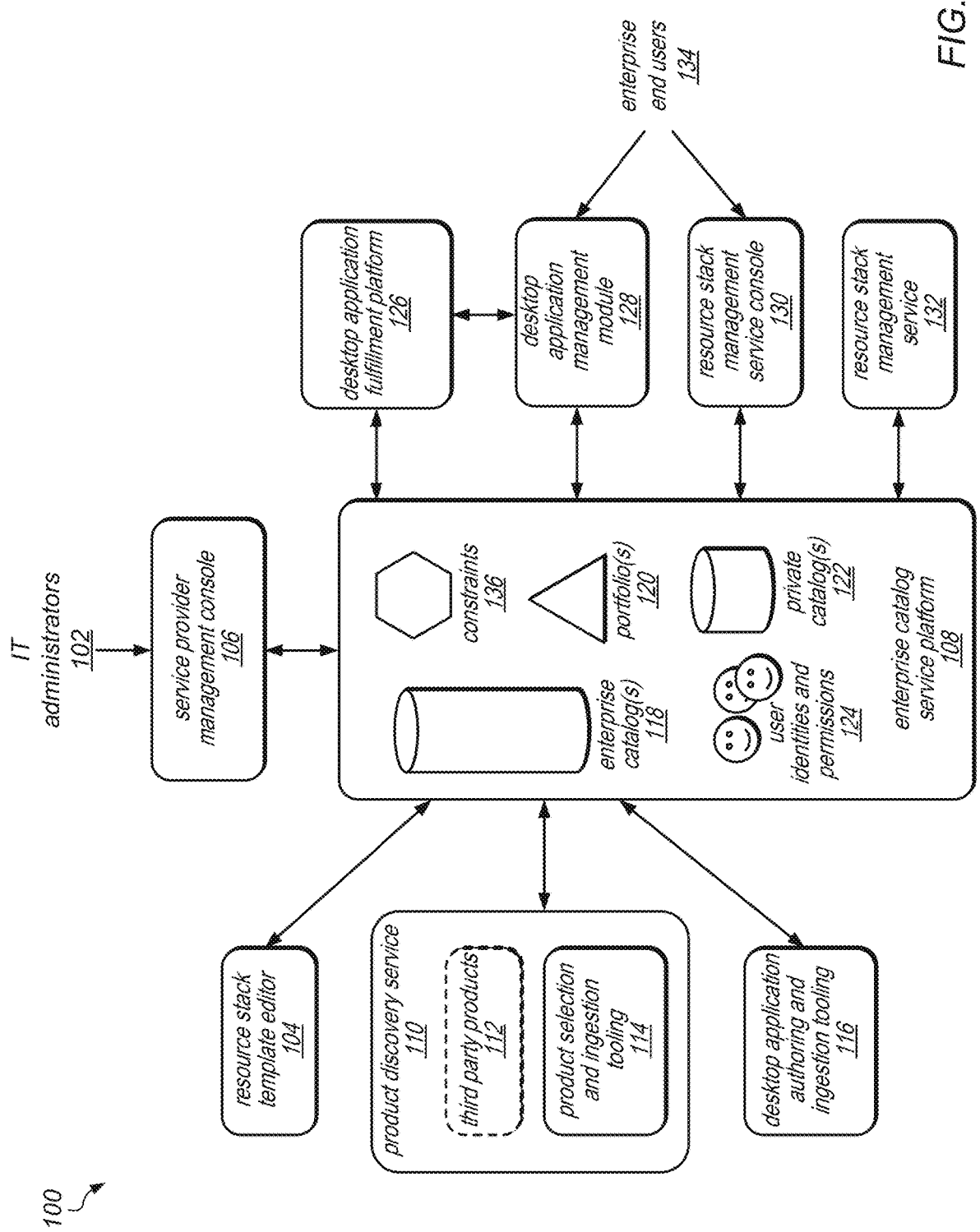
FIG. 1 is a block diagram illustrating one embodiment of a service provider system that is configured to implement an enterprise catalog service.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein for implementing an enterprise catalog service may, in various embodiments, enable administrators within customer organizations to create catalogs and portfolios of software products (e.g., enterprise-wide catalogs, portfolios, and/or other catalogs containing desktop applications and/or server products) and to share them with specific sets of users. For example, through the enterprise catalog service, administrators may be able to offer a standard set of products for common use cases to the end users in their organizations that meet their organizational goals and requirements. In some embodiments, the enterprise catalog service may allow administrators (e.g., IT administrators or buyers) to discover software products, provision service provider resources on which to deploy those software products, and manage those software products through a service provider management console. Similarly, through the enterprise catalog service, administrators may be able to define constraints (e.g., rules governing the use of products and/or portfolios), and may share those constraints (once defined) for application to other products/portfolios and/or with other administrators. The use of the enterprise catalog services described herein may benefit customer organizations by increasing standardization, enforcing compliance with organizational policies, reducing the costs of compliance, and improving agility. In some embodiments, once the software products managed by the enterprise catalog service are in use, administrators can track their usage and monitor health through the service, in order to provide the best possible experience for their users.

In some embodiments, end users may access the enterprise catalog service through an end user console to discover software products and provision them for their common use cases. For example, an administrator may define a product once and enable self-service and repeated use by a group of end users. After provisioning the products, users may track their usage, monitor health, and manage the resources through the end user console or through the service provider management console. In one example, a development manager might create a product for a standard development and test environment that will be used by the developers on his team. Each developer can provision and use the development and test environment in a self-service fashion, and then shut it down (de-provision it) when it is no longer needed.

As described above, in some embodiments, administrators may access the enterprise catalog service through a service provider management console to create and manage catalogs or portfolios. Each catalog (e.g., a default or enterprise-wide catalog or one of multiple private catalogs or portfolios that are accessible only by a subset of the end users in the customer organization) and/or portfolio may contains a set of products. The products in any given catalog may all be of the same type or may include products of different types, in different embodiments. For example, a given catalog or portfolio may include one or more desktop applications (e.g., desktop applications packaged as machine images, application binaries or other executable objects), one or more virtualized application packages (e.g., applications packaged for delivery to desktops on physical computing devices and/or one or more virtual desktop instances, or resource stack templates, dependent on configuration settings selected for the catalog/portfolio by the administrator that created it.

The enterprise catalog service may, in some embodiments, provide access to product listings from third parties (i.e., entities other than the service provider customers and the service provider itself). For example, in some embodiments, the enterprise catalog service may include (or provide an interface to) a product discovery service through which administrators and users can discover and/or obtain access to software products that were developed by (or are published and/or sourced by) two or more independent software vendors (ISVs). For example, an administrator in an organization that is a customer of the enterprise catalog service may procure a product through the product discovery service, customize it, configure data protection settings appropriate for the customer organization, and publish it to end users in the customer organization through an enterprise-wide or private catalog that the administrator owns and/or controls. In this way, administrators may be able to not only ingest their own company products but may also be able to find and subscribe to products from external sources. The products ingested by the enterprise catalog service for inclusion in a customer organization's catalog may require paid subscriptions or licensing fees (e.g., fees charged hourly, monthly, annually, or using any other pricing schedule), or may be free for service provider customers and their end users to use.

In some embodiments, desktop applications that are included in a private catalog or portfolio and managed by the enterprise catalog service on behalf of a service provider customer organization may be deployed to end users in the customer organization through an application fulfillment platform that interacts with the enterprise catalog service. For example, an application fulfillment platform may provide on-demand delivery and installation of applications to virtual desktop instances in a cloud computing environment for the benefit of end users (e.g., employees or members of a business, enterprise, or other organization that is a customer of the service provider). In some embodiments, the application fulfillment platform may employ a variety of services to manage collections of desktop applications that are maintained by the enterprise catalog service (e.g., catalogs or portfolios of desktop applications) and to deliver virtualized application packages to end user machines or virtual desktop instances. In some embodiments, end users may access the enterprise catalog service through an end user console of the application fulfillment platform.

As noted above, in some embodiments, customers of a service provider (e.g., buyers or IT administrators within an enterprise) may be able to discover and subscribe to third party desktop applications (or desktop applications that have been purchased or licensed from a third party by the service provider) on-demand and make them available to their end users on virtual desktop instances. In addition, an IT administrator of a customer may be able to publish and manage the customer's own line-of-business desktop applications, which may be accessible only for their end users.

In various embodiments, the application fulfillment platforms described herein may provide IT administrators full control over their virtual desktop instances with dynamic application management tools. For example, IT administrators in customer organizations may be able to build application catalogs or portfolios (e.g., using an enterprise catalog service such as those described herein) for their end users that are composed of applications from sourced through the platform and/or their own private applications, where a portfolio is a collection of applications and corresponding constraints (including maintenance schedules and license types), and that can be assigned to end users or groups of users. Note that as used herein, references to "assigning" a product or portfolio to an end user or to a group of end users may describe actions or operations by which the end user or group of end users is granted permission to install, subscribe to, or launch the product (or the products in the portfolio). In some embodiments, these actions or operations to grant permissions to an end user or group of end users may also be described as "creating an entitlement" to a product or portfolio for an end user or group of end users. In some embodiments, customers may allow their end users to install applications on-demand. IT administrators may interact with the application fulfillment platforms through a management console (sometimes referred to herein as a service provider system console or an administrator console) that offers IT administrators access to the tools for managing catalogs or portfolios (e.g., catalogs or portfolios of desktop applications that are maintained by the enterprise catalog service), application updates, constraints, constraint groups, application licenses and/or their own private applications. The systems described herein may allow customers to efficiently manage their software application spending with detailed usage reports and monthly subscriptions. Because the service provider may be able to negotiate bulk and/or wholesale prices from application vendors, the service provider may be able to offer them to customer (e.g., individually or in bundles containing groups of popular applications) with competitive pricing.

In some embodiments, an IT administrator of a service provider customer organization may submit information to an enterprise catalog service requesting that one or more end users be granted access to multiple software products. In some embodiments, this input may be submitted as a single request (e.g., a request to granting access to a portfolio containing multiple software products) or within multiple requests, each requesting that access be granted to one or more individual software products. Note that in some embodiments, the software products may include products that are sourced from different entities (e.g., they may include products that were developed or published by the customer organization, products that were developed or published by the service provider, and/or products that were developed by third parties, such as independent software vendors). For each of the software products for which access by one or more end users is requested, the application fulfillment platform (or an entitlement service thereof) may create and store an entitlement record that indicates the association between the end user and the software product (e.g., a separate record for each <user, product> tuple). Note that, in some embodiments, if the request is a request to grant access to a portfolio of software products, a separate entitlement record may be created for each product in the portfolio. In other embodiments, if the request is a request to grant access to a portfolio of software products, a single entitlement record may be created for the portfolio, and this single entitlement record may be consulted when the end user executes any of the software products in the portfolio.

As described herein, application fulfillment platforms may provide a self-service model to end users through an application on their virtual desktop instances. For example, through this application (which is referred to herein as a desktop application management module), end users can discover and manage an application portfolio that best fits their needs, with the ability to install applications marked as optional by their IT administrators. IT administrators may also have the option to authorize their users to be able to request access to additional applications and/or to receive notifications of new applications or application updates as they become available.

Note that in the context of the services described herein, the terms "customer" and "buyer" may refer to an enterprise, a business, or another organization that receives services (e.g., catalog services, application management services, and/or software product fulfillment services) from a service provider on behalf of their end users. In this context, the term "sellers" may refer to software vendors that provide their applications for use within the application fulfillment platforms described herein, and the terms "users" and "end users" may refer to employees or members of the enterprise, business, or other organization that receives services on their behalf from the service provider. In various embodiments, users may access software products that are fulfilled through the platforms and services described herein on their own computing resources instances (e.g., on end user machines and/or virtual desktop instances) or may invoke the execution of server products (e.g., services implemented by resource stacks of service provider resources) on their behalf. Note that in various embodiments, an enterprise catalog service "user" may represent an identity and access management role (e.g., a child account of a root account for a service provider customer or service provider customer organization) or may be an end user in a customer organization (e.g., an active directory user), and the enterprise catalog service may support groups of both of these types of users (e.g., active directory groups or identity and access management groups).

In some embodiments, applications (e.g., desktop applications) may be delivered to various end users' virtual desktop instances using an application virtualization technology that encapsulates and isolates applications in dedicated containers. For example, a packaging service implemented on the application fulfillment platform may be configured to transform applications into virtualized application packages and to deliver them to virtual desktop instances or physical desktops running over an operating system on an end user's machine. The virtualized application packages, when executed, may perform and behave as if they are natively installed, without the need for actual installation.

As described herein, an application fulfillment platform may offer customers (or more specifically, IT administrators of those customers) the ability to provision applications on-demand at scale while maintaining centralized control, security and compliance. For example, in some embodiments, these platforms (and corresponding services thereof) may be integrated with a management console through which the IT administrators may discover and subscribe to a broad selection of applications from a variety of sources, build catalogs and/or portfolios of applications from a variety of sources and having a variety of subscription/licensing models, control access to applications with granular access policy enforcement on a per user basis, manage application updates, access detailed usage reports for their enterprise, application portfolios and end users, and/or monitor real-time installs as well as license activation on a per application basis.

As noted above, the application fulfillment platforms described herein may be integrated with or may be configured to operate in conjunction with an enterprise catalog service, such as those described herein. As described herein, administrators may create catalogs or portfolios of products and resources from a variety of suppliers, and may share them with a specific set of users. These products may include not only desktop applications to be delivered to virtual desktop instances as virtualized application packages, but may also include server products (e.g., server-side applications to be executed on a server on behalf of a customer or end user) and/or applications to be delivered as executable files (e.g., application binaries or machine images) to be installed on an end user's computing device or virtual desktop instance. In some embodiments, once the enterprise catalog service is used to create a catalog or portfolio of desktop applications, these applications may be installed as virtualized application packages by end user at a later time (e.g., on-demand). The integration of the enterprise catalog service with a resource stack management service through which server products may be defined and deployed in described in more detail below, according to various embodiments.

The enterprise catalog services described herein may be implemented in whole or in part on an enterprise catalog service platform that includes (or operates in conjunction with) various components and services in the service provider network that are used in managing collections of software products on behalf of service provider customer organizations and their end users. For example, the enterprise catalog service platform may include (or provide an interface to) a product discovery service, robust catalog management tools, tools for authoring and managing the lifecycles of products, product listings, and product offerings, a catalog store (e.g., an indexed, revision-controlled document store where all products and offers are mastered), a lifecycle system responsible for validation, approval, and promotion workflow steps, and a catalog publishing system.

Terminology

In the context of the enterprise catalog services described herein, the term "product" may refer to any resource (e.g., a machine image, resource stack template, desktop application binary or virtualized application package) that has been prepared for consumption by other users and that may be included in a catalog of such resources or listed in a portfolio of such resources. Products may be ingested by an enterprise catalog service through the IT administrator console and, once added to a catalog or portfolio, may be fulfilled (which may also be referred to as being launched) by end users through an end user console. In various embodiments, actions that can be taken on a product may include one or more of the following:
 1. Create
 2. Read
 3. Update (e.g., change aspect metadata, add a version, or change accessibility)
 4. Publish views
 5. Sunset a product or version thereof In the context of the enterprise catalog services described herein, the term "offer" may refer to a contract that captures terms of use, which may include pricing information. An Offer can reference multiple products (e.g., a bundle). The phrase "pricing information" may refer to a collection of terms or a way of pricing. As with products, changes to offers may be tracked across multiple immutable revisions. In some embodiments, the actions that can be taken on an offer may include the following:
 1. Create
 2. Read
 3. Update (Change price, Change availability, Change accessibility)
 4. Publish views In the context of the enterprise catalog services described herein, the term "listing" may refer to a human readable view of a combination of products and offers. There may be different ways to present a listing, in different embodiments, the goal of which is to allow administrators, buyers and/or end users to make informed purchase decisions from a specific business context. Ratings, and reviews, and recommendations may also be included in (or associated with) listings. Listings may be mutable and may be consolidated, in some embodiments. Various enterprise catalog service APIs associated with listings are shown below.

In the context of the enterprise catalog services described herein, the term "subscription" may refer to a record of an agreement of an offer by a user. This agreement entitles a user to the products specified in the chosen terms of the offer. Additional parameters of the terms may also be collected in a subscription. In some embodiments, the actions that can be taken on a subscription may include the following:
 1. Create
 2. Read
 3. Update (Renew, End)

In the context of the enterprise catalog services described herein, an entitlement may be a collection of allowed product actions for each user. In some embodiments, the actions that can be taken on an entitlement may include the following:

1. Create, Update, Delete (private)
2. Read

In the context of the enterprise catalog services described herein, an approval may be a workflow that must happen before one or more of the previously described actions on a product can be taken. For example, an approval workflow may be invoked in response to an end user request to subscribe to a product and/or for permission to consume the product.

In various embodiments, the enterprise catalog service may expose a variety of APIs (some of which may not exposed to customers or end users). For example, in some embodiments the enterprise catalog service may expose any or all of the following APIs (as well as other APIs) for use in managing catalogs and/or portfolios of software products on behalf of customer organizations and their end users.

DescribeListings
DescribeListingVersions
PutListing
CreateListing
UpdateListing
CreatePortfolio
ImportPortfolio
UpdatePortfolio
DescribePortfolios
DeletePortfolio
ListPortfolios
PutPortfolioAccessPolicy
RemovePortfolioAccessPolicy
ListPortfolioAccessPolicies
DescribePortfolioAccessPolicies
PutConstraint
RemoveConstraint
ListConstraints
DescribePortfolioConstraints
AddPortfolioListings
RemovePortfolioListings
SearchListings
DescribeListingFilters
BrowseListings
GetLaunchContexts
DescribeFulfillment
ListFulfillments
DescribeUserAppAssociation
ModifyOrderStatus Enterprise Catalog Service Architecture From the standpoint of a high level software architecture, a service provider platform that implements an enterprise catalog service such as those described herein may be comprised of the following components: a catalog service, a service catalog runtime, an inbox service, a resource stack management service, one or more administrator/management consoles, and one or more end user consoles, each of which may provide a portion of the functionality of the enterprise catalog service. The catalog service may be the core storage and version control mechanism for the enterprise catalog service. IT administrators may create and publish products and product versions that are stored in the catalog service, and IT administrators create portfolios and assign products to portfolios. Catalog information, portfolios and association between catalogs or portfolios and products may be stored in the catalog service. The service catalog runtime may be responsible for fulfilling products (e.g., products defined using resource stack templates). The service catalog runtime may also provide support for "managed services" whereby the end-user does not have access to the service provider resources that are created when deploying a product.

In some embodiments, an inbox service may allow various service provider services to send targeted, actionable "messages" to users e.g., (administrators or end users). The inbox service may define the notion of an "inbox" as a target for such messages. The inbox service may allow administrators to define who has access to various messages and where notifications are sent when messages arrive in a particular inbox. In some embodiments, the enterprise catalog service may uses the resource stack management service as the underlying fulfillment engine for server products. In various embodiments, one or more administrator/management consoles may provide graphical user interfaces for creating and managing products and portfolios, and one or more end user consoles may provide graphical user interfaces for launching and managing products.

Note that in some embodiments, a workflow service may be used to run workflows to complete various tasks in conjunction with the enterprise catalog service, the application fulfillment platform, or the resource stack management service. For example, in some embodiments, there may be a separate workflow for each operation performed on a resource stack. In a specific example, when a call is made to launch a resource stack, a "LaunchStack" workflow (e.g., one that is specific to that combination of user and resource stack name) may be created to monitor and harvest any information from the resource stack. The workflow service may also provide a synchronization mechanism to ensure that only certain operations are being performed at the same time (for example, prevent an update operation from starting if the target resource stack is still in the process of being created).

FIG. 1 is a block diagram illustrating a portion of a service provider system that implements an enterprise catalog service, according to at least one embodiment. The system includes an enterprise catalog service platform through which IT administrators within service provider customer organizations (e.g., enterprises that receive computing services from the service provider) can manage catalogs and/or portfolios of desktop applications and/or server products, as well as usage policies (e.g., constraints on the use of those desktop applications and/or server products) for their end users. As illustrated in FIG. 1, system 100 may include an enterprise catalog service platform 108 (which may embody both a catalog service and a service catalog runtime, such as those described above) that is configured to create and manage one or more enterprise catalogs 118, private catalogs 122 and/or portfolios 120 on behalf of service provider customers and their end users. Note that, in some embodiments, at least some of private catalogs 122 may represent logical collections of products to which a respective end user or other principal has access (each of which may include products that are included in one or more portfolios 120). As described in more detail herein, an IT administrator 102 may interact with the enterprise catalog service platform 108 through a service provider management console 106 to create a desktop application, resource stack template, or resource stack instance; to select, ingest, and/or package desktop applications and server products for subsequent use by some or all of their end users; create collections of products (e.g., desktop applications and/or server products), such as enterprise-wide catalogs, private catalogs, or portfolios); assign products or collections of products to end users and/or end user groups (e.g., end users or end user groups having particular user identities and/or permissions

124); apply various constraints 136 on the use of the products; and/or set other configuration parameter values for the products or collections of products.

As illustrated in this example and described in more detail herein, there may be multiple methods for an IT administrator to add products to catalogs and/or portfolios and make them available for deployment to end users. For example, system 100 may include a resource stack template editor 104. In various embodiments, IT administrators, end users, or third party software providers (e.g., independent software vendors) may create resource stack templates using resource stack template editor 104 for server products that be uploaded directly to enterprise catalog service platform 108 or that may (if subsequently published) be discovered and ingested by the enterprise catalog service through product discovery service 110. System 100 may also include a desktop application authoring and ingestion tooling component 116. In various embodiments, IT administrators, end users, or third party software providers (e.g., independent software vendors) may create desktop applications using desktop application authoring and ingestion tooling component 116 that may (if subsequently published as a machine image, application binary, or other executable application package) be discovered and ingested by the enterprise catalog service through product discovery service 110. For example, in some embodiments, IT administrators or end users in a service provider customer organization may create and upload customer-specific desktop applications (e.g., line-of-business applications) through desktop application authoring and ingestion tooling component 116.

In some embodiments, product discovery service 110 may provide an interface through which third party products 112 (e.g., server products or desktop applications that have been published and/or packaged for potential ingestion by the enterprise catalog service) can be discovered. Product discovery service 110 may include a product selection and ingestion tooling component 114, which may be configured to retrieve and/or package products that are discovered through the product discovery service interface or that are uploaded through the product selection and ingestion tooling component 114, in different embodiments. In various embodiments, the products ingested by the enterprise catalog service may be leased and/or licensed by the service provider and/or by service provider customers for the benefit (and use) of end users in the service provider customer organizations.

In some embodiments, when a product (e.g., a desktop application or resource stack template for a server product) is selected by an IT administrator 102 and ingested by enterprise catalog service, it may be placed in a default catalog for the customer organization (such as enterprise catalog 118). The IT administrator 102 may then add it to one or more private catalogs 122 or portfolios 120, or may assign it directly to one or more user end users or end user groups having particular user identities and/or permissions 124. Similarly, when a server product instance is created (e.g., when a resource stack is constructed according to a resource stack template), it may be placed in the default catalog. The IT administrator 102 may then add it to one or more private catalogs 122 or portfolios 120, or may assign it directly to one or more end users or end user groups having particular user identities and/or permissions 124. Note that any constraints 136, groups of constraints, or configuration parameters that are selected for various products by the IT administrator (e.g., during their creation, ingestion, or addition to a particular catalog) may be applied to the products when they are added to other catalogs and/or portfolios. In some embodiments, these constraints, groups of constraints, or configuration parameters may be modified when they are added to other catalogs and/or portfolios, and/or additional constraints, groups of constraints, or configuration parameters may be applied to the products when they are added to other catalogs and/or portfolios to further restrict access to those products by end users or to further restrict the use of those products by end users who are authorized to access them.

As described in more detail herein, the products that are managed on behalf of service customer organizations by the enterprise catalog service implemented by system 100 (and, more specifically, by enterprise catalog system platform 108) may be deployed to end users through other components and services implemented by the service provider (e.g., on physical and virtual computing resources that are located and/or hosted on the service provider's network). For example, desktop applications may be deployed to desktops on various end users' physical devices and/or on virtual desktop instances (e.g., in response to requests from the end users to install, subscribe to or launch them) through desktop application fulfillment platform 126. In another example, server product instances may be constructed from resource stack templates (e.g., in response to requests from end users or IT administrators to deploy the services provided by the resource stacks) by resource stack management service 132.

In various embodiments, the end users of a service provider customer (shown as enterprise end users 134 in FIG. 1) may access products (e.g., desktop applications and/or services) through various client applications (e.g., end user consoles). For example, FIG. 1 illustrates an embodiment in which enterprise end users 134 access desktop applications (including those that are managed on behalf of their organizations by the enterprise catalog service) through a desktop application management module 128, and in which end users 134 access server products (including those that are managed on behalf of their organizations by the enterprise catalog service) through a resource stack management service console 130. For example, end users 134 may log into desktop application management module 128 in order to request delivery of, to subscribe to, to unsubscribe from, to install, to uninstall, to launch, or to otherwise manage a particular desktop application (one that may or may not be included in a catalog to which the end user currently has access), or may log into resource stack management service console 130 in order to construct a resource stack instance from a resource stack template (on service provider resources), or request access to a service provided by a resource stack instance that has been constructed (on service provider resources) from a corresponding resource stack template (a service that the end user may or may not currently be authorized to launch). In some embodiments, when requests are received from end users 134 for desktop applications or services that are managed by the enterprise catalog service, they may initiate various workflows of enterprise catalog service platform 108, desktop application fulfillment platform 126 and/or resource stack management service 132 that may or may not result in the end users 134 receiving the requested product access (e.g., depending on various access management policies, constraints, or permissions that apply to the product and/or the end users).

Note that while the example system illustrated in FIG. 1 includes a single service provider management console 106 through which IT administrators 106 interact with the enterprise catalog service platform to perform all IT administrator functions and includes multiple end user consoles (e.g., one for end user functions directed to desktop application management and another for end user function directed to server product management), in other embodiments, a system that implements an enterprise catalog service may include two different management consoles (e.g., one through which desktop applications are managed by IT administrators and another through which server products are managed by IT administrators), rather than a single management console. In still other embodiments, the system may include a single end-user console through which end users manage both desktop applications and server products, rather than two different end-user consoles. In still other embodiments, a system that includes an enterprise catalog service platform, such as that described herein, may be configured to manage and deploy software products other than resource-stack-based server products and desktop applications, and/or may deploy software products for consumption by end users through more, fewer, or different deployment platforms than those illustrated in FIG. 1 as desktop application fulfillment platform 126 and resource stack management service 132. Similarly, in other embodiments, a system that includes an enterprise catalog service platform, such as that described herein, may be configured to ingest software products of types other than resource-stack-based server products and/or desktop applications, and/or may include (or interact with) more, fewer, or different ingestion mechanisms than those illustrated in FIG. 1 as resource stack template editor 104, product discovery service 110, and desktop authoring and ingestion tooling 116.

Although not shown in the example in FIG. 1, the enterprise catalog service may include an interface to (or otherwise work in conjunction with) various data stores or data storage services (e.g., a data storage service implemented by the service provider or an external data storage service). In one embodiment, the documents associated with a product may be stored in an object storage service, and the console (or customer) may be responsible for uploading these documents to system-defined locations through various enterprise catalog service APIs. In this example, the service catalog runtime may pass the location of the documents to the catalog service, and the identity and access management (IAM) role used to upload the documents may be stored by the catalog service. In some embodiments, data about running stacks may be persisted in a database service. In various embodiments, application state data for virtualized desktop applications may be persisted in either an object storage service or a database service.

Figure 23:
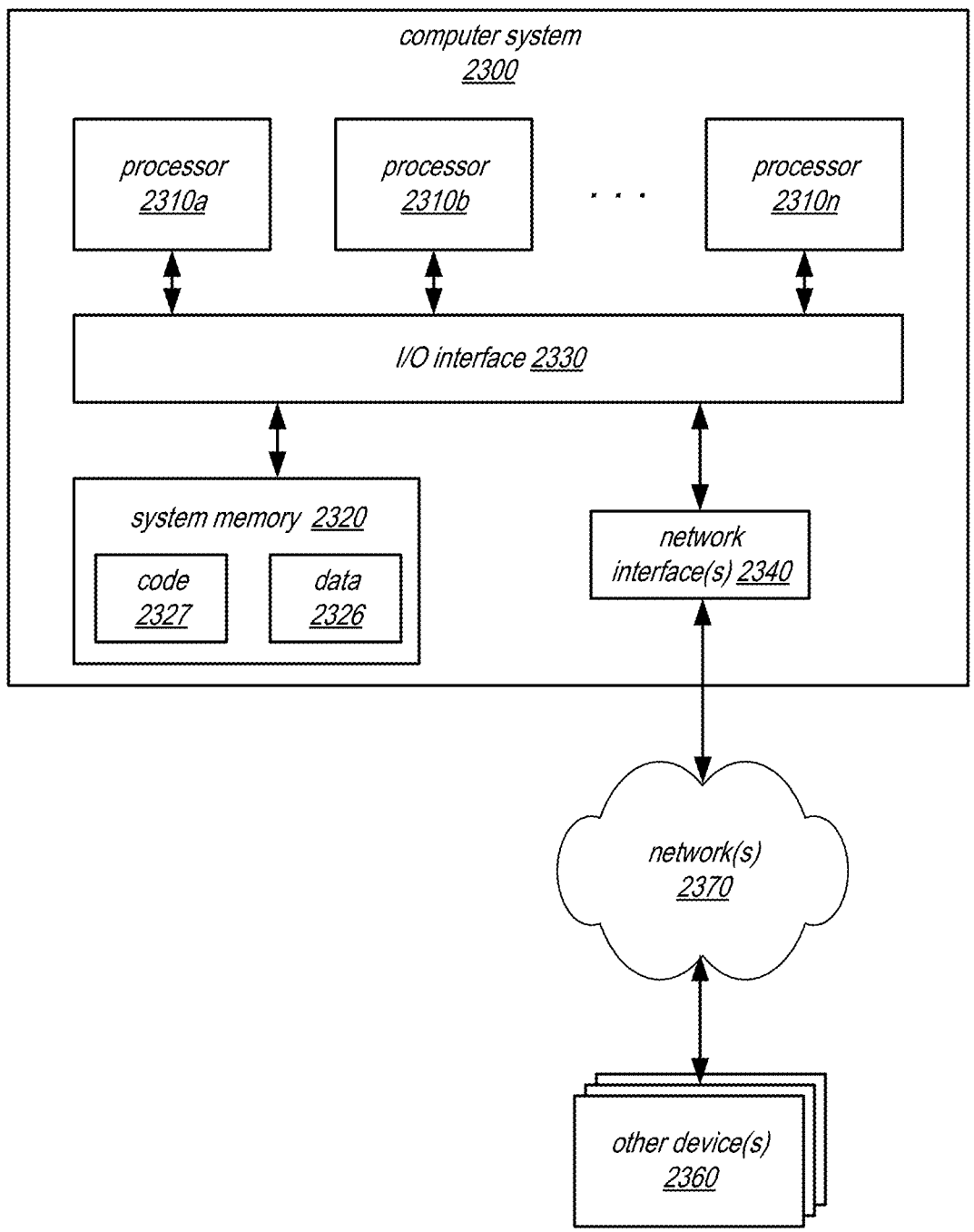
FIG. 23 is a block diagram illustrating an example computer system that implements some or all of the techniques described herein, according to different embodiments.

The systems and methods described herein may be implemented on or by one or more computing systems within a network environment, in different embodiments. An example computer system on which embodiments of the techniques described herein for managing and deploying desktop applications and services through an enterprise catalog service may be implemented is illustrated in FIG. 23. Embodiments of various systems and methods for implementing these techniques are generally described herein in the context of a service provider that provides to clients, via an intermediate network such as the Internet, virtualized resources (e.g., virtualized computing and storage resources), software products, and computing services (including desktop applications and server products) implemented on a provider network of the service provider. FIGS. 1, 2, 4, 5, 16, 17, and 23 (and the corresponding descriptions thereof) illustrate and describe example computing systems and environments in which embodiments of the systems and methods described herein may be implemented, and are not intended to be limiting. In at least some embodiments, at least some of the resources provided to clients of the service provider via the provider network may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider may access one or more services of the provider network via application programming interfaces (APIs) to the services to obtain and configure resource instances and to establish and manage virtual network configurations that include the resource instances, for example virtualized private networks.

In some embodiments, the resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host.

Example Provider Network Environment

This section describes an example provider network environment in which embodiments of the methods described herein may be implemented. However, this example provider network environment is not intended to be limiting. In various embodiments, in such provider network environments, a service provider may host virtualized resource instances on behalf of a customer that can be accessed by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances.

In some embodiments, desktop applications that are included in catalogs managed by an enterprise catalog service such as those described herein may be delivered to and/or deployed, installed or executed on virtualized computing resources (e.g., virtual computing resource instances implemented on service provider hardware in a cloud computing environment), rather than on physical client computing devices. In addition, server products that are included in catalogs managed by an enterprise catalog service may be implemented as resource stacks (e.g., stacks of service provider resources) that collectively provide a service. These service provider resources may also include virtualized computing resources, such a virtual computing node instances implemented on service provider hardware in a cloud computing environment. An example service provider network that provides virtualized computing resources for these and other uses is illustrated in FIG. 2 and described below.

Figure 2:
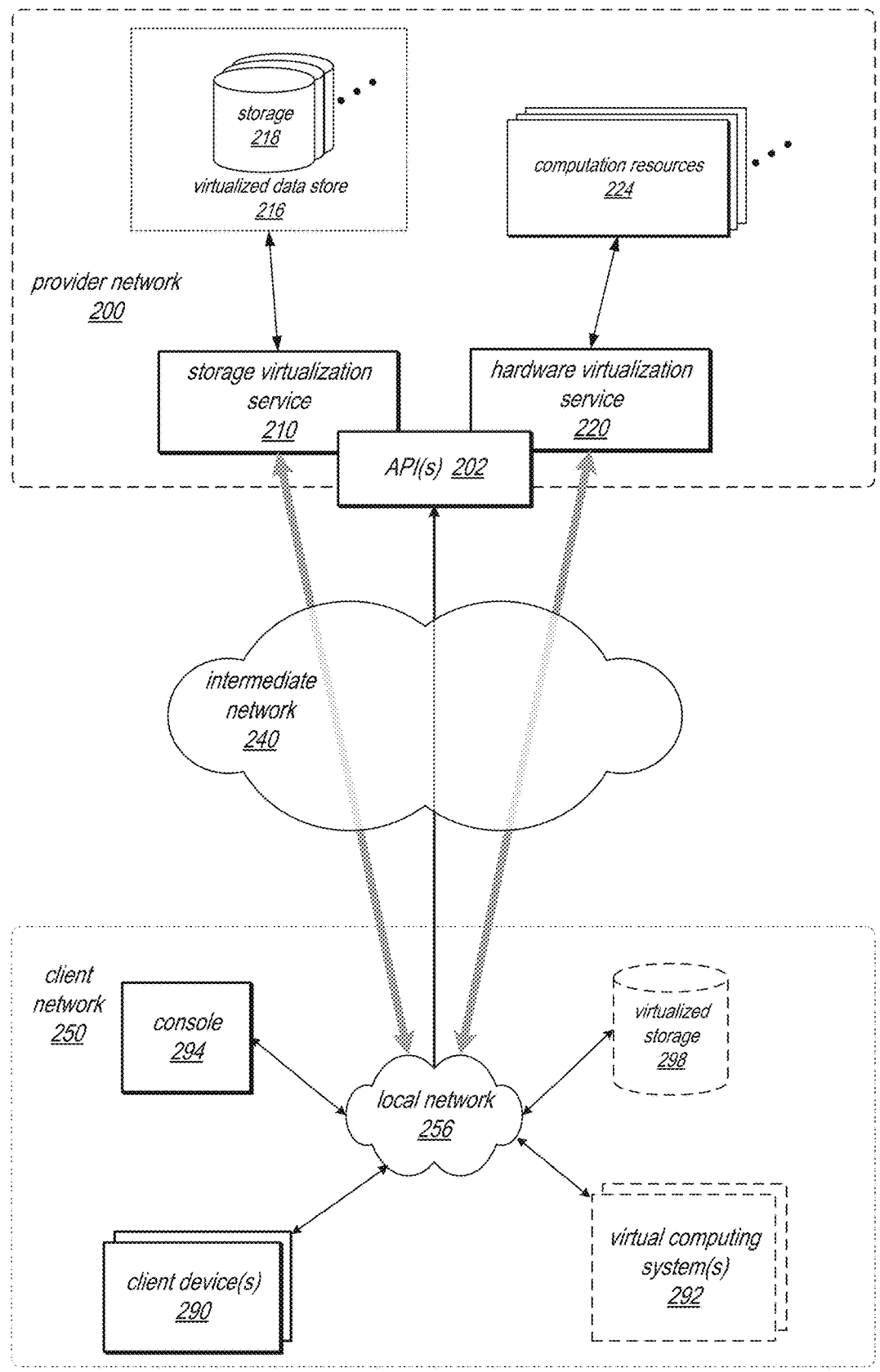
FIG. 2 is a block diagram illustrating an example provider network that provides a storage virtualization service and a hardware virtualization service to clients, according to at least some embodiments.

FIG. 2 is a block diagram of an example provider network environment, one that provides a storage virtualization service and a hardware virtualization service to clients, according to at least some embodiments. In this example, hardware virtualization service 220 provides multiple computation resources 224 (e.g., VMs) to clients. The computation resources 224 may, for example, be rented or leased to clients of the provider network 200 (e.g., to a client that implements client network 250). As noted in the previous example, in some embodiments, provider network 200 may also provide application virtualization for the benefit of its customers and their end users (e.g., through a packaging service), and may provide on-demand delivery of desktop applications to desktops on physical computing devices and/or virtual desktops through an application fulfillment platform implemented using various resources of service provider network 200. In this example, each computation resource 224 may be provided with one or more private IP addresses. Provider network 200 may be configured to route packets from the private IP addresses of the computation resources 224 to public Internet destinations, and from public Internet sources to the computation resources 224.

Provider network 200 may provide a client network 250, for example coupled to intermediate network 240 via local network 256, the ability to implement virtual computing systems 292 via hardware virtualization service 220 coupled to intermediate network 240 and to provider network 200. In some embodiments, hardware virtualization service 220 may provide one or more APIs 202, for example a web services interface, via which a client network 250 may access functionality provided by the hardware virtualization service 220, for example via a console 294. In at least some embodiments, at the provider network 200, each virtual computing system 292 at client network 250 may correspond to a computation resource 224 that is leased, rented, or otherwise provided to client network 250.

From an instance of a virtual computing system 292 and/or another client device 290 or console 294, the client may access the functionality of storage virtualization service 210, for example via one or more APIs 202, to access data from and store data to a virtual data store 216 provided by the provider network 200. In some embodiments, a virtualized data store gateway (not shown) may be provided at the client network 250 that may locally cache at least some data, for example frequently accessed or critical data, and that may communicate with virtualized data store service 210 via one or more communications channels to upload new or modified data from a local cache so that the primary store of data (virtualized data store 216) is maintained. In at least some embodiments, a user, via a virtual computing system 292 and/or on another client device 290, may mount and access one or more storage volumes 218 of virtual data store 216, each of which appears to the user as local virtualized storage 298.

While not shown in FIG. 2, the virtualization service(s) may also be accessed from resource instances within the provider network 200 via API(s) 202. For example, a client, appliance service provider, or other entity may access a virtualization service from within a respective private network on the provider network 200 via an API 202 to request allocation of one or more resource instances within the private network or within another private network. Note that in some embodiments, the hardware virtualization service 220 may be configured to provide computation resources 224 that have been configured to implement a virtual desktop instance, which may appear to the user as a local desktop (implemented by a virtual computing system 292). Note also that in some embodiments, the computation resources 224 that are made available to the client via hardware virtualization service 220 may include multiple network interfaces. For example, some of them may include one network interface for communicating with various components of client network 250 and another network interface for communicating with computation resources or other network entities on another network that is external to provider network 200 (not shown).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients. In various embodiments, a service provider may employ one of the example provider networks described above (or another suitable provider network environment) to implement a hosted desktop service in a cloud computing environment. In such embodiments, a customer may access the provider network in the cloud computing environment to request the instantiation and/or configuration of one or more virtual desktop instances in the cloud, and may then provide access to those virtual desktop instances to one or more end users (e.g., through a client application). For example, an administrator within an organization or enterprise may set up an account with a service provider, may contract with the service provider to set up some number of virtual desktop instances, and (once the virtual desktop instances are set up), may provide credentials for accessing these virtual desktop instances. In this example, once the virtual desktop instances have been set up and credentials have been provided, one or more end users may launch a client application on their a client device (e.g., a computer, tablet device, or other mobile device) and enter the credentials for the virtual desktop instance, after which they may be logged into a virtual desktop environment. Although the virtual desktop environment is implemented by virtualized resource instances in the cloud computing environment, it may appear to the end user as if it were a local desktop and it may operate as if it were an independent computer to which the user is connected. In some embodiments, the virtual desktop environment may provide access to productivity software and other software programs to which the user would typically have access if the user were logged onto a physical computer owned by the organization or enterprise. In at least some embodiments, an application fulfillment platform of the service provider may be configured to provide on-demand delivery of applications (e.g., as virtualized application packages) to virtual desktop instances, as described herein. Note that these applications may or may not be stand-alone applications. For example, in some cases, each of the virtual desktop instances (and/or the applications running thereon) may be part of the active directory framework of the organization or enterprise and may be able to access shared files or other resources on the existing network of the organization or enterprise once the credential presented by the user upon logging into the virtual desktop instance have been authenticated.

Figure 3:
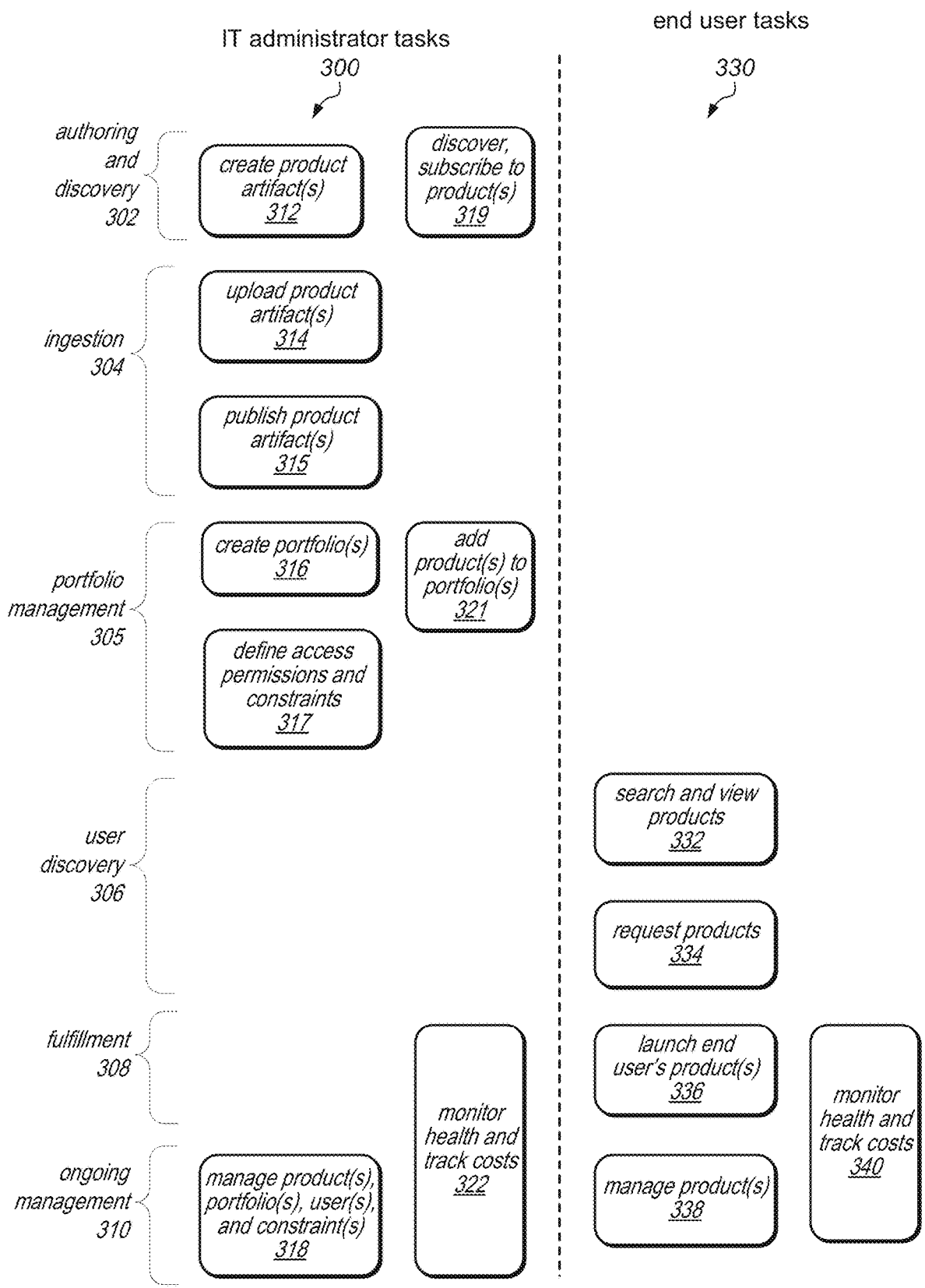
FIG. 3 illustrates tasks that may be performed by an IT administrator and other tasks that may be performed by an end user during different phases of product deployment through an enterprise catalog service, according to at least some embodiments.

In some embodiments, the types of interactions experienced by different users that access the enterprise catalog services (and enterprise catalog service platforms) described herein may be thought of as being divided into multiple phases, where each phase may include tasks that are performed by an IT administrator of a service provider customer organization and/or tasks that are performed by an end user in the customer organization. For example, FIG. 3 illustrates tasks that may be performed by an IT administrator (shown as IT administrator tasks 300) and other tasks that may be performed by an end user (shown as end user tasks 330), according to at least some embodiments. As illustrated in this example, during a product authoring and discovery phase (shown as authoring and discovery phase 302), an IT administrator may create the artifacts for a product to be offered by the enterprise catalog service using appropriate product-specific tools (shown as task 312). In various embodiments, this task may include creating a machine image for a software product, creating a resource stack template for a server product, or packaging a desktop application for delivery to desktops on physical computing devices and/or virtual desktop instances. During this phase, the IT administrator may also discover one or more products that are available to be managed by the enterprise catalog service on behalf of the IT administrator's organization, and may subscribe to one or more of those products on behalf of the end users in the IT administrator's organization, and may subscribe to one or more of those products on behalf of the end users in the IT administrator's organization (shown as task 319). In various embodiments, during this phase (or during an ingestion phase described below), an IT administrator may (through an administrator or management console of the enterprise catalog service) be able to add additional information for a product listing (e.g., a product listing for a newly authored product or for one that was discovered by the IT administrator), such as a detailed product description, a logo to brand the product, version information and/or tags (which may be used to identify and characterize the product, or may be used in identity and access management policies to allow or deny access to the product or to restrict the operations that can be performed by IAM users, groups, and roles).

As illustrated in FIG. 3, during an ingestion phase (shown as ingestion phase 304), and administrator may upload a product artifact that was created during authoring phase 302. For example, the IT administrator may upload a machine image for a software product, a resource stack template for a server product, or a packaged desktop application to the enterprise catalog service platform (shown as task 314) and publish the machine image, resource stack or packaged desktop application to one or more enterprise catalogs, private catalogs or portfolios (as in task 315). During a portfolio management phase (shown as portfolio management phase 305), the IT administrator may create one or more portfolios (shown as task 316) and may add one or more products that were authored, uploaded, and published by the IT administrator (as in tasks 312, 314, and 315) or that were discovered and subscribed to by the IT administrator (as in task 319) to those portfolios (shown as task 321). During this phase, the IT administrator may also define one or more access management policies and/or constraints to be applied to the product and/or to the portfolios to which the products have been added (as in task 317). For example, in some embodiments, the constraints may include business level input parameters (such as an input parameter specifying the number of users to support or whether certain types of data need to be stored), or may include infrastructure-level input parameters (such as an input parameter specifying the type of virtualized computing resource instance should be used).

As illustrated in this example, during a user discovery phase (shown as user discovery phase 306), an end user within the customer organization may discover one or more products by searching an enterprise-wide catalogs (if the end user has permission to view the enterprise-wide catalog) or their own private catalog (e.g., a logical collection of the products that the end user has permission to discover and/or launch, including any products that are included in portfolios to which the end user has been granted access), and viewing details pages that provide information about the products (as in task 332) and may request access to one or more products (as in task 334). During a fulfillment phase (shown as fulfillment phase 308), the end user may launch one or more of the products in their private catalog (as in task 336) and begin monitoring their state (which may include real-time monitoring of the health of the product and/or tracking costs associated with the provisioning and use of the product (as in task 340). Note that, in some embodiments, IT administrators and/or other decision makers may be required to approve a request to discover or launch a product prior to the end user being allowed to discover and/or launch the requested product. In this phase, the IT administrator may also begin monitoring the state of various products that have been provisioned by (or on behalf of) end users in the customer organization (which may include real-time monitoring the health of the products provided to the end users and/or tracking costs associated with the provisioning and use of the products provided to the end user), as in task 322. For example, in some embodiments, an IT administrator and/or an end user may be able to view a list of products that are currently in use along with their health (e.g., through the administrator/management console or through an end user console). In some embodiments, the product health for a server products built using a resource stack template may be determined according to various alarms that are defined in the template.

As illustrated in FIG. 3, during an on-going management phase (shown as on-going management phase 310), both end users and IT administrators may continue to monitor the health of various products and to track costs associated with the provisioning and use of the products (as in tasks 322 and 340). The IT administrators may also manage those products, as well as any portfolios in which they are contained and/or any constraints or users/permissions that are associated with those products (as in task 318). For example, in some embodiments, managing the products may include enforcing any access management policies and/or constraints that were defined for the products and/or to the enterprise catalogs, private catalogs or portfolios to which the products were published. During this phase, end users may manage their own list of products (as in 338). For example, end users may add or remove products, but may not modify their configurations (e.g., any applicable constraints or permissions). Also note that, in some embodiments, the IT administrator may continue to search for and discover new products, to subscribe to them, and to add them to new or existing portfolios and that the end user may continue to discover and request access to products and/or to launch products to which the end user has been granted access (e.g., by repeating various ones of the tasks illustrated in FIG. 3) during the ongoing management phase 310 (not shown).

Note that in some embodiments, a product (or a particular version of a product) may be deprecated by an IT administrator (e.g., through the administrator/management console of the enterprise catalog service). In such embodiments, when a particular version of a product is deprecated, which may also be referred to as "sunsetting", a notification may be sent to all end users that have previously provisioned that version of the product. In some embodiments, end users who previously provisioned (and are currently using) a product version that has been (or is about to be) sunsetted may continue to use that product version unless, for example, an IT administrator determines that it is a security risk and revokes access to that product version for all end users. However, a product version that has been (or is about to be) sunsetted may not be available to any other end users (e.g., end users who have not previously provisioned that product and/or are not currently using it). In some embodiments, once an end user stops using a product version that has been (or is about to be) sunsetted, the end user may no longer have access to that product version. Note also that new product versions may be created in the same way that new products are created (e.g., through the administrator/management console of the enterprise catalog service). In some embodiments, when a new version of a product is published to a catalog or portfolio, a notification may be sent to all users that have provisioned previous versions of the product. Creating a new version of a product may not affect any existing versions of the product that are currently in use.

Figure 4:
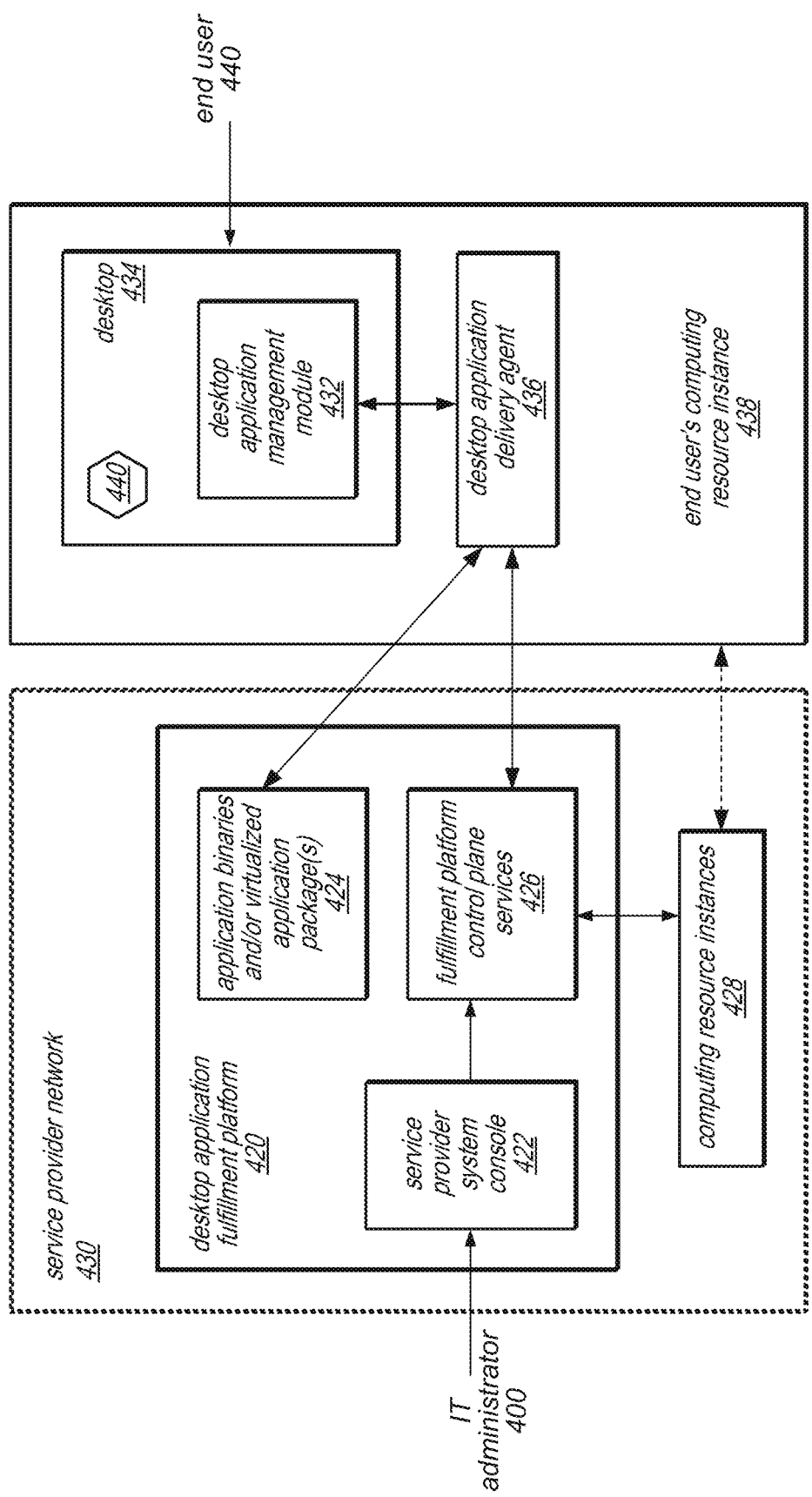
FIG. 4 is a block diagram illustrating one embodiment of a service provider system that is configured to provide on-demand delivery of applications to computing resource instances of its customers' end users.

One embodiment of a service provider system that is configured to provide on-demand delivery of applications (e.g., desktop applications) to computing resource instances of its customers' end users is illustrated by the block diagram in FIG. 4. As illustrated in this example, the system, implemented on service provider network 430, may include an application fulfillment platform (shown as desktop application fulfillment platform 420). The application fulfillment platform may include an interface mechanism (shown as service provider system console 422) through which an IT administrator of a service provider customer (e.g., a business, enterprise, or organization that receives computing services, storage services, and/or access to second or third party applications from the service provider) can manage the fulfillment of various applications to their end users (e.g., employees or members of the same business, enterprise, or organization). For example, the IT administrator may log into desktop application fulfillment platform 420 (e.g., through a browser or a dedicated client-side application) to access service provider system console 422. The IT administrator may then provide input (e.g., requests for service entered in a graphical user interface of service provider system console 422) in order to create a catalog of applications to be provisioned for the use of their end users, to assign applications to particular end users or user groups, or to generate, obtain, or view usage reports for the applications in the catalog by their end users.

As illustrated in this example, desktop application fulfillment platform 420 may include multiple fulfillment platform control plane services 426, various ones of which may be invoked in response to the inputs received from the IT administrator. For example, in response to inputs specifying the addition of an application to a catalog and the assigning of the application to one or more users, a "create fulfillment" workflow may be initiated, which may include operations performed by a fulfillment service, an entitlement service, a delivery service, a packaging service, a device identifier service, and/or a proxy service. As illustrated at 424, in this example, applications may be delivered to end users as application binaries (e.g., desktop applications that have been prepared for physical installation on an end user's computing resource instance) and/or as virtualized application packages. For example, in some embodiments, the service provider may (e.g., when ingesting desktop applications for the benefit of its customers and their end users) transform desktop applications into virtualized application packages to be delivered to end users' computing resource instances, and those virtualized application packages may be executed on those computing resource instances without the end user having to install the desktop applications themselves on those computing resource instances.

In some embodiments, an application delivery agent (such as desktop application delivery agent 436 illustrated in FIG. 4) and a desktop application management module (such as desktop application management module 432) may be installed on the end user's computing resources instance 438. In various embodiments, computing resource instance 438 may be a physical computing device (e.g., a desktop or laptop computer, a tablet computing device, or a smart phone) or may be a virtualized computing resource instance (e.g., one that implements a virtual desktop instance). Desktop application delivery agent 436 (which may be a client component of desktop application fulfillment platform 420) may be configured to communicate with various fulfillment platform control place services 426 in order to fulfill requests to subscribe to, install, and/or execute applications selected through desktop application management module 432 or through another user interface mechanism (e.g., application icon 440 on desktop 434 or a start menu item). In other words, desktop application management module 432 is an application that may be installed on the end user's computing resource instance 438 to allow the end user to interact with desktop application fulfillment platform 420 through desktop application delivery agent 436. In some embodiments, desktop application delivery agent 436 may include a runtime engine component that is configured to execute the instructions of a virtualized application package 424 that is delivered (e.g., using demand paging) for a selected application.

As illustrated in FIG. 4, the service provider network may include physical and/or virtualized computing resource instances (e.g., computation resource instances and/or storage resource instances) that may be provisioned on behalf of the business, enterprise, or organization (and its end users). In some embodiments, these computing resources instances (shown as computing resource instances 428 on service provider network 430) may be configured to implement a remote computing application that allows end users to access applications executing on computing resource instances 428 as if they were installed and executing locally on their machine. For example, in some embodiments, one or more of these computing resources instances 428 may be configured to implement a virtual desktop instance (which may serve as the end user's computing resource instance 438) on which a desktop application delivery agent 436 and a desktop application management module 432 are installed. In such embodiments, desktop 434 in FIG. 4 may represent a view presented by the virtual desktop instance and may appear to the end user as if it were a desktop on the end user's local (physical) computing device. In some embodiments, service provider network 430 may also include storage resources outside of desktop application fulfillment platform 420 (which may be managed by a storage service implemented within service provider network 430) that are configured to store data utilized by desktop application fulfillment platform 420 (not shown). In various embodiments, application binaries, virtualized application packages, various tables that store information about applications and collections thereof, application state data, or other information used to provide on-demand delivery of desktop applications to end users may be stored outside of desktop application fulfillment platform 420 instead of, or in addition to, within desktop application fulfillment platform 420.

As illustrated in this example, desktop application management module 432 (through which the end user may select applications for installation or execution) may execute on the end user's computing resource instance 438, and a graphical user interface of desktop application management module 432 may be displayed on desktop 434. For example, this interface may present a list of applications for selection by the end user (e.g., in order to subscribe to, install, and/or execute an application). In addition, a shortcut or icon for an application (shown as element 440 in FIG. 4) may be displayed on desktop 434 and may be selected in order to launch the corresponding application (e.g., desktop application management module 432, or one of the applications delivered for execution on computing resource instance 438 in response to its selection, by the end user, within desktop application management module 432).

As described above, in some embodiments, an enterprise catalog service may operate in conjunction with (or may provide an interface to) a resource stack management service (such as resource stack management service 132 illustrated in FIG. 1). This service may help service provider customers (e.g., administrators and/or end users) model and set up service provider resources on which server products may run within the service provider network. Through a resource stack management service console (such as resource stack management service console 130), administrators may create a resource stack template that describes all of the service provider resources required for a particular tasks or server product (such as virtualized computing resource instances and/or database instances). Once the resource stack template is created, the resource stack management service may take care of provisioning and configuring those resources for the customer. Other resources that may be defined in a resource stack template include an auto-scaling component, a load balancer, or an additional storage service instance. Once a resource stack is no longer needed, it may be deleted, which deletes all the resources in the stack. In addition, a resource stack template may be modified by editing the definition or by creating a new version of the template that includes a different definition. For example, a resource stack template may be modified in order to include a higher performing computing resource instance type or to add additional storage resources.

As previously noted, an enterprise catalog service may operate in conjunction with (or provide an interface to) a resources stack template tool that may be accessed by an IT administrator or end user in a customer organization (e.g., through an administrator/management console or through an end user console such as resource stack management service console 130) to create a collection of interdependent resources that form a resource stack. The resource stack management service, enterprise catalog service, or another service provider service or platform may maintain and manage a catalog of resources that can be included in a resource stack.

In one embodiment, an IT administrator or end user in a customer organization may create, select or otherwise specify a template that defines a resource stack. The resource stack may comprise resources available from the service provider. The resource stack template may also include information about how the resources are to be linked together in the resource stack and how the resources are to be configured. When a resource stack is created, it may be created in accordance with the information contained in the resource stack template. For example, creating a server product from a resource stack template may include determining the dependencies between the resources and an order in which the resources should be instantiated (e.g., provisioned using service provider resources), dependent on the resource stack template. After successful provisioning and integration of the resources, the resource stack may be enabled for use.

In one example, at a newspaper company, in order to enable all of the reporters to have their own blogs, an IT administrator may make them all end users under the organization's service provider account. The IT administrator may access the enterprise catalog service (e.g., through an administrator/management console), through which the IT administrator may subscribe to a blog publishing package (server product), create a catalog or portfolio, add the blog publishing package to the catalog/portfolio, and then grant access to the blog publishing package to each of the end users (reporters). In this example, when the end users (reporters) access the catalog/portfolio (e.g., through the end user console), they would see the blog publishing package as an application that they can deploy. For example, an end user may select the blog publishing package (e.g., as an icon or shortcut), in response to which the resource stack management service may deploy the machine image for the blog publishing package (which may also include a database instance or other storage resource instance in addition to a computing resource instance). Once the blog publishing package has been deployed, the end user may begin using it to create their own blogs (blogs over which they have control). In some embodiments, the IT administrator may constrain the use of the blog publishing package, e.g., only allowing development on a computing resource instance of a certain size (e.g., a small instance with limited computing power), rather than on a larger computing resource instance (even if those are available to the newspaper company through their service agreement with the service provider). In another example, the IT administrator may be able to limit the amount of storage that each end user can consume (e.g., 10 Gb per end user).

In this example, for every blog that is launched by one of the end users (reporters), the enterprise catalog system may generate billing information for the IT administrator. For example, the IT administrator may be billed monthly for whatever number of blogs were launched during that month and for the use of the underlying service provider resources (e.g., computing resource instances and storage resource instances). In some embodiments, the service provider may collect usage fees from the customer organization and then pass along payments to any third party vendors from whom an application or server product was sourced. For example, in one embodiment, the service provider may keep fees associated with the hardware resources and/or virtualized computing resource instances on which the server product (e.g., a resource stack application) runs (i.e., fees for the use of the service provider's infrastructure), and a percentage of the fees associate with the application, passing the bulk of the fees collected for use of the server product (e.g., by one or more organizations and their end users) to the appropriate third party vendor(s), e.g., monthly or on any other suitable billing schedule. Note that, in some embodiments of the systems and services described herein, for software products sourced by third party vendors, there may be flexibility in the way that any applicable taxes on the software products or services are collected and paid (e.g., allowing collection by the service provider and/or payment to the appropriate taxing authority by the third party vendor, the IT administrator, or the service provider). There may also be some flexibility in which entity gets to set the prices charged to the customer for software products that are sourced by third party vendors (e.g., the service provider or third party vendor), with options for the service provider to bundle multiple software products together from different vendors and offer them to customers with discounted pricing.

In some embodiments, in order for the enterprise catalog service (or an underlying enterprise catalog service platform) to manage the ingestion, configuration, deployment, and on-going management of different types of software products (which are sourced from different independent software vendors or other entities) for end users who consume them on a variety of deployment platforms, the enterprise catalog service may maintain metadata of several different types for each of the software products that are available for deployment through the service, and the types of metadata maintained for the software products may vary by product type, by target system, or by source (e.g., by vendor). For example, for each of the software products, the enterprise catalog service may be configured to store (and subsequently use, e.g., for display purposes, for deployment purposes, or for determining pricing) the same combination of metadata elements or a different combination of metadata elements, which may include metadata elements reflecting any or all of the following types of information: offer information, a license type, subscription or licensing terms, a product format, resource requirements, an indication of the vendor or other sourcing entity, entitlement information, information indicating any constraints that are associated with a product, portfolio, or user, access management information, or information indicating one or more portfolios in which the product is included. In some embodiments, the metadata maintained for each of the software products may be dependent on the source of the product or on other characteristics of the product. For example, offer information (which may include a pricing type, a price, and/or taxing information for a specified product) may be maintained for products obtained from third party vendors, but not for the customer organization's own line-of-business products. In some embodiments, the metadata may include multiple offers for similar products from different sources, or one more than one offer for a single product, but not all of the offers may be discoverable by administrators or end users. In some embodiments, the metadata maintained for each of the software products may be filtered or sorted so that only products that an administrator or end user has permission to view/discover are presented and/or only a particular subset of the metadata maintained for those products is presented. For example, the enterprise catalog service may be configured to present only the technical details or business information that an administrator or end user needs to know and/or has permission to view. In one example, there may be three different offers for a particular software product: a three day free trial offer, a regular offer, and a volume discount offer, but the information that is presented to an administrator or end user may be sorted or filtered so that only the offers that the administrator or end user is eligible to receive can be viewed by the administrator or end user. In some embodiments, the enterprise catalog service may be configured to filter or sort the metadata that is maintained for various software products in order to present similar information to an administrator or end user (e.g., for use in comparing the products), even if the metadata maintained for the products is not of exactly the same type or format.

In some embodiments, the enterprise catalog service may be configured to take specific actions in response to changes to the specific metadata elements that are maintained for a particular software product. For example, if an offer for a software product changes, the service may be configured to apply the change immediately or after a delay, depending on the change. In this example, if the price goes down (e.g., if a new offer is available for the product that includes a lower price), the service may modify the offer that is received by an existing customer right away (or at the end of the next billing cycle). However, if the price goes up (e.g., if a current offer for the product is replaced by an offer in which the price is higher), the service may allow an existing customer to use the current offer for some period of time (e.g., 90 days) before notifying the customer of the change and/or modifying the offer through which the customer receives the product. In some embodiments, in addition to maintaining (and acting upon) different types of metadata for different software products, the enterprise catalog service may be configured to apply different packaging and/or software integration processes or mechanisms when ingesting or deploying products of different types or from different sources, which may include translating or otherwise transforming the products (or the product packages in which they are delivered) into a format that is suitable for ingestion by the enterprise catalog service from different vendors or for deployment to different or end user systems (e.g., systems that employ different hardware resources or operating systems).

Figure 5:
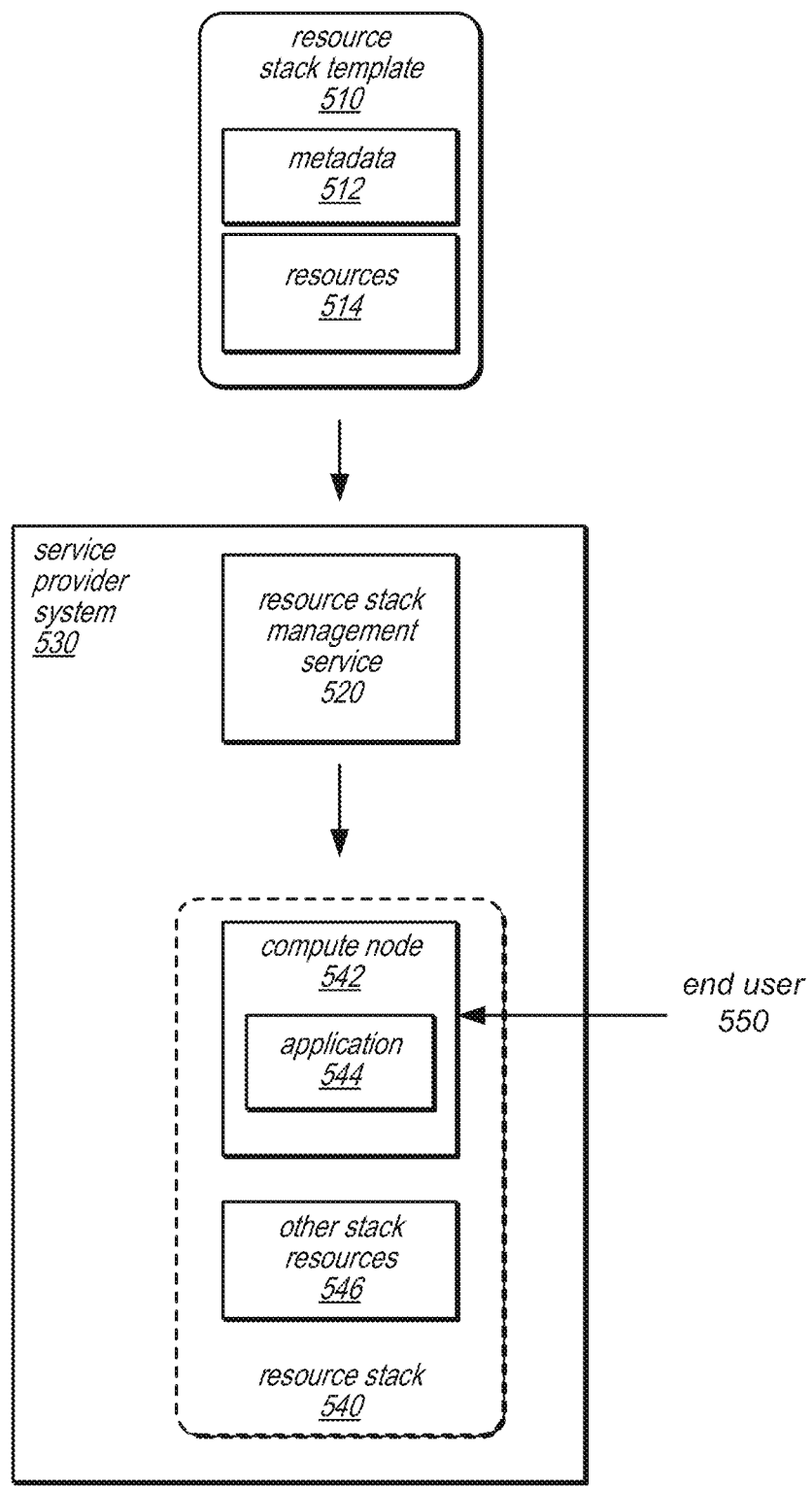
FIG. 5 illustrates the use of a resource stack template to build and deploy a server product, according to at least some embodiments.

FIG. 5 illustrates the use of a resource stack template to build and deploy a server product, according to at least some embodiments. As illustrated in this example, a client of a service provider system 530 may provide a resource stack template 510 that defines the resources 514 that will be used to execute a server application (e.g., a server product) on behalf of an end user of a service provider customer and a set of metadata 512 for the resource stack. For example, the resources may include one or more compute node instance (or other modules) that will be used to execute the server application, a set of database instances that will store the data processed by the server, load balancers for distributing request traffic or other resources, and the metadata may include configuration files (which may contain the identities and/or setting for various resources of the resource stack), connectivity/dependencies, user identity and/or permissions information, alarms, tags, or other information. In some embodiments, the resource stack template may be received from an IT administrator of a service provider customer (e.g., through a service provider management console such as service provider management console 106 illustrated in FIG. 1) or from an end user (e.g., through a resource stack management service console such as resource stack management service console 130), either of which may expose a resource stack template authoring tool with which the resource stack template was created.

In some embodiments, in response to receiving the resource stack template 510, the service provider system 530 (or, more specifically, a resource stack management service 520 that is implemented on the service provider network) may parse the template and build the stack of resources 514 that are defined in the template 510 and that will be used to execute the server application (shown as resource stack 540). For example, in some embodiments, the resource stack management service 520 may include a resource provisioning system that is configured to instantiate the resources defined in the template 510 to create resource stack 540. In some embodiments, building the resource stack 540 may include instantiating at least one computing resource instance (e.g., compute node 542) that will execute the server application 544 and manage its runtime environment, and may include one or more other stack resources (shown as stack resources 546). The compute node 542 may be a virtualized computing resource instance that has a predefined computing capacity and/or memory capacity. In some embodiments, the compute node 542 may be loaded with an operating system, configuration files, or other resources that are pre-installed on the compute node 542 when it is instantiated. In some embodiments, the computing resource instance may include an initialization script that will be used to apply the metadata 512 defined in the resource stack template 510 to the compute node 542 and/or application 544 when the application is launched on resource stack 540 by end user 550 (e.g., through its selection within a GUI of a resource stack management service console such as resource stack management service console 130 illustrated in FIG. 1). Note that, in some embodiments, service provider system 530 may also include other services that interact with the resource stack (e.g., an identity management service or other security/authorization services).

Administrator Tasks

As previously noted and described in more detail below, in order to manage the delivery of software products to end users, an IT administrator of a business, enterprise, or other organization may be able to perform a variety of different actions through an administrator console of an application fulfillment platform (such as service provider management console 106 in FIG. 1 or service provider system console 422 in FIG. 4), many of which fall into one of the following three broad categories:

1) Building a catalog for the organization, where the catalog is a collection of software products that may include any of the following product types:
   the organization's own line-of-business (e.g., custom) applications
   desktop applications or server products for which the organization has purchased licenses, including enterprise-wide licenses (e.g., products that may be included in the catalog under a "bring your own license" model)
   desktop applications or server products purchased or leased from the service provider (e.g., products that were developed by the service provider or that were purchased or leased by the service provider for the benefit of its customers)
2) Assigning particular software products to specific end users and/or user groups in the same organization
3) Generating, obtaining, and/or viewing reports indicating the usage of the software products that are provided through an application fulfillment platform or resource stack management service to end users in the same organization As noted above, the systems and methods described herein for implementing an application fulfillment platform may, in various embodiments, allow large enterprises to create and manage catalogs (or portfolios) of software applications and computation services, including server applications that execute in a cloud computing environment and desktop applications that execute on physical computing devices, virtualized computing resource instances, and virtual desktop instances. These systems may allow service provider customers (e.g., enterprises) to ingest their own line-of-business applications (e.g., server applications and/or desktop applications) into the catalogs (or portfolios), through which they may be made available for use by their end users. In some embodiments, an IT administrator of a service provider customer may interact with the service provider system through an administrator console to assign and provision applications to various end users and/or to define constraints on the use of those applications. This may include invoking operations or workflows of a resource stack management service (in the case of server applications) or an application fulfillment platform (in the case of desktop applications to be executed on an end user's physical computing device or virtual desktop instance).

In some embodiments, a company that wishes to use one or more applications for software trials, short-term needs or low-volume needs may obtain access to those applications through an "applications on-demand" model that is managed through the application fulfillment platform (thus, taking advantage of the more favorable terms that may be received by the service provider as a higher volume customer of the application vendor). In some embodiments, the company may obtain access to server products under a similar "services on-demand" model that is managed through the resource stack management service.

As noted above, in some embodiments, desktop applications (e.g., individual applications and/or collections of applications) and/or server products may be assigned by an IT administrator to individual users and/or user groups in an active directory to allow access to those applications. For example, an active directory of an enterprise (e.g., a company that is a customer of a service provider) may sit at the center of its resource management processes. Resources (e.g., users, computers, printers, or other corporate resources, each of which may have its own identifier) may be connected to the active directory, and an IT administrator at the company may give users access to particular ones of the resources. In some embodiments, an IT administrator may create a cloud-based active directory for the enterprise. In other embodiments, connections may be made from a virtual desktop instance to an active directory on an enterprise computer system.

In some embodiments, the IT administrator may, through an administrator console (e.g., a service provider system console) assign particular desktop applications and/or server products to specified users (and/or user groups) by selecting one or more users and/or user groups in its active directory from a display of the active directory (or through another interface into the active directory). For example, the IT administrator may be able to assign applications (e.g., one or more desktop applications, such as an office productivity suite, a data analysis application and/or a browser application) or server products (such as a website design package or blog publishing package) to the selected users and/or user groups (e.g., groups of users that are defined in the active directory, such as a "development team" or "legal team"). In another example, an IT administrator may wish to provision a desktop application (e.g., a word processing application) to user1, user2, and group1 in an active directory. The actions taken in order to carry out that fulfillment may depend on the type of application. In this example, since the application is a desktop application that is available through an application fulfillment platform, the IT administrator may (e.g., through an administrator console) assign the desktop application to user1, user2, and group1, and fulfilling the intended state for user1, user2, and group1 may include invoking various workflows of the application fulfillment platform. In another example, if a server product (e.g., a server-side application that executes on a pre-defined stack of a service provider resources on behalf of an end user and returns a response) is to be provisioned to user1, user2 and group1, fulfilling the server product may include invoking workflow of the resource stack management service.

In some embodiments, the IT administrator may, through an administrator console (e.g., a service provider system console) also be able to apply various constraints on the use of selected desktop applications and/or server products by end users or user groups to which these products are assigned (either individually, or collectively), or by all users (or all users within a given customer organization). For example, in various embodiments, the constraints that may be applied by the IT administrator may be broadly categorized as being one of the following four types: environmental constraints (which may restrict the region in which a product can be provisioned), input parameter constraints (which may restrict the set of valid values for input parameters that can be entered when a software product is provisioned or updated), quotas (which may allow the administrator to control the number of concurrent deployments of a given software product) and billing constraints (which may allow the administrator to control spending limits on an product by product basis). In some embodiments, constraints may applied at multiple levels (e.g., per product per user or user group, per product catalog or portfolio, or at one level for some catalogs/portfolios or users and at another level for other catalogs/portfolios or users. For example, when constraints are applied to a catalog or portfolio, all users who have access to that portfolio will have same constraints and permissions on the products in the catalog or portfolio by default, but there may also be some specific constraints for particular product/user combinations. For example, one user may have to select a radio button element of a GUI presented by an end user console in order to install a particular product. For other users, the product may automatically appears on their system under an "auto-deploy" setting selected for the user. In this example, required software products may be automatically installed by default, while optional products may be "user initiated". In another example, a product level constraint may specify that no one customer or user can install more than 10 copies of a particular product (e.g., because of the number of licenses the organization has purchased) or may specify that a particular product must be launched using a specified computing resource instance type (e.g., regardless of the user on whose behalf the product is launched).

In yet another example, the collection of three applications described above may be assigned to three active directory users, one of which may represent a user group. In this example, constraints may be set indicating that user1 should use a particular version of application) (e.g., an office productivity suite) and should not have access to any updated versions of application); that user2 should use a particular version of application2 (e.g., a data analysis application) that is compatible with a particular operating system revision and should not have access to any updated versions of application2; and that user3 (which may represent a group of active directory users) may have access to application3 (e.g., a browser application) that should always be kept current (e.g., with updates applied automatically, when available).

As previously noted, an administrator may define rules that limit the parameter values that a user can enter when they use a product. These rules define input parameter constraints. Other constraints may be attached to a catalog or portfolio of software products, and may apply to all products in the catalog/portfolio or to individual products within the catalog/portfolio. In some embodiments, constraints may be associated with IAM users, groups or roles allowing an IT administrator to restrict the service provider resources that can be created by specific end users or groups of users. The constraints that are enforced when provisioning a product or updating a product that is being used may be evaluated by combining all of the constraints from the catalog/portfolio or product, and the intersection of all the constraints may be enforced (e.g., by a desktop application fulfillment platform, resource stack management service, or other product fulfillment or delivery platform) when the user is provisioning the product. In some embodiments, the most restrictive set of constraints may be applied when different sets of constraints have been selected for a given user or software product. For example, if a product may allow all computing resource instances to be launched, and a catalog or portfolio that contains the software product may have a constraint that allows all non-GPU computing resource instances to be used, but the user has a constraint that only allows tiny and extra small computing resource instances to be launched, then the effective constraint used when that user provisions that product from that portfolio will be the constraint that only allows tiny and extra small computing resource instances to be launched. In other embodiments, the least restrictive combination of rules may be applied when different constraints or sets of constraints have been selected for a given user or software product, or the rules defined in different constraints or sets of constraints may be aggregated according to a pre-determined function for combining them (e.g., as defined by an IT administrator).

As noted above, in some embodiments, the IT administrator may, through an administrator console (e.g., a service provider system console) be able to generate, obtain, and/or view reports indicating the usage of the desktop applications and/or server products that are provided through the service to their end users. For example, these reports may indicate how many (and/or which) users are using each software product, how many (and/or which) users are using each version (e.g., the latest version or an outdated version) of a particular software product, the duration for which each software product is used by one or more users, and/or other usage information. The information in these reports may be used by the IT administrator to determine which of several available licensing models (e.g., on-demand subscriptions/leases using licenses obtained by the service provider, enterprise licenses obtained directly from the software vendors but managed by the service provider, etc.) may be most suitable for the software being used by their organization.

As described in detail herein, IT administrators (or other privileged users) within service customer organizations may create and populate portfolios, add customer-generated or customer-licensed software products to those portfolios, assign software products (or entire portfolios) to particular end users (or to end users with particular identity and access management roles), apply constraints on the use of individual software products (including those that are included in one or more portfolios), and monitor the usage of software products, all for the benefit of their organizations and end users. In some embodiments of the enterprise catalog service platforms and software product deployment platforms described herein (including desktop application fulfillment platforms 126 and/or resource stack management service 132 in FIG. 1), the term "portfolio" refers to a particular resource type that is supported by these platforms. For example, a portfolio resource type may be defined as a container that stores a collection of products (or product listings), usage policies (e.g., constraints or groups of constraints) that govern how the products will be consumed (e.g., rules about how they can be launched and by whom), and permissions. The permissions associated with a portfolio may dictate which users and/or groups of users have been granted access to the portfolio and its contents. In other words, in systems that support this resource type, the use of portfolios may allow the IT administrators within a service provider customer organization to specify exactly which users will have access to a specific set of products or which permission sets will be required to have access to a specific set of products.

In some embodiments, IT administrators may create portfolios that are specific to a particular type of product or to products with particular licensing model. For example, a portfolio may be configured by the IT administrator to contain only server products (e.g., server products that are defined by, and built from, resource stack templates) or only desktop applications (such as the virtualized application packages described herein). In other embodiments, IT administrators may create portfolios that contain a mix of offerings (e.g., both server products and desktop applications). Note that, in some embodiments, a given software product may be included in more than one portfolio. In such embodiments, the constraints on the given software product may be different for the portfolios. In other words, when one user has access to the software product through a portfolio to which they have been granted access, the use of the software product by that user may be constrained in certain ways. However, when another user has access to the same software product through a different portfolio (one to which the other user has been granted access), the use of the software product by the other user may be constrained in different ways (or according to a different combination of constraints) than the ways in which its use was constrained for the first user.

In some embodiments, an IT administrator may create portfolios on an enterprise catalog service platform through an interface presented by a service provider management console (such as console 106 in FIG. 1). When creating a portfolio, the IT administrator may specify the name for the portfolio, the owner of the portfolio (e.g., in embodiments in which the owner does not default to the creator), a description of the portfolio and/or one or more tags. In some embodiments, specifying tags for a portfolio may enable an IT administrator to identify and categorize portfolios and/or may be used in identity and access management policies to allow or deny access or to restrict operations that can be performed by various identity and access management users, groups, and/or roles. As described in more detail below, portfolios themselves may be shared with other accounts and may be replicated across regions and/or IT administrators, in some embodiments.

As previously noted, in various embodiments, an enterprise catalog service "user" may represent an identity and access management role (e.g., a child account of a root account for a service provider customer or service provider customer organization) or may be an end user in a customer organization (e.g., an active directory user), and the enterprise catalog service may support groups of both of these types of users (e.g., active directory groups or identity and access management groups).

As previously noted, an IT administrator of a service provider customer organization may (e.g., during creation or configuration of a portfolio, when adding a product to an existing portfolio, or at other times) specify that particular constraints or sets of constraints (e.g., constraint groups) should be applied on the use of the product (e.g., by all end users who have been granted permission access the product), on the use of the product by end users who access the product through the permissions granted to them to access a portfolio that contains the product, on a portfolio itself, on a user associated with a portfolio, and/or on a specific user that has been granted access a specific portfolio, according to various embodiments. In some embodiments, all such constraint information (which is not be confused with any constraints that are applied to a specific product during its own creation, such as a constraint on a resource stack template) may be stored by the enterprise catalog service at the portfolio level. In other words, the enterprise service catalog may support constraints that are applied in various combinations mappings between portfolios, products, and users, under one-to-many and/or many-to-many scenarios (e.g., constraints that apply to many products in a portfolio, or that apply to many users who have permission to access the products in a portfolio). As described in more detail below, in some embodiments, constraints may be shared across product versions, portfolios, or service provider customer accounts.

In various embodiments, if an end user has been granted access to a portfolio, the end user may (by virtue of this permission) also have permission to launch the products that are included in the portfolio, with the launch of the product being performed in accordance with the portfolio-level, product-specific, and/or user-specific constraints that have been defined for the portfolio by its creator/owner and that are included in the portfolio. In other words, when product is launched, all active constraints for the product (e.g., limitations on the types or sizes of the computing resource instances on which it may be launched, on the regions in which it may be launched, or on the number of times it may be launched by a user or by all users). As noted above, in some embodiments, some server products that are managed through the enterprise catalog service and that are built according to resource stack templates may be launched in accordance with any additional constraints that are specified in those resource stack templates (e.g., constraints that were added by the IT administrator(s) that created those resource stack templates). As described herein, in some embodiments, even though end users may be able access products that are included in particular portfolios (containers) to which they have been granted access (e.g., to discover and launch them), the end users may not have any knowledge of the portfolios to which they have been granted access or even that such portfolios exist (as a concept) in the enterprise service catalog platform.

FIGS. 6A-6D illustrate examples of the information presented through a service provider console of an enterprise catalog service, according to at least some embodiments. For example, FIGS. 6A-6D illustrate information presented by a graphical user interface (GUI) 600 for a service provider console of an enterprise catalog service to an IT administrator of a service provider customer. Note that in some embodiments, the IT administrator may access the service provider console through a browser application (e.g., as a web page). As illustrated in FIGS. 6A-6D, GUI 600 may present different views in order for the IT administrator to manage desktop applications, server-side products, or product subscriptions (which may include product licenses); to generate and/or view reports (e.g., desktop application usage and/or server product deployment reports); to create and configure portfolios, or to add products, constraints, and users to portfolios; to search for products; and to view (and, in some cases, take action in response to) various notifications (e.g., from other components of the enterprise catalog service platform or components of other platforms and services with which the enterprise catalog service platform interacts).

In some embodiments, an IT administrator may (upon first logging into the enterprise catalog service) be presented with an interface through which they are instructed to create at least one portfolio. In other embodiments, an IT administrator may choose to do this later (e.g., after discovering and subscribing to one or more products for the subsequent use of their end users).

FIG. 6A illustrates information presented by GUI 600 on behalf of the enterprise catalog service. In the example illustrated in FIG. 6A, an administrator or buyer identified as "Central IT Admin" has logged into the enterprise catalog service, e.g., through a service provider management console. In this example, the IT administrator or buyer has selected an option "create portfolio." Other options available from this display include "ingest products" and "assign products to users", each of which may present information that is different than the information depicted in FIG. 6A. As illustrated in this example, in order to create a new portfolio, the IT administrator or buyer may enter a portfolio name, a description of the portfolio, and (optionally) an identifier of the portfolio owner and/or one or more tags for the portfolio into various text boxes of GUI 600, and may specify the portfolio type using a radio button user interface element. For example, the IT administrator or buyer may indicate whether the new portfolio will include a collection of desktop applications or a collection of server products. In some embodiments, both desktop applications and server products may be included in a single portfolio.

Figure 6D:

In this example, the IT administrator or buyer has indicated that the new portfolio, which has been named "Bob's team", will include only server products, and that it includes "software for project XYZ", which, apparently, will be used by end users in the customer organization that are members of Bob's team. As illustrated in this example, in some embodiments, the IT administrator or buyer may also be able to use radio button user interface elements to select from among various portfolio-level configuration parameter settings and/or policy options for the new portfolio (which may include default polices that may be applied to the products included in the new portfolio), e.g., settings specifying that the prices of server products will be displayed (e.g., when the product names are displayed or in search results), that minor revisions to products in the portfolio (but not major revisions) should be applied automatically (with notifications received for major revisions), and that the default installation policy for the server products in the portfolio (which may be overridden on a product basis, in some embodiments) is that that the products are optional. After making these selections, the IT administrator or buyer has opted to create the portfolio by selecting a user interface element "Create and Continue", as shown near the bottom right corner of the display. Note that in other embodiments, the IT administrator may not be able to select portfolio-level configuration parameter settings or policy options for the new portfolio (nor any default polices that will be applied to all of the products included in the new portfolio). For example, in some embodiments, these types of selections may be made on a product basis, rather than on a portfolio basis. In still other embodiments, these and/or other selections may be made through a separate portfolio configuration operation, rather than as part of the operation to create the portfolio. In this example, after selecting the "Create and Continue" option, the IT administrator may be presented with one of several screens, each of which may allow the IT administrator to configure a different aspect of the portfolio, through the selection of various configuration options and/or the specification of various configuration details. Examples of some of these screens are illustrated in FIGS. 6B-6D, according to various embodiments.

FIG. 6B also illustrates information presented by GUI 600 on behalf of the enterprise catalog service. In this example, the IT administrator or buyer identified as "Central IT Admin", as the owner of the portfolio "Bob's team", is authorized to add products to this portfolio. In some embodiments, this IT administrator or buyer may be the only member of the customer organization who is authorized to add products to the portfolio. In this example, the IT administrator or buyer has selected an option to add products to a portfolio (more specifically, to add "server products" to the recently created portfolio that is named for "Bob's team", as indicated by the selection of the corresponding tab near the top of the display). Other options available from this display include "desktop applications" and "subscriptions", each of which may present information that is similar to, but not necessarily the same as, the information depicted in FIG. 6B for adding desktop applications to the portfolio or to add subscriptions to the portfolio (e.g., to add access to a desktop application or server product to which the IT administrator has a subscription on behalf of the organization), respectively.

The information presented in this example includes, in one portion of the display, a list of server products, along with the vendors that developed or published the server products (or their resource stack templates) and/or from which they were obtained, pricing information, and indications of the last time the products were updated. In this example, the IT administrator or buyer has selected website design package A, version 3, from vendor ABC. Another portion of the display includes information about options for filtering the list of server products that are presented, and the IT administrator or buyer has selected filtering options to limit the list of server products to web publishing products that are priced according to a monthly fee schedule, and that are compatible with an operation system A version 4.1 (i.e., the latest available version of OS A). In the example illustrated in FIG. 6B, this portion of the display also includes an option to view line-of-business services (e.g., server products that were developed by the service provider customer organization itself). In this example, after selecting website design package A, version 3, the IT administrator or buyer may opt to "Select and Continue", as shown near the bottom right corner of the display. In some embodiments, selecting this product and continuing may initiate the addition of the selected product to the portfolio (in this case, the recently created portfolio that is named for "Bob's team"), as described herein.

FIG. 6C illustrates information presented by GUI 600 on behalf of the enterprise catalog service after the IT administrator or buyer identified as "Central IT Admin" (as the owner of the portfolio "Bob's team") has selected an option to add constraints to the portfolio (e.g., through one of the portfolio detail screens available to the IT administrator or buyer). In this example, the IT administrator or buyer has already added products and users to the portfolio, and is in the process of adding constraints to one or more products in the portfolio. More specifically, the IT administrator or buyer has selected an option for adding input parameter constraints to the portfolio. Other options available from this display include options for adding "environmental" constraints, "quotas", or "billing" constraints, the selection of which may present information that is similar to, but not necessarily the same as, the information depicted in FIG. 6C for adding input parameter constraints to the portfolio. In some embodiments, the user interface illustrated in FIG. 6C (and similar interfaces for adding "environmental" constraints, "quotas", or "billing" constraints) may allow the IT administrator or buyer to control the conditions under which one or more of the products in the portfolio can be launched. For example, the constraints that are added to a product within a portfolio may restrict the region in which a server product can be launched or the size of the machine on which it can be launched even if the resource stack template for the product would have allowed other options.

As shown in the portion of the display on the left side of FIG. 6C, the IT administrator or buyer has chosen to place input parameter constraints on website design package A (e.g., the server product selected in FIG. 6B) for all end users who have access to this software product by virtue of their access to the portfolio "Bob's team". As described herein, input parameter constraints may (among other things) be used to restrict a resource type for a server product to a specific instance type or size, or to place an upper or lower limit on the instance size or capacity for a product. In this example (as shown by the shaded boxes in the portion of the display on the right side of FIG. 6C), the IT administrator or buyer has chosen to the restrict the front end resource instance type for this product to a specific instance type (e.g., "B-med"), to place an upper limit on the instance type for the middle tier resource instance for this product (e.g., "C-xlarge"), to require that the product support both HTML and XML data types (which may have been selected through text boxes or pull-down menus), and to place an upper limit on the number of users that the product needs to support (e.g., 100,000 users). After making these (and, potentially, additional) selections, the IT administrator or buyer may choose "Select and Continue" to complete this task and move on to another. Note that, in various embodiments, the enforcement of these and other types of constraints that have been added to software products (e.g., products that may or may not be included in a portfolio) may be the responsibility of the fulfillment and/or deployment mechanisms through which they are delivered and launched (e.g., a desktop application fulfillment platform or resource stack management service).

FIG. 6D illustrates information presented by GUI 600 on behalf of the enterprise catalog service after the IT administrator or buyer identified as "Central IT Admin" (as the owner of the portfolio "Bob's team") has selected an option to add users and permissions to the portfolio (e.g., through one of the portfolio detail screens available to the IT administrator or buyer). More specifically, through this interface, the IT administrator or buyer may select one or more user identities (e.g., active directory users) to whom access to the portfolio should be allowed, and the IT administrator or buyer has chosen (using multiple check box elements) to add Charlie L., Gerry G., and Jenny B. to the portfolio "Bob's team", granting them permission to discover and launch the products that are contained in the portfolio, as well as any products that are subsequently added to the portfolio. Other options available from this display include options for adding "user groups", or "identity & access management roles", the selection of which may present information that is similar to, but not necessarily the same as, the information depicted in FIG. 6D for adding active directory users to the portfolio. In this example, the IT administrator or buyer may or may not have already added products and/or constraints to the portfolio.

Note that the graphical user interface 600 for a service provider console of an enterprise catalog service may, in other embodiments, display more, fewer, or different elements than those illustrated in the examples shown in FIGS. 6A-6D. In addition, the user interface elements included in a graphical user interface for a service provider console of an enterprise catalog service may, in other embodiments, take different forms (e.g., as menu items, icons, radio buttons, text boxes, check boxes, or other user interface element types) and/or may be arranged in a different order or in different positions within the GUI than the order or positions in which they are arranged in FIGS. 6A-6D.

In various embodiments, an enterprise catalog service platform may support portfolios, where a portfolio acts as a container for software products, as described herein. At any given time, a portfolio may have zero or more products in it, and a software product may be in multiple portfolios. As described above, administrators may create portfolios, add products to them, and, using identity and access management (IAM) permissions, publish portfolios to make them visible to users. In some embodiments, the portfolios that are created in a particular customer account may be visible to all IAM users in the account. Typically, an IT administrator of a customer organization may create multiple portfolios, each of which may include different products and access permissions that are customized for specific types of end users. For example, a portfolio for a development team will likely contain different products than a portfolio that is created for a sales and marketing team. As noted above, a single product may be published to multiple portfolios, and may have different access permissions and/or usage constraints in each of the portfolios.

In various embodiments, end users may have access to any number of portfolios, as specified by their IT administrators. By default, a user with access to a portfolio may have access to all of the products that it contains. In some embodiments, portfolios can be shared with users in one or more other service provider accounts. For example, a central IT administrator for a customer organization who wished to have control over all of the software products used in the organization may create one or more portfolios and share some or all of them with subordinate IT administrators (e.g., in different regions or sub-organizations). When a portfolio is shared with another account, the portfolio creator/owner may retain ownership and control of the portfolio and only the portfolio creator/owner can make changes to that portfolio (e.g., adding new products or updating products with new versions). In some embodiments, a portfolio may also be "unshared" at any time. In such embodiments, any products currently in use may continue to run, but may not be accessible once they have finished running. In some embodiments, to share a portfolio with another customer account, the portfolio creator/owner may (e.g., directly or through a service provider management console) send a "share my portfolio" request to the user account with which the portfolio is to be shared. The owner of that account (i.e., the recipient of the sharing request) may approve the sharing request and respond with an IAM role that the portfolio creator/owner can use to grant permissions for the portfolio to the recipient account. In other words, in some embodiments, the portfolio creator/owner may use IAM roles to control access to portfolios and the products contained in those portfolios.

In some embodiments, each portfolio and each product within a portfolio may have a unique resource identifier (e.g., a "portfolio key"), which may be used to enables access control through various IAM policies. For example, an IT administrator may create IAM policies that grant or deny permission to IAM users, groups, or roles for creating and managing portfolios, provisioning products from a portfolio, or updating or deleting products that have been provisioned. In various embodiments, IAM policies may be applied to portfolios, products, computing resource instances (e.g., virtualized computing resource instances) and resource stacks, as well as to individual IAM users, groups, or roles. By using a unique resource identifier ("portfolio key") and one or more tags, the IT administrator may be able to limit access and/or control the operations that can be performed on individual resources or on sets of portfolios, products, computing resource instances, or stacks. In some embodiments, only IT administrators or other privileged users (principals), such as those with root permissions, can create and edit portfolios, add products to portfolios, and set permissions and constraints for a portfolio and/or the products they contain. In general, the root account that creates a portfolio has access to the portfolio, but none of the users within that IAM account or across IAM accounts may have access to the portfolio until or unless they are explicitly granted access to that object by the root account (e.g., the creator/owner of the object).

In various embodiments, access management policies (and/or usage constraints) may be applied to an entire portfolio, or to an individual product or product type. The portfolios (the grouping) and the access management policies and/or groups of constraints that are applied to the grouping may be mutable and may be shared between accounts, in some embodiments. In some embodiments, the smallest atomic unit of software resources may be an application, and a portfolio may represent a logical collection of applications.

In various embodiments, actions that can be taken on a portfolio may include one or more of the following:
1. Create
2. Read
3. Search/filter
4. Update (add/remove Products, update policy)
5. Share
6. Delete As described above, in some embodiments, the IT administrator may (e.g., through a service provider console for IT administrators) assign resources (in this case, applications) directly to individual users or user groups. In other embodiments, rather than assigning each individual application to various users and/or user groups, a collection of applications (e.g., a logical collection of applications that are included in a defined portfolio) may be assigned to users or user groups. For example, a portfolio may be created for the use of a legal team that includes a set of office productivity applications, legal software, and compliance management software, and the portfolio may (collectively) be assigned to the active directory user group "legal team". In this example, in addition to (or stead of) assigning the portfolio to the legal team (on whose behalf it was created), the portfolio may be assigned to one or more other active directory users and/or user groups with similar software requirements, roles, and/or permissions to access the software included in the portfolio.

In some embodiments, an IT administrator may select one of two or more options indicating when updates are applied to users of a particular portfolio. In such embodiments, if a new employee joins a company, the IT administrator may assign them to the portfolio, and the required software products may be automatically delivered to their physical computing device or virtual desktop instance. If an IT administrator adds a product to a portfolio or removes a product from a portfolio, the portfolio may be updated automatically. In some embodiments, the IT administrator may also be able to set the update window for minor updates, major updates, and hot fixes for the products in a portfolio at the portfolio level. This setting may apply to all products in the portfolio. In some embodiments, the IT administrator can also choose whether or not to make the entire third party product catalog available for a user to view, after which the end user may submit a request to access one or more of the software products discovered in this manner.

In some embodiments, at the product level, the IT administrator can designate a product as being required or optional, and can set a maximum number of installs (deployments) for a product. For example, the IT administrator can define the maximum number of times that a given product can be provisioned from a portfolio, and the enterprise catalog service may enforce this constraint, ensuring that the limit is not exceeded. Required products are automatically installed, but end users may choose whether or not to install optional products.

In some embodiments the IT administrator may receive new product notifications as a weekly digest and may also see lists of new products from within the administrator/management console of the enterprise catalog services described herein. In some embodiments, all products that were recently released (e.g., released within the last seven days) may be highlighted a displayed list of products as being "New".

In some embodiments, an IT administrator may be able to get detailed reports on two different levels. For example, the IT administrator may receive an enterprise report, which includes a list of all software products that includes, for each product, the product name, the vendor, license type (e.g., subscription), installs (e.g., the number of deployments), the number of out-of-date installs, a cost per install per month, the percentage of installations that are up-to-date, the total spend, the number of users, the top rated products, or the number of portfolios. The second report may reflect usage at the portfolio level, and may include, for each product in the portfolio, information indicating the portfolio name, the number of products in the portfolio, the assigned users, the cost per user per month, and the total cost. Some example portfolios may include an HR portfolio, an engineering portfolio, a finance portfolio, a shared services portfolio, or a customer service portfolio.

Figure 7:
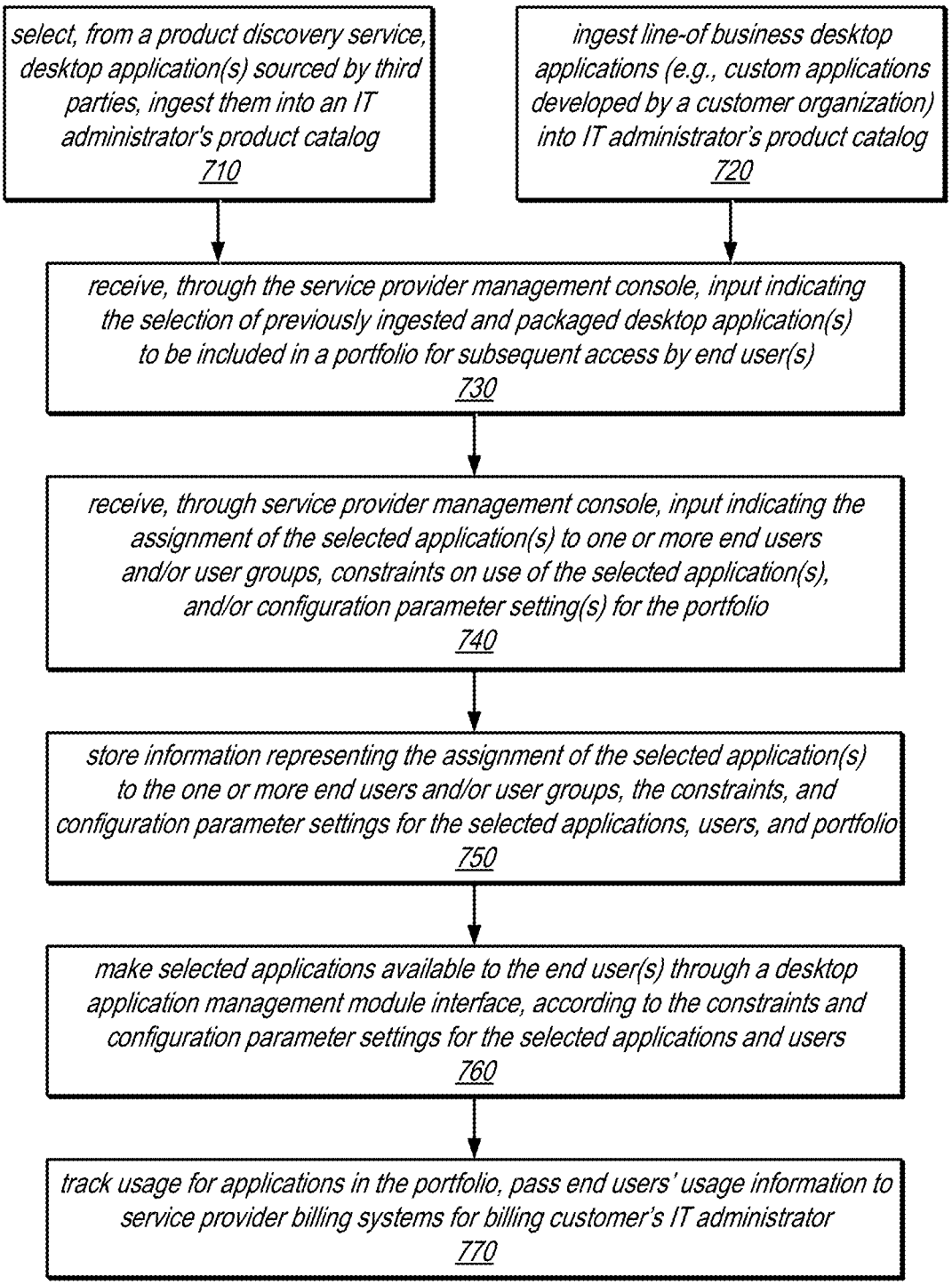
FIG. 7 is a flow diagram illustrating one embodiment of a method for managing desktop applications through an enterprise catalog service.

One embodiment of a method for managing desktop applications through an enterprise catalog service (such a service implemented by the system illustrated in FIG. 1) is illustrated by the flow diagram in FIG. 7. As illustrated at 710, in this example, the method may include an IT administrator of a service customer organization selecting, through a product discovery service interface that presents information about desktop applications that are sourced by third parties through the product discovery service, one or more desktop applications to be purchased or licensed from a third party (e.g., a software vendor) on behalf of service provider customers. In various embodiments, the selection may be dependent on technical features (e.g., capabilities of the application and/or resources required to execute the application), a pricing breakdown, the applicable terms of use (e.g., licensing or subscription terms), ratings and/or reviews, the availability of support from the vendor and/or other information. The method may include ingesting and/or packaging the selected third party desktop application(s) into a product catalog owned by the IT administrator for management through the enterprise catalog service. For example, in some embodiments, the IT administrator may discover and select one or more desktop applications (e.g., applications that were developed and/or published by the service provider and/or by third parties) to be offered to their customers and may package and/or publish the desktop applications as isolated virtualized applications (e.g., each packaged in its own container) for subsequent delivery to end users through an application fulfillment platform. As illustrated at 720, in this example, in some embodiments, the method may include ingesting into the IT administrator's product catalog, one or more custom desktop applications (e.g., a line-of-business applications) that were developed by the customer organization, e.g., using a desktop application authoring and ingestion component (such as desktop application authoring and ingestion tooling 116 in FIG. 1) that is exposed to the IT administrator through the service provider management console.

As illustrated in this example, the method may include receiving, through the service provider management console, input indicating the selection of one or more previously ingested and packaged desktop applications to be included in a portfolio for subsequent access by particular end users of a service provider customer (as in 730). For example, in various embodiments, the desktop applications may be selected for inclusion in a private catalog or portfolio that may only be accessible to a subset of the end users of the service provider customer. In one example, the input may be received from an IT administrator of a business, enterprise, or other organization that receives services through the enterprise catalog service platform and/or an application fulfillment platform (i.e., an organization that is a service provider customer). In this example, the IT administrator may log into the system provider management console in order to create and/or manage one or more portfolios of applications for the use of some or all of the members of their organization. In various embodiments, the selection of desktop applications may be made by the IT administrator, and may be dependent on technical features (e.g., capabilities of the application and/or resources required to execute the application), a pricing breakdown, the applicable terms of use (e.g., licensing or subscription terms), ratings and/or reviews, the availability of support from the vendor and/or other information, including organizational needs, goals, or policies.

As illustrated in this example, the method may also include receiving, through the service provider management console, input indicating the assignment of the selected application(s) to one or more end users and/or user groups, constraints on the use of the selected application(s), and/or configuration parameter setting(s) for the portfolio, as in 740. For example, in some embodiments, constraints and/or configuration parameter settings may be specified as part of an operation to assign applications to particular users or user groups. In other embodiments, constraints and/or configuration parameters may be specified as part of a separate interaction between the IT administrator and the console (e.g., as part of a portfolio configuration operation), and information indicating the constraints and/or configuration parameter settings may be received as separate inputs through the service provider management console. In some embodiments, the constraints may indicate which (if any) of the applications in the portfolio are required to be installed by end users and which (if any) are optional. In some embodiments, the configuration parameter settings may indicate whether monitoring should be enabled for the portfolio (and/or particular applications in the portfolio) or may indicate whether end users have the option to view lists of applications that are not assigned to them and/or that are not currently available in the portfolio (e.g., third party applications that may be available through the application fulfillment platform). As described above, other types of constraints that may be applied to individual desktop applications may include environmental constraints, input parameter constraints, quotas, and/or billing constraints, in at least some embodiments.

As illustrated in this example, the method may also include storing information representing the assignment of the selected applications to particular end users and/or user groups, the constraints, and configuration parameter settings for the selected applications, users, and portfolio, as in 750. For example, this information may be stored in any of a variety of data structures or database tables by a storage service implemented on the service provider network. The method may also include making the selected applications available to the end user(s) through a desktop application management module interface, according to the constraints and configuration parameter settings for the selected applications and users, as in 760. In some cases, this may include installing any required applications and/or making certain applications (e.g., those applications that are assigned to a particular end user or those an end user is allowed to know about) visible and/or selectable through a desktop application management module interface or (once they are installed on an end user machine or in a virtual desktop instance) through an icon, shortcut, menu element, or other user interface mechanism or element thereof that was created on the desktop for the application and whose selection launches the application.

Note that, in some embodiments and/or for some applications, "installing" the required and/or selected applications may not include installing the application itself (i.e., an unpackaged application binary) on an end user's physical computing device, virtualized computing resource instance or virtual desktop instance, but may involve delivering some or all of the pages of program instructions of a virtualized application (e.g., using demand paging) to the end user's computing resource instance for execution by a runtime engine that is installed in the end user's computing resource instance.

As illustrated in FIG. 7, in some embodiments, the method may also include tracking the usage of the desktop applications in the portfolio and passing information about the usage of the application by various end users to a service provider billing system for subsequent use in billing the service provider customer's IT administrator for the use of those applications (as in 770). For example, the method may include generating usage reports for the applications in the portfolio automatically (e.g., periodically or in response to changes in the catalog/portfolio or application usage) or upon request. In some embodiments, the reports may be delivered through the service provider management console or desktop application management module interface (e.g., to IT administrators and/or end users) in addition to being passed to a service provider billing system. In various embodiments, the reports may indicate how many (and/or which) users are using each application, how many (and/or which) users are using each version of a particular application, the duration for which each application is used by one or more users, and/or other usage information.

As previously noted, the enterprise catalog service platforms described herein may be used to manage server products on behalf of customers and their end users instead of, or in addition to, managing desktop applications. One embodiment of a method for managing server products (e.g., server-type applications that execute on a service provider system on behalf of an end user and return a response) through an enterprise catalog service (such a service implemented by the system illustrated in FIG. 1) is illustrated by the flow diagram in FIG. 8. As illustrated at 810, in this example, the method may include an IT administrator of a service provider customer organization selecting, from a product discovery service, one or more resource stack templates that are sourced by third parties, and ingesting the resource stack templates into a product catalog owned by the IT administrator for subsequent deployment to end users in the customer organization. The method may also include ingesting one or more line-of business resource stack templates (e.g., custom resource stack templates that were developed by the customer organization) into the IT administrator's product catalog, as in 820.

As illustrated in this example, the method may include receiving (e.g., from an IT administrator of a service provider customer), through a service provider management console, input indicating the selection of one or more previously ingested resource stack templates to be included in a portfolio for subsequent access by end users (as in 830). For example, in various embodiments, the resource stack templates may be selected for inclusion in a private catalog or portfolio that may only be accessible to a subset of the end users of the service provider customer. In one example, the input may be received from an IT administrator of a business, enterprise, or other organization that receives services through the enterprise catalog service platform and/or from a resource stack management service (i.e., an organization that is a service provider customer). In this example, the IT administrator may log into the system provider management console in order to create and/or manage one or more portfolios of server products (each of which may be constructed using a respective resource stack template) for the use of some or all of the members of their organization. In various embodiments, the selection of resource stack templates may be made by the IT administrator, and may be dependent on technical features (e.g., capabilities of the server product and/or resources required to create the corresponding resource stack), a pricing breakdown, the applicable terms of use (e.g., licensing or subscription terms), ratings and/or reviews, the availability of support from the vendor and/or other information, including organizational needs, goals, or policies.

As illustrated in this example, the method may include receiving (e.g., from an IT administrator of a service provider customer), through a service provider management console, input indicating the assignment of selected resource stack template(s) to one or more end users and/or user groups, constraints on use of the selected template(s) and/or configuration parameter setting(s) for the portfolio (as in 840). For example, in some embodiments, constraints and/or configuration parameter settings may be specified as part of an operation to assign server products to particular users or user groups. In other embodiments, constraints and/or configuration parameters may be specified as part of a separate interaction between the IT administrator and the console (e.g., as part of a portfolio configuration operation), and information indicating the constraints and/or configuration parameter settings may be received as separate inputs through the service provider management console. In some embodiments, the constraints may indicate which (if any) of the server products in the portfolio are required to be installed by end users and which (if any) are optional. In some embodiments, the configuration parameter settings may indicate whether monitoring should be enabled for the portfolio (and/or particular server products in the portfolio) or may indicate whether end users have the option to view lists of server products that are not assigned to them and/or that are not currently available in the portfolio (e.g., third party products that have not yet been ingested into the enterprise catalog service platform). As described above, other types of constraints that may be applied to individual server products may include environmental constraints, input parameter constraints, quotas, and/or billing constraints, in at least some embodiments.

As illustrated in this example, the method may also include storing information representing the assignment of the selected resource stack templates to particular end users and/or user groups, the constraints, and configuration parameter settings for the selected resource stack templates, users, and portfolio, as in 850. For example, this information may be stored in any of a variety of data structures or database tables by a storage service implemented on the service provider network. The method may also include making the selected resource stack templates available to the end user(s) through a resource stack management service console, according to the constraints and configuration parameter settings for the selected resource stack templates and users, as in 860. In some cases, this may include installing any required server products and/or making certain server products (e.g., those server products that are assigned to a particular end user or those an end user is allowed to know about) visible and/or selectable through a resource stack management service console (e.g., through icons, shortcuts, menu elements, or other user interface mechanisms or elements thereof that were created on the resource stack management service console for the server products and whose selection launches the server products).

Figure 8:
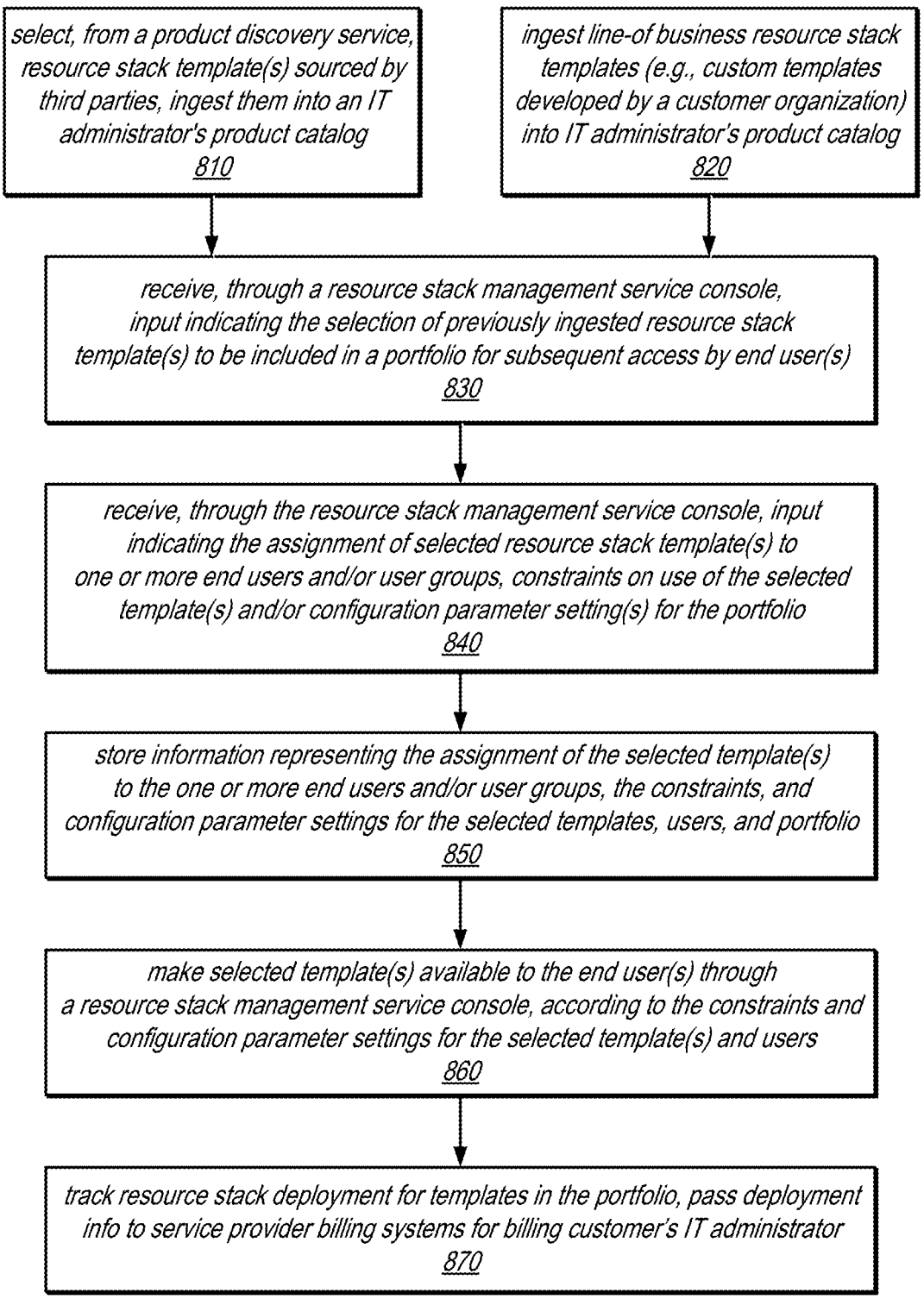
FIG. 8 is a flow diagram illustrating one embodiment of a method for managing server products through an enterprise catalog service.

As illustrated in FIG. 8, in some embodiments, the method may also include tracking the deployment of resource stack templates that are included in the portfolio and passing deployment information to a service provider billing system for subsequent use in billing the service provider customer's IT administrator for the use of those resource stack templates (as in 870). For example, the method may include generating reports indicating the number of resource stacks that are launched for each resource stack template in the portfolio automatically (e.g., periodically or in response to changes in the catalog/portfolio or resource stack template usage) or upon request. In some embodiments, the reports may be delivered through the service provider management console or resource stack management service console (e.g., to IT administrators and/or end users) in addition to being passed to a service provider billing system. In various embodiments, the reports may indicate how many (and/or which) users have deployed a resource stack for each resource stack template, the duration for which each resource stack instance is used by an end user, and/or other deployment/usage information.

As discussed above, an enterprise catalog service may be used to track and control costs. For example, portfolios, products, computing resource instances and resource stack template may support tagging. When a product is used, the resultant computing resource instances or resource stacks may be tagged with the portfolio, the product, the product version and a unique identifier (i.e. instanceId or stack Id). These tags may be used to filter spend data presented in a cost discovery tool, enabling the end users to track the spending for a portfolio, a product or for a single product deployment. End users may be able to view the costs on a daily, weekly or monthly basis. In some embodiments, this information may be used by an IT administrator to define and then track spending limits on a portfolio, product or product deployment through the enterprise catalog service (or a cost analysis module thereof).

For example, if an end user requests a subscription to a desktop application, and once the IT administrator has subscribed to and provisioned the application (e.g., by installing a virtualized application package on a virtual desktop), and various end users start using it, the enterprise catalog service may begin billing the IT administrator for the application (or begin metering usage for subsequent billing). For a server product, when the actual product is deployed, the enterprise catalog service may begin billing the IT administrator for the product at a pre-determined rate for the product plus the cost of the underlying infrastructure (e.g., daily, hourly, monthly, annually, or as a one-time cost).

As previously noted, in some embodiments, an application (which is sometimes referred to herein as desktop application management module) may be installed on an end user's machine or on a virtual desktop instance that provides an interface to virtualized desktop applications delivered from an application fulfillment platform. In some embodiments, this application may also provide an interface through which applications that are physically installed on the end user's machine may be launched. For example, after launching the desktop application management module (e.g., by selecting an icon or shortcut on the desktop or on a virtual desktop), an end user may, through a graphical user interface of the desktop application management module, log into the desktop application management module using their identity, view a list of applications that are available for their use (e.g., applications that they have permission to purchase, lease or subscribe to, install, and/or execute) or that may be made available for their use (e.g., applications for which they may be able to request permission to purchase, lease or subscribe to, install, and/or execute) and select on option to purchase, lease or subscribe to, install, and/or execute one of the listed applications.

As described above, in some embodiments of the systems described herein, an IT administrator (or other privileged user) in a service provider customer organization may be able to define constraints for the software products that are managed by the service provider (e.g., through an enterprise catalog service) on behalf of the customer organization. In these systems, constraints serve as mechanisms to limit the ability of end users to perform certain actions, or to limit the ways in which certain actions are taken (e.g., the ways in which an end user is able to launch a software product). The systems and methods described herein may provide a lot of flexibility for IT administrators to define and apply these constraints, including the ability to set constraints on a variety of entities such as on a product, on a portfolio, or on a user, and/or on the relationships between them. For example, the systems described herein may support the application of constraints on a user-to-product arc (in which the constraint is enforced when a given product is launched by a particular user) or on a product-to-portfolio arc (in which a constraint may be enforced when any user in a portfolio launches a given product within that portfolio).

In some embodiments, the constraints that may be applied to products, portfolios and users (and on different arcs between them) may include various types of launch constraints. For example, a launch constraint may specify that the users within a given portfolio can only launch three total instances of a specific software product at a time (collectively). Another launch constraint may reflect a quota at a higher level, e.g., it may specify a maximum of twenty installations of a given product for the end users within a particular service provider customer account. Another launch constraint may specify that a particular product can only be launched in a specified region (e.g., "U.S. East"). Still other constraints may restrict the computing resources on which a software product can be launched. For example, a constraint may specify that only virtualized computing resource instances of particular types or sizes may be used to launch a particular product (e.g., specifying that a product must launch on an instance of type B-med or that it cannot launch on an instance type of C-Xlarge), or may specify a minimum or maximum capacity for the computing resource instances on which the product can be launched by end users (e.g., specifying a maximum instance size of A-large). As described in more detail below, a constraint may include a single rule or a set of rules, and may provide a mechanism for customer organizations (or IT administrators thereof) to define a set of constraints in order to limit what end users within a certain account can do. These and other types of constraints (including those that specify launch credentials) may be defined and/or added to software products, portfolios, and users (and to various combinations thereof) when software products are assigned to end users, when portfolios are created and configured, or at other times.

In some embodiments, in addition to launch constraints, such as those described above, and other types of constraints that may be added to a software product by an IT administrator to restrict its deployment, a software product may be subject to constraints that are inherent to the product due to its definition and/or that are included when the product itself is constructed. For example, software products (e.g., server products) that are defined using resource stack templates may be subject to constraints that are specified in those resource stack templates. In one example, a template constraint may specify that no more than four instances of a given resource stack can be running at the same time, or that a server product constructed from a given resource stack template can only run in conjunction with another resource that is tagged with a particular value. In some embodiments, when a software product is launched, the constraints applied at different levels may be aggregated and enforced. For example, in some embodiments, the rules defined in different constraints or sets of constraints to which the software product is subject may be aggregated to create a composite constraint according to a pre-determined function for combining them (e.g., as defined by an IT administrator), and this composite constraint may be enforced when the software product is launched. This may include creating a composite constraint that includes the most restrictive combination of rules defined by the applicable constraints or sets of constraints, the least restrictive combination of rules defined by the applicable constraints or sets of constraints, or a combination of rules that takes into account any relative priorities between rules from different sources that was defined by the IT administrator (e.g., for the specific software product, for software products of a particular type, for software products in a given portfolio, or for all software products).

As described in more detail below, within an enterprise catalog service such as those described herein, constraints may be attached to multiple artifacts in multiple ways, including any or all of the following:

They may be defined in a resource stack template for a software product

They may be associated with a specific IAM principal

They may be associated with a software product within a portfolio that is managed by the enterprise catalog service They may be associated with a portfolio that is managed by the enterprise catalog service They may be associated with a software product that is managed by the enterprise catalog service In some embodiments, the different constraints to which a software product is subject may be defined in such a way that they are composed by simply combining all of the rules into a single constraint definition (e.g., a single constraint object or file) that is used to filter the valid set of parameter values available to the end user when the software product that is subject to those constraints is launched. Each rule within the resulting composite constraint may be applied to the possible values of the corresponding parameters, resulting a set of values that represents the most limited set of values. For example, if constraints are defined for a given software product at its creation (e.g., if constraint are specified in the resource stack template for the product), and that software product is also included in a portfolio to which other constraints are applied (at the portfolio level), both the template constraints and those added by IT administrator as part of the configuration of the portfolio may be enforced when the software product is launched. However, given that a constraint represents a restriction on what can be done within the range of capabilities that are available in a given context, a constraint added to the product at the portfolio level can only be used to further limit the use of the given software product that has already been limited by its template constraints. In other words, the portfolio constraints cannot be used to reestablish or replace any capabilities that have been made unavailable (e.g., restricted out) due to higher-level constraints (e.g., the template constraints). In a specific example, if given a template constraint specifies that a component of a sever product can only be implemented using an m3 instance type (of any size), and a constraint added to a portfolio that includes the product specifies that the component can use either an m3-med instance type or a t1-micro instance type, the instance type would be limited to the m3-med instance type, as the constraint at the portfolio cannot add the capability to use the t1-micro instance type that was restricted out by the template constraint.

In some embodiments, once a constraint has been defined, data representing the constraint may be stored on service provider resources, on behalf of the enterprise service catalog. For example, in some embodiments, constraints may be implemented as objects (e.g., JSON object files, documents, or as files that are compliant with another open-source or proprietary standard for a human-readable text format or scripting language whose content can be parsed and acted upon by components of the enterprise catalog service to apply those constraints, as appropriate.) In addition, data may be stored (e.g., within those objects and/or in other objects, files, or data structures) indicating an association between the constraint and any products, portfolios, and/or users with which it is associated and/or indicating any product versions, portfolios, and/or other service provider customer accounts with which it has been shared, as described herein. In other words, in some embodiments, rather than existing as metadata that is included in other objects (object that represent products and/or portfolios), in the systems described herein, constraints may be created and managed as first class objects that are separate and distinct from the products and portfolios to which they are added (and for which they define usage rules) through their own interfaces (e.g., through various user interfaces presented to IT administrators through a service provider management console). In such embodiments, when a constraint is added to a product or portfolio, a reference to the constraint object may be added to the object representing the product or portfolio as metadata.

In some embodiments, an enterprise catalog service, such as those described herein, may maintain (on service provider resources) a repository for constraint objects and/or a repository of objects that define the relationships between the constraints and the products/portfolios to which they apply. In one example, for each constraint that is applied on the portfolio level, the service may store an object that includes: a unique resource identifier of the portfolio, a unique identifier of a product within the portfolio to which the constraint applies, and the data representing the constraint itself. Similarly, for each constraint that is applied on the product level, the service may store an object that includes a unique identifier of a product within the portfolio to which the constraint applies and the data representing the constraint itself. In some embodiments, when a software product that is managed through the enterprise catalog services launched, this repository may be consulted to extract the constraints (e.g., the rules within all of the applicable constraints) that are to be enforced for this launch.

In some embodiments, when a software product (e.g., a desktop application) is assigned to a user by an IT administrator, the IT administrator can apply user-level constraints to this user-to-product arc. For example, the IT administrator may specify that this user can only have this particular version of the software product, or may select an auto-update or auto-deploy option for the software product for this user.

In some embodiments, pre-defined constraints may be made available to other entities through one of several constraint sharing mechanisms. For example, an IT administrator who creates a constraint with a given context (e.g., under a particular one of several customer accounts of a customer organization) may allow other members of the customer organization who are outside the context in which the constraint was created (e.g., IT administrators who access the enterprise catalog service under different ones of the customer organization's accounts) to discover (e.g., find) the constraint (e.g., through searches, dropdown menus, or other user interface elements of various consoles provided to them by the service provider) and to add it to products, portfolios, and users in their own contexts (e.g., in the contexts of those other customer accounts). In some embodiments, constraints may also be discovered (e.g., found) and used outside of the customer organization. In some embodiments, an IT administrator who creates a constraint may be able to designated the constraint as sharable (e.g., outside the customer organization, or only within the customer organization at large) or as private (e.g., not sharable at all, or only under the same service provider customer account). In still other embodiments, an IT administrator may explicitly share a constraint with a specified entity, but this may require one or more approvals (e.g., in an approval chain). Note that, in some embodiments, constraint objects may be encrypted when stored on service provider resources and/or when shared with other entities (e.g., for security purposes), instead of, or in addition to being stored and/or shared in a human-readable format. In some embodiments, the choice of whether to encrypt constraint objects or not may be determined by an IT administrator on a per-constraint basis or as a default for all constraints created by (or on behalf of) the customer organization. In other embodiments, constraint objects may be encrypted (or not) as configured for the enterprise catalog service as a whole.

In some embodiments, constraints may only be shared with IT administrators or accounts within the same customer organization, while in other embodiments they may be shared with IT administrators or accounts of other customer organizations (e.g., partner organizations) or with the general public. In some embodiments, constraint sharing requests may require one or more approvals by IT administrators, managers, or other privileged users in the sharer's organization. Similarly, requests to import a shared constraint (whether it was explicitly shared or discovered through an internal or public publication of its name and/or contents) may also require one or more approvals by IT administrators, managers, or other privileged users in the recipient's organization. In some embodiments, importing a shared constraint may include retrieving it from a central repository that is internal to the sharer's customer organization, extracting it from an email message or through an actionable notification message, or downloading it from a website. In some embodiments, constraints may only be shared with principals having particular IAM roles (as defined by the constraint creator/owner). In some embodiments, to share a constraint with another customer account, the constraint creator/owner may (e.g., directly or through a service provider management console) send a "share my constraint" request to the IT administrator or account with which the constraint is to be shared. The owner of that account (i.e., the recipient of the sharing request) may approve the sharing request and respond with an IAM role that the constraint creator/owner can use to grant permissions for the constraint to the recipient account. In other words, in some embodiments, the constraint creator/owner may use IAM roles to control access to constraints.

FIGS. 9A-9D illustrate examples of the information presented through a service provider console of an enterprise catalog service when creating a constraint, according to at least some embodiments. For example, FIGS. 9A-9D illustrate information presented by a graphical user interface (GUI) 900 for a service provider console of an enterprise catalog service to an IT administrator of a service provider customer. Note that in some embodiments, the IT administrator may access the service provider console through a browser application (e.g., as a web page). In various embodiments, FIGS. 9A-9D, GUI 900 may present different views in order for the IT administrator to manage desktop applications, server-side products, or product subscriptions (which may include product licenses); to generate and/or view reports (e.g., desktop application usage and/or server product deployment reports); to create and configure portfolios, create constraints, or to add software products, constraints, and users to portfolios; to search for software products; and to view (and, in some cases, take action in response to) various notifications (e.g., from other components of the enterprise catalog service platform or components of other platforms and services with which the enterprise catalog service platform interacts). In some embodiments, an IT administrator may (upon first logging into the enterprise catalog service) be presented with an interface through which they are instructed to create at least one portfolio. In other embodiments, an IT administrator may choose to do this later (e.g., after discovering and subscribing to one or more software products for the subsequent use of their end users).

Figure 9B:
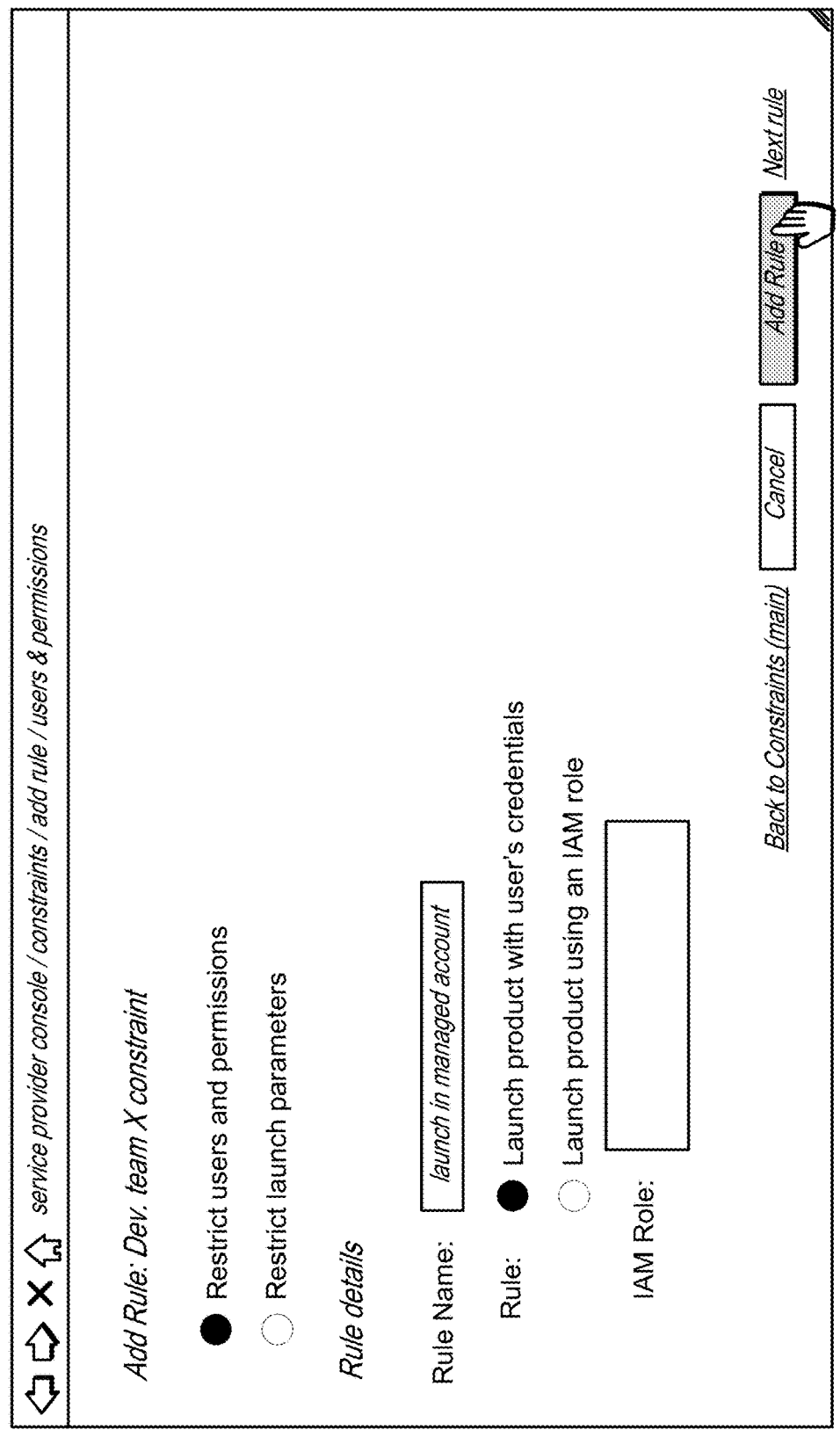

In the example illustrated in FIG. 9A, an IT administrator has logged into the enterprise catalog service, e.g., through a service provider management console. In this example, the IT administrator has selected an option (e.g., under a main "Constraints" page) to "create constraint", in response to which the IT administrator is presented with the information illustrated in FIG. 9A. Other options available from the main "Constraints" page may include "add rule", "delete constraint", or "share constraint", each of which may present information that is different than the information depicted in FIG. 9A. As illustrated in this example, in order to create a new constraint, the IT administrator may enter a constraint name and a description of the constraint into corresponding text boxes of GUI 900. In this example, the IT administrator has indicated that the new constraint will be named "Dev. team X constraint", and that it may include rules for the software products used by Development Team X. After entering this information, the IT administrator has opted to create the constraint by selecting a user interface element "Create and Continue", as shown near the bottom right corner of the display. In this example, after selecting the "Create and Continue" option, the IT administrator may be presented with one of several screens, including, but not limited to, screens similar to those depicted in FIGS. 9B and 9C, according to various embodiments.

FIG. 9B also illustrates information presented to the IT administrator by GUI 900 on behalf of the enterprise catalog service. In this example, after providing the initial information needed to create a constraint (as shown in FIG. 9A), the IT administrator is presented with an interface through which the IT administrator can add rules to the constraint. In this example, the IT administrator has chosen (by selection of one of two available radio buttons) to add rules to the "Dev. team X constraint" that restrict users and permissions. More specifically, the IT administrator has elected to add a rule specifying that a software product to which this constraint is subsequently applied is to be launched using the end user's credentials (e.g., the credentials of the end user who requested the launch or on whose behalf the software product is launched). This option may be selected, for example, for unmanaged software products. Alternatively, the IT administrator could have elected to add a rule specifying that a software product to which this constraint is subsequently applied is to be launched using an IAM role, with the IT administrator specifying (in a separate user interface element, such as a text box or pull-down menu) one or more IAM roles under which the software product can be launched. This option may be selected, for example, for managed software products.

In this example, the IT administrator has provided input specifying a name for the rule, "launch in managed account", in a text box of GUI 900. Note that, in other embodiments, an IT administrator may be presented with additional information and/or may have different options for defining a rule to be added to a constraint. In this example, after defining the rule "launch in managed account", the IT administrator has selected to "Add Rule", which may initiate an operation for storing (e.g., on service provider resources, on behalf of the enterprise service catalog) data representing the rule and indicating the association of the rule to the constraint "Dev. team X constraint". If the IT administrator wishes to add more rules to this constraint, the IT administrator may select "Next rule", as shown in near the bottom right corner of GUI 900. In that case, the IT administrator may be presented with a screen similar to that depicted in FIG. 9B, but that does not yet indicate any details of the next rule to be added to the constraint. Other options may include "Cancel" (which, if selected prior to selecting "Add Rule", may cause this exercise to be aborted, such that the rule being defined is not added to the constraint) and "Back to Constraints (main)" (which, if selected, may result in the presentation of information to the IT administrator indicating multiple options for managing constraints on behalf of the customer organization).

Similar to FIG. 9B, FIG. 9C illustrates information presented to the IT administrator by GUI 900 on behalf of the enterprise catalog service in order add another rule to the constraint "Dev. team X constraint". In this example, the IT administrator has chosen (by selection of the other one of the two available radio buttons) to add rules to the "Dev. team X constraint" that restrict launch parameters for the software products to which this constraint is subsequently applied. More specifically, the IT administrator has elected to add a rule restricting the user input parameters that can be specified by an end user when launching such a product. Here, the IT administrator has provided input indicating the name of the rule ("restrict instance type") and a description of the rule ("front end instance type is B-med"). In this example, the IT administrator has indicated that this rule should always be applied when a software product to which this constraint is subsequently added is launched. Other options that could have been selected by the IT administrator, in this example, include applying this rule only when the software product is launched by a specific user, by a specific user group, or under a specific IAM role (e.g., to limit the use of more expensive options by some users), or only when another product input parameter has a specific value (e.g., to restrict the allowable combinations of various input parameter values). For example, the text shown in FIG. 9C as underlined text may represents hyperlinks that, when selected, cause an additional user interface element to be presented in order to provide additional information. Here, the IT administrator, having selected an option other than "always apply this restriction", and in response to selection of the corresponding hyperlink, would have been presented with an opportunity to specify a user, user group, IAM role or input parameter value for those rules.

Other types of rules for restricting the user input parameters that can be specified by an end user when launching such a product may include rules specifying the data types or the number of users that must be supported by the software products to which the constraint applies, among others. In addition, other types of rules (e.g., environmental restrictions, quotas, or billing restrictions) may be added to the constraint instead of, or in addition to, rules restricting user input parameters (e.g., by selecting the corresponding user interface elements near the top right corner of GUI 900). In this example, after defining the rule "restrict instance type", the IT administrator has selected to "Add Rule", which may initiate an operation for storing (e.g., on service provider resources, on behalf of the enterprise service catalog) data representing the rule and indicating the association of the rule to the constraint "Dev. team X constraint". If the IT administrator wishes to add more rules to this constraint, the IT administrator may again select "Next rule", as shown in near the bottom right corner of GUI 900. Other options may include "Cancel" (which, if selected prior to selecting "Add Rule", may cause this exercise to be aborted, such that the rule being defined is not added to the constraint) and "Back to Constraints (main)" (which, if selected, may result in the presentation of information to the IT administrator indicating multiple options for managing constraints on behalf of the customer organization).

Figure 9D:
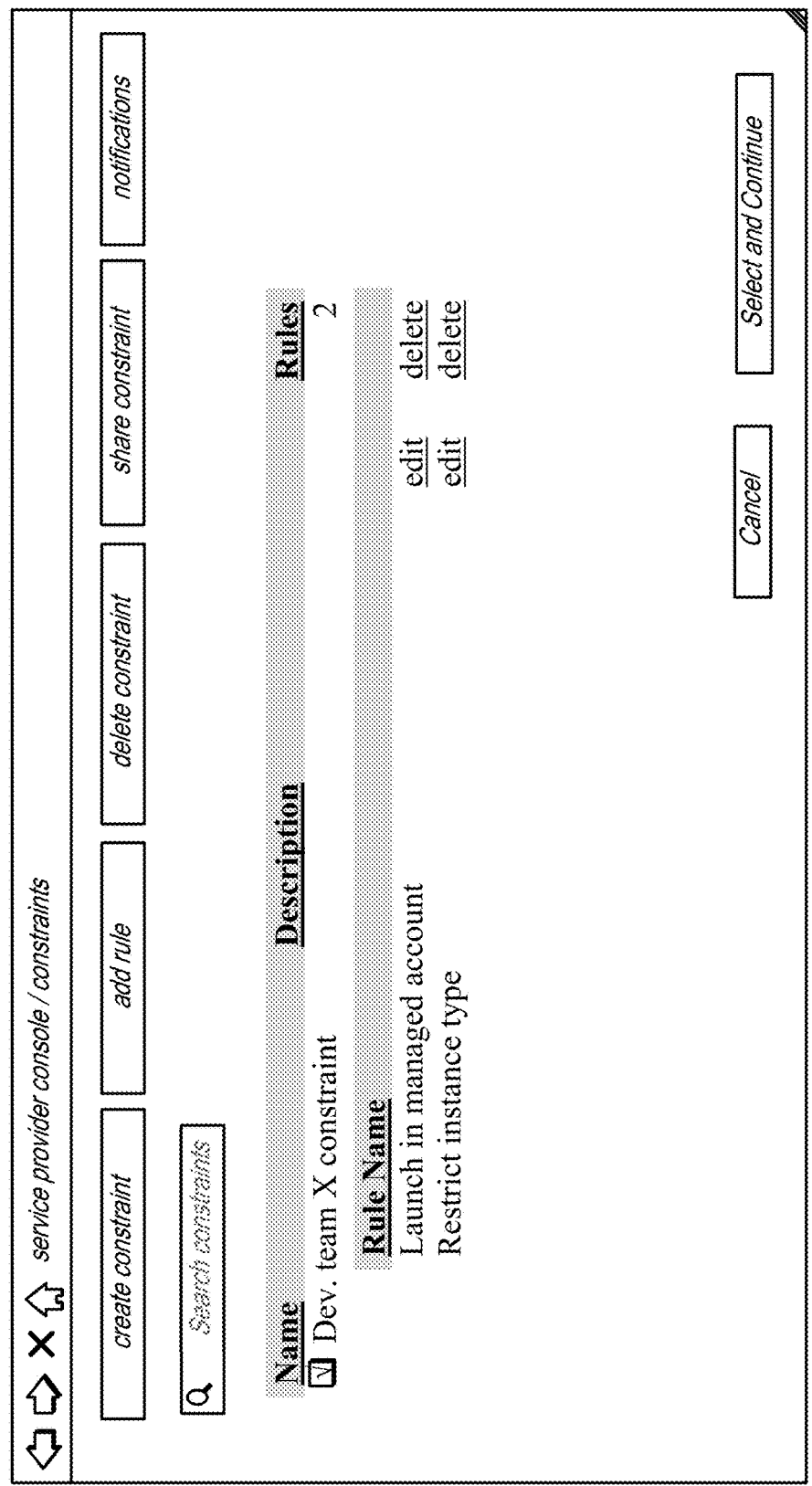

FIG. 9D illustrates information presented to the IT administrator by GUI 900 on behalf of the enterprise catalog service indicating multiple options for managing constraints on behalf of the customer organization (e.g., when the IT administrator logs into the service provider management console and elects to manage constraints, or in response to the selection of "Back to Constraints (main)" on any of the other screens presented to the IT administrator when performing operations for managing constraints (such as those depicted in FIGS. 9B and 9C). In this example, the information presented to the IT administrator may include a list of the constraints that have been defined by the IT administrator (or that are otherwise available to be added to software products/portfolios by the IT administrator, e.g., following their importation). In this example, the IT administrator, having selected the constraint "Dev. team X constraint" (which, in this case is the only constraint listed) is presented with additional information about the constraint (e.g., a list that include the names of the rules that are included in the selected constraint). Here, the list of rules includes the rules defined and added to the constraint "Dev. team X constraint" through the interactions depicted in FIGS. 9B and 9C. As illustrated in this example, from this screen, the IT administrator may elect to create another constraint, add a rule to an existing constraint, delete a constraint, or share a constraint, among other things, by selecting the corresponding user interface elements shown near the top of GUI 900. In addition, the IT administrator may elect to edit or delete one or more of the rules listed for each of the IT administrator's constraints. As illustrated in FIG. 9D, the text "edit" and "delete" next to each listed rule may represent hyperlinks that, if selected, would result in the presentation of an additional user interface element through which the IT administrator is given the opportunity to make changes to a rule or delete the rule, respectively. Note that, in some embodiments, this may include presenting to the IT administrator a screen similar to those depicted in FIG. 9B or 9C.

Figure 10:
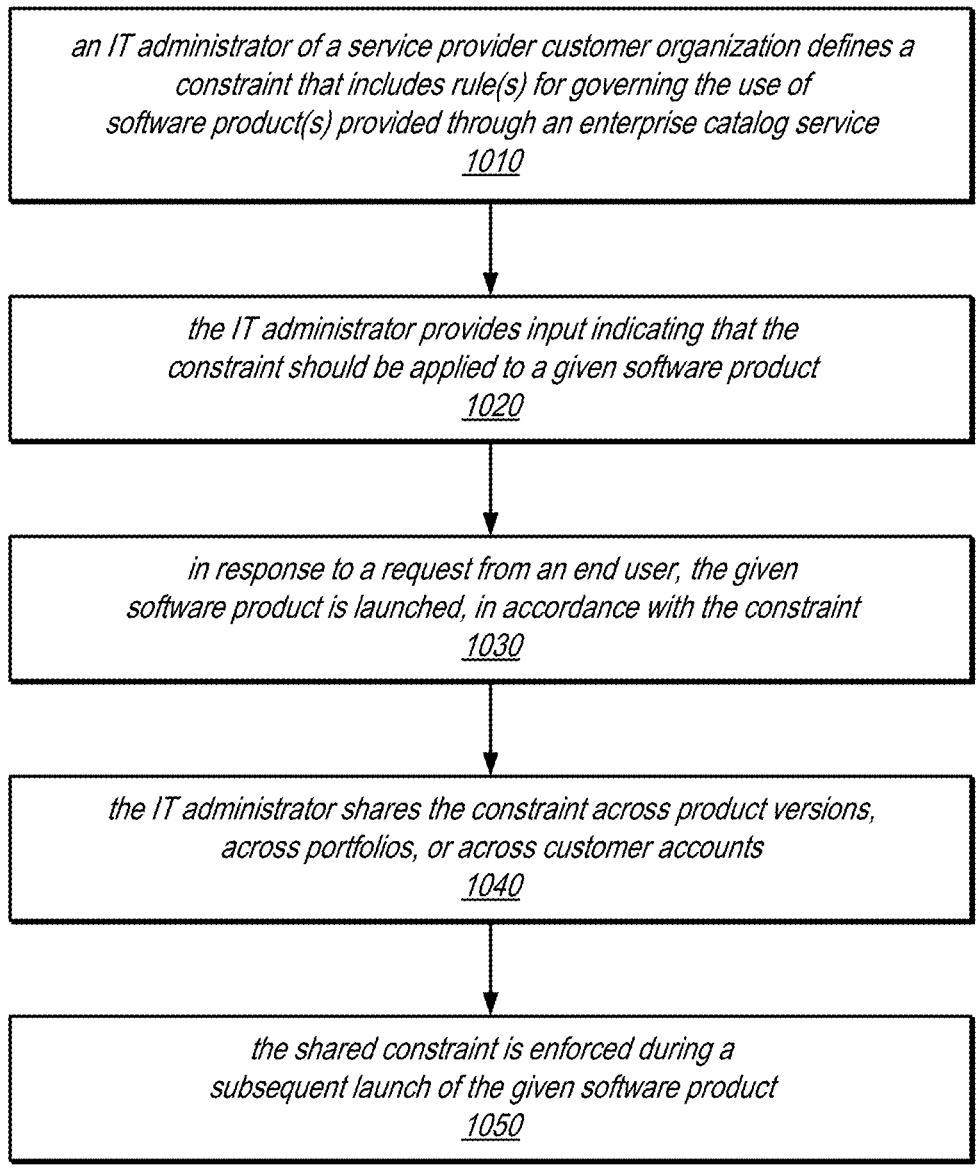
FIG. 10 is a flow diagram illustrating one embodiment of a method for creating and applying a constraint on the use of a software product an enterprise catalog service.

One embodiment of a method for creating and applying a constraint on the use of a software product an enterprise catalog service is illustrated by the flow diagram in FIG. 10. As illustrated at 1010, in this example, the method may include an IT administrator of a service provider customer organization defining a constraint that includes one or more rules for governing the use of the software products that are provided through an enterprise catalog service. The method may also include the IT administrator providing input indicating that the constraint should be applied to a given software product (e.g., individually or as part of a portfolio to which the constraint is being added), as in 1020.

As illustrated in this example, in response to a request from an end user, the method may include launching the given software product, in accordance with the constraint, as in 1030. At some point later, the method may include the IT administrator sharing the constraint across product versions, across portfolios, or across customer accounts, as in 1040. Several non-limiting examples of mechanisms for sharing the constraint are described in more detail below. Once the constraint has been shared, the method may include enforcing the shared constraint during a subsequent launch of the given software product (e.g., by an entity which with the constraint was shared and one whose behalf it was launched), as in 1050. Note that while FIG. 10 illustrates an example in which a constraint is applied to a software product launch prior to it being shared, in some embodiments these are independent activities that may be performed at any time subsequent to the creation of the constraint and in any order.

Figure 11B:

As described above, constraints, once defined, may be added to products and/or portfolios by an IT administrator, after which the rules included in those constraints may be enforced when the corresponding products are launched, as applicable. FIGS. 11A-11B illustrate examples of the information presented through a service provider console of an enterprise catalog when adding a constraint to a software product and to a portfolio, respectively, according to at least some embodiments. More specifically, FIG. 11A illustrates information presented to an IT administrator of a service provider customer by GUI 1100 on behalf of the enterprise catalog service, indicating multiple options for managing the constraints that are associated with particular individual software products. In this example, the IT administrator has selected the product "website design package A", and has elected to search the available constraints (e.g., constraints that have been defined by the IT administrator or that are otherwise available to be added to software products by the IT administrator, e.g., following their importation) for "launch constraints". As a result of this search, the IT administrator is presented with a list of available constraints, some of which have been added to the selected software product and others of which have not. Note that each constraint may include any number of restrictions (rules) regarding required launch credentials and/or restrictions on how the software product can (and cannot) be launched. In this example, the IT administrator has selected the constraint "Dev. team X constraint" (which specifies associated software products should be launched using the end user's credentials and that includes a restriction on the front end instance type for associated software products to instance type "B-med") to be added to the software product "website design package A". Other constraints that currently apply to "website design package A" include a restriction on the maximum size for the middle tier instance type ("C-large"), a requirement that the product supports HTML data, and a requirement that the product support up to 100,000 users. In this example, through the screen depicted in GIU 1100, the IT administrator may select and edit (or remove) any of the other constraints listed for "website design package A", after which the IT administrator may choose "Select & Continue" to apply these changes.

FIG. 11B illustrates information presented to an IT administrator by GUI 1100 on behalf of the enterprise catalog service indicating multiple options for managing the constraints that are associated with particular portfolios. In this example, the IT manager has elected to manage constraints for a portfolio named "Bob's team", which includes four software products and five users (all of which are listed on the left side of GUI 1100). As in the previous example, the IT administrator has selected the product "website design package A", and has elected to search the available constraints (e.g., constraints that have been defined by the IT administrator or that are otherwise available to be added to software products by the IT administrator, e.g., following their importation) for "launch constraints". As a result of this search, the IT administrator is presented with a list of available constraints, some of which have been added to the selected software product and others of which have not. Again note that each constraint may include any number of restrictions (rules) regarding required launch credentials and/or restrictions on how the software product can (and cannot) be launched.

As in the previous example, the IT administrator has selected the constraint "Dev. team X constraint" (which specifies associated software products should be launched using the end user's credentials and that includes a restriction on the front end instance type for associated software products to instance type "B-med") to be added to the software product "website design package A". Other constraints that currently apply to "website design package A" include a restriction on the maximum size for the middle tier instance type ("C-large"), a requirement that the product supports HTML data, and a requirement that the product support to up 100,000 users. As in the previous example, through the screen depicted in GIU 1100, the IT administrator may select and edit (or remove) any of the other constraints listed for "website design package A", after which the IT administrator may choose "Select & Continue" to apply these changes. However, unlike in the previous example, the IT administrator has also selected the product "database package C", and has specified that the selected constraints should be applied to both "website design package A" and "database package C" only when they are launched by selected ones of the users in portfolio "Bob's team" (specifically, Bob and Mary). In this example, the IT administrator may select other combinations of constraints that should be applied to other combinations of the software products and users in the portfolio "Bob's team." As illustrated in these and other examples, in some embodiments, when a constraint (or constraint group) is added to a portfolio, it may be applied to all software products in the portfolio and/or to all users in the portfolio (e.g., it may be applied when any one of the software products is launched by and one of the users in the portfolio), while in other embodiments, it may be possible to limit the software products and/or users within the portfolio to which the constraint applies. Note also that in other embodiments, a constraint (or constraint group) may be added to a collection of constraints that is applied on a product or user basis (e.g., regardless of whether the product or user is included in a given portfolio) through an interface other than one through which a portfolio is created.

In some embodiments, when resources (e.g., software products or portfolios of software products) are made available to users and/or user groups by an IT administrator (e.g., through a service provider console), the console component may notify other components of the system (e.g., various components within the enterprise catalog service platform, desktop application fulfillment platform, or resource stack management service), which may, in turn, initiate the provisioning of the software products or portfolios for deployment on behalf of various end users. In addition, when and if a change is made to a portfolio (such as adding or deleting a product or user, or changing permissions and/or constraints) by the portfolio owner (e.g., the IT administrator who created the portfolio) or by another privileged user that has been granted permissions to edit the portfolio, notifications may be sent out on a communication feed to the users in the portfolio and/or to other component and services within the enterprise catalog service platform, desktop application fulfillment platform, or resource stack management service (some of which may be responsible for taking appropriate action and/or enforcing the changes to the permissions and/or constraints, in response to the notification). For example, in some embodiments, a control plane of an application fulfillment platform (or another component) may provide a variety of portfolio management services, which may include a portfolio service, a portfolio user service, and/or a portfolio policy service. However, in different embodiments, the functionality of these services may be implemented by a single portfolio management service or by two or more portfolio management services in other combinations.

In some embodiments, such portfolio management services may (collectively) provide information to other components of the system through two or more communication channels (or communication feeds). For example, in some embodiments, these services may provide information over a principal feed and a listing feed. A listing feed may be used to communicate a notification to one or more other components in the system each time a software product (e.g., a desktop application or server product) is added (e.g., by an IT administrator) to a catalog of products that is managed through an enterprise catalog service, e.g., in response to the addition of a line-of-business product that was developed by (or on behalf of) the company or the acquisition (e.g., by subscription) and/or ingestion of a product from a third party vendor (e.g., an independent software provider). Note that, at the time of the notification, the new product that has been added in the system may or may not have been assigned to any users or added to any portfolios, but may be tagged in the system as being associated with the IT administrator's customer account.

In some embodiments, a principal feed may be used to communicate a notification to one or more other components in the system when a user (which may be referred to as a "principal") is granted permissions for a resource (e.g., an individual software product or a portfolio), or when a constraint is modified on the arc between the resource and the principal to indicate how the principal is to use the resource. In some embodiments, the principal feed may indicate that something has changed for the principal, but it may or may not include detailed information about the specific change that was made. In such embodiments, portfolio management services may be queried for a description of the change for the principal, and/or may be relied on respond to the change appropriately. For example, the change may be that an entitlement to a new product was granted to a user, a constraint on a product was edited for the user, a product was deleted for a user, a product was deleted from the catalog altogether, a new user was added, a new resource (e.g., a software product) was added to a portfolio, or a resource (e.g., a software product) was removed from a portfolio. In some embodiments, any current operation or change of constraints on the arc between a principal and a user may trigger the communication of a notification via the principal feed. In some embodiments, it may be up to an enterprise catalog service client (e.g., a desktop application fulfillment platform or resource stack management service) to respond to a notification (e.g., to take appropriate action).

In some embodiments, any end users that are included in a portfolio (e.g., end users who have been granted permissions to discover and launch the products in the portfolio) when another product is added to the portfolio may automatically (or inherently) be authorized to discover and launch the added product (e.g., they may immediately gain access to the added product).

As described herein, there may be several different mechanisms for sharing a portfolio supported in an enterprise catalog service, in different embodiments. As described below, these may include one or more "push" mechanisms, by which a portfolio owner indicates an intent to share a portfolio and sends the intended recipient the portfolio key, and/or "pull" mechanisms, by which portfolio names and/or descriptions are discoverable and may be selected for import by others (pending approval). For example, in various embodiments, a portfolio may be published (e.g., to be made discoverable by other IT administrators in the organization and/or sub-accounts under same customer account), explicitly shared with another account (e.g., by adding an identity for the other account to the portfolio or by notifying the other account that the portfolio is being shared), or imported by another account (e.g., in response to a notification received from portfolio owner, if a request to import a portfolio that has been discovered is approved). As previously noted, an importer of a portfolio may not be able to change the contents of the portfolio or the permissions and constraints that have already been defined by the portfolio owner, but may be able to further restrict the permissions/constraints on the products for their end users.

In some embodiments, the enterprise catalog service platforms described herein may include a graph processing service component that leverages the constraints and permissions model to return the products and portfolios that are available to an end user. In such embodiments, IT administrators may constrain the products that end users have access to and the graph processing service, in response to various queries made on behalf of the end users, may respect the permissions and only return the information for the products that the end users have explicitly been granted access to (e.g., for discovering and launching software products that are managed by the enterprise catalog service).

In some embodiments, the graph processing service component may create a graph representation of data about principals, portfolios, product listings, and constraints (and relationships between them) that is maintained and used in the enterprise catalog service on behalf of a customer organization. In some embodiments, the graph representation may employ two types of indexing strategies: standard indices (which offer exact matches and are built on top of a key-value storage model of an adjacency list), and external search indices (which may be pluggable).

In some embodiments, the graph data models and storage models used by the graph processing service may be used to model vertices of high degree (e.g., over 100 k), may support document search (which may include free text search, literal search, range queries, and/or faceted search), may support heavy read loads (and low writes, such as asynchronous writes performed as part of an index building process). The graph processing service may support primary key lookups on documents (e.g., vertices), and multi-hop traversals from a primary node. In some embodiments, the service may also provide high durability and eventual consistency for the graph representations and search indexes when stored on service provider resources.

In some embodiments, the graph processing service may employ a proprietary or commercial hosted graph database (sometimes referred to herein as a graph processing library) as an appropriate data store to support the types of queries that are directed to the graph processing service. For example, some graph databases may combine a key-value store (for an adjacency list describing the relationships between various principals, product listings, portfolios, and constraints) and a document store (for search indices on the graph nodes). The "customers" of the graph processing service may include other components of the enterprise catalog service, as well as IT administrator and end users within a service provider customer organization.

In the context of the enterprise catalog service platform and graph processing service, the term "product listing" may refer to a runtime view of a product (e.g., a combination of metadata and fulfillment artifacts). For example, a listing may represent a runtime view of a desktop application or a server product. In this context, end user principals may discover and consume applications. However, they may only be able to view listings that they have access to and launch products according to the constraints specified on the listing by an administrator principal. In the context of the enterprise catalog service platform and graph processing service, the term "portfolio" may refer to a group of listings (e.g., a container that includes a group of listings that is bundled together by an administrator principal, who may also assign principals to the portfolio). In this context, the term "constraint" may refer to a document (or other object) that is attached to an entity (or to a relationship between two entities) and that dictates resource and launch constraints for launching listings in a portfolio.

As described in more detail below, the graph processing service may provide a collection of APIs for use in querying the graph representation of the enterprise catalog data in order to manage access control, launch contexts, and searches within the enterprise catalog service, including, but not limited to, the following APIs:

A BrowseListings API that returns the set of listings accessible to an authenticated end user, subject to the search filters provided. This API may be used by a product fulfillment platform to obtain the list of applications to be presented to an end user, e.g., as a "My Apps" view.

An IsUserAuthorizedForListing API that returns an indication of whether an authenticated end user has access to a given listing, in order for them to be able to view its detail page or launch the product.

A GetLaunchContexts API that locates all the paths to a listing for an authenticated end user and returns the entity and relationship constraints along each path. This API may be used to present a listing's fulfillment options to the end user.

A GetListingCountForPortfolio API that returns the count of listings associated with a portfolio. This API may be used to populate an administrator's view of listing count for portfolios in the account.

A GetPortfolioCountForListing API that returns the count of portfolios associated with a listing for a given account. This API may be used to populate an administrator's view of the portfolio count for listings in the account.

A GetPortfoliosForListing API that returns the portfolios associated with a listing for a given account. This API may be used to populate an administrator's view of the portfolios that a listing belongs to, in the account.

A SearchPortfolios API that returns the set of portfolios for a given account, subject to the search filters provided. This API may be used to populate an administrator's view of the portfolios managed by the administrator.

Other APIs that may be supported by the graph processing service, in some embodiments, may include: a DescribeFulfillment API (which may be called through an end user console), a ListFulfillments API, a DescribeUserAppAssociation API, or a ModifyOrderStatus (which may be called by the delivery service or entitlement service when the status of an order needs to be updated).

One embodiment of a method for managing access control, launch contexts, and searches within an enterprise catalog service is illustrated by the flow diagram in FIG. 12. As illustrated at 1210, in this example, the method may include a graph processing service of an enterprise catalog service platform maintaining, on behalf of a customer, a graph structure comprising data representing principals (e.g., users), listings (e.g., products) and portfolios (e.g., containers), as vertices, and constraints that apply to the edges between those vertices. The method may include the graph processing service receiving a query, directed to the data in the graph structure, for information usable to control access to a listing, to determine a launch context for a listing, or to return information about listings or portfolios, as in 1220. In some embodiments, these queries may be received from another component of the enterprise catalog service platform or from a product fulfillment platform.

As illustrated in this example, the method may include the graph processing service traversing an adjacency list within the graph structure and/or, in some cases, querying a corresponding search index within the graph structure, dependent on the query type, as in 1230. The method may include the graph processing service returning the requested information to the component of the enterprise catalog service platform or product fulfillment platform from which the query was received, as in 1240.

Logical Data Model

Figure 13:
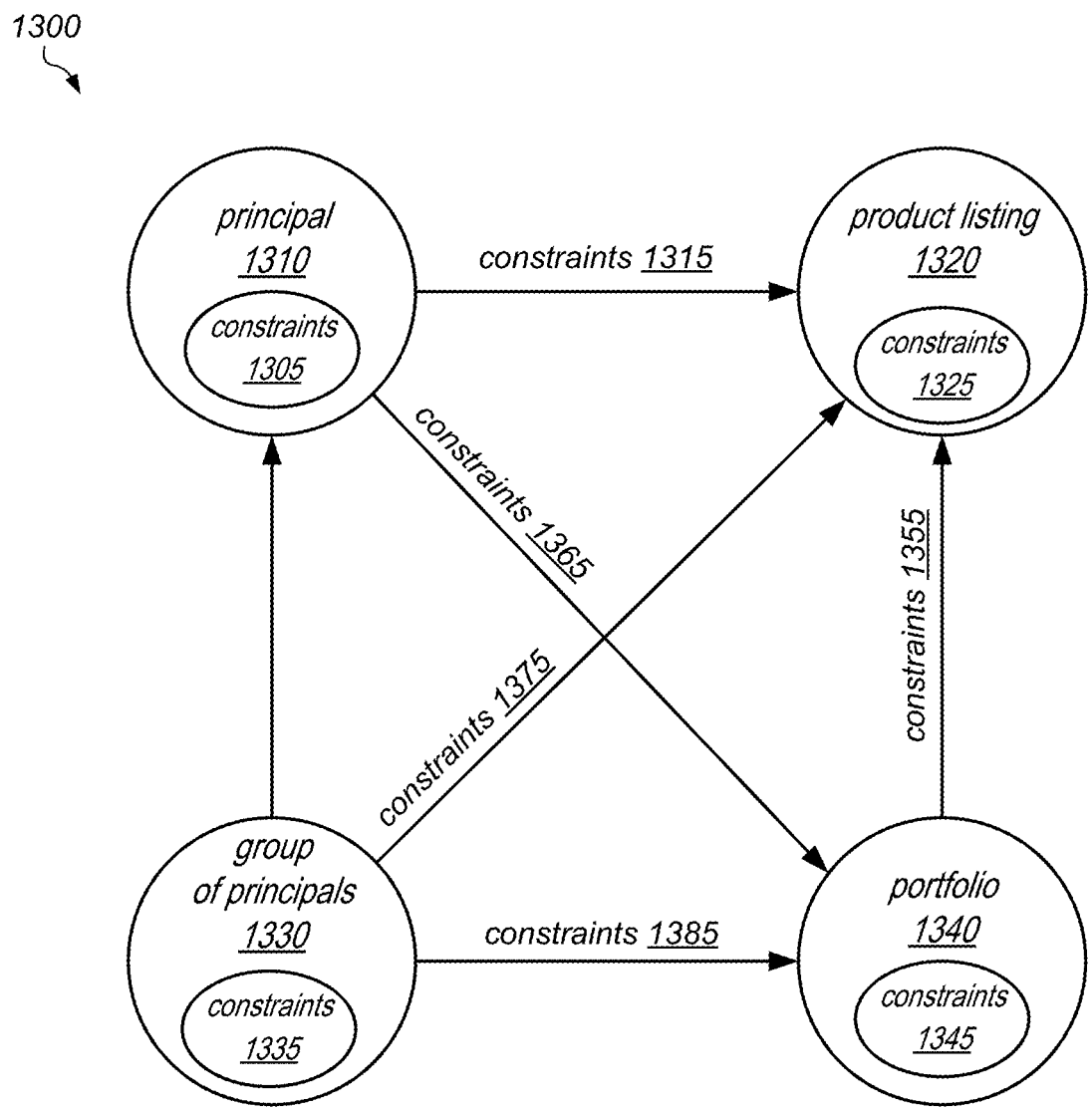
FIG. 13 illustrates a logical data model for a graph representation of the principals, product listings, portfolios, and constraints that are managed by a graph processing service within an enterprise catalog service, according to at least some embodiments.

As described in more detail below, FIG. 13 illustrates a logical data model for a graph representation of the principals, products (or product listings), portfolios, and constraints that are managed by a graph processing service within an enterprise catalog service, according to at least some embodiments represents the possible constraints between the different entities in the system. In some embodiments, each of the principals and constraints may have a unique resource identifier, while each of the product listings and portfolios may have additional attributes (e.g., search and result fields) in addition to their unique resource identifiers. In various embodiments, a principal may be an IAM user, an IAM role, a service provider root account (e.g., a root account for a customer organization), or an active directory user. In some embodiments, shared portfolios may be treated as a special type that cannot reference another portfolio, but can only be taken as a reference. In some embodiments, the graph model may include a special "everyone" node at which one can start to browse all publically discoverable product listings (not shown). In some embodiments, an IT administrator may be equivalent to a service provider root account that owns one or more portfolios and/or custom (e.g., line-of-business) products that were developed by the customer organization. In various embodiments, each of the vertex constraints shown in FIG. 13 may be modeled as a separate vertex just for the constraint, or the constraint may be treated as an embedded a property of the node. In one example, vertex constraints may be modeled as separate nodes, and edge constraints may be modeled as a node between the vertices. Note that there may be multiple constraints at each level of the graph.

More specifically, FIG. 13 illustrates a logical data model 1300 that includes a principal 1310 for which one or more principal constraints 1305 are defined (e.g., a constraint specifying that this user can only launch on m1-micro computing resource instances for any product they are entitle to launch). Data model 1300 also includes a group of principals 1330 for which one or more principal group constraints 1335 are defined (e.g., a constraint specifying that this group of users can only launch their computing resource instances in the U.S.). In some embodiments, any user-level constraints (1305 or 1335) may apply to any products launched from with a portfolio or outside of any portfolio by the user represented in the model as principal 1310 or by the users represented by group of principals 1330 in FIG. 13.

In this example, data model 1300 also includes a product listing 1320 for which one or more product listing constraints 1325 have been defined, and a portfolio 1340 for which one or more portfolio constraints 1345 have been defined. In this example additional constraints have been defined for the arcs between different ones of the vertices. For example, constraints 1315 have been defined between principal 1310 and product listing 1320 (e.g., to further constrain the use of product listing 1320 by principal 1310), constraints 1375 have been defined between group of principals 1330 and product listing 1320 (e.g., to further constrain the use of product listing 1320 by the principals within group of principals 1330), constraints 1355 have been defined between portfolio 1340 and product listing 1320 (e.g., to further constrain the use of product listing 1320 when it is launched within portfolio 1340), constraints 1365 have been defined between principal 1310 and portfolio 1340 (e.g., to further constrain the use of the products within portfolio 1340 by principal 1310), and constraints 1385 have been defined between group of principals 1330 and portfolio 1340 (e.g., to further constrain the use of the products within portfolio 1340 by the principals within group of principals 1330).

In various embodiments, the graph data models employed by the graph processing services described herein may model various relationships between entities, (e.g. principal-portfolio relationships and others, with the potential for super nodes to exist). They may support primary key look-ups on system entities, path finding queries for a pair of system entities, free text search, literal search, and faceted search on the properties of a listing. In some embodiments, the primary graph representation of enterprise catalog data may be stored as an adjacency list with the vertex being the key and the column family containing vertex properties and the edges (e.g., incoming and outgoing edges). In such embodiments, the size of the row may limit the degree of a vertex. In some embodiments, each edge cell may include a label and direction, a sort key, an identifier of an adjacent vertex, and edge identifier, a signature key, and/or other properties, and for each property, the edge cell may include a property identifier and a property value. In some such embodiments, the ability to specify a sort key on its edges per label may improve filtering performance for adjacent vertices. For example, if the right properties are set on an edge level, there may be no need to hop to the adjacent vertices (which will be on separate rows and may, potentially, be on different hosts). Instead, the filtering may be done at the edge level within the row of the starting vertex.

Graph Data Model

Figure 14:
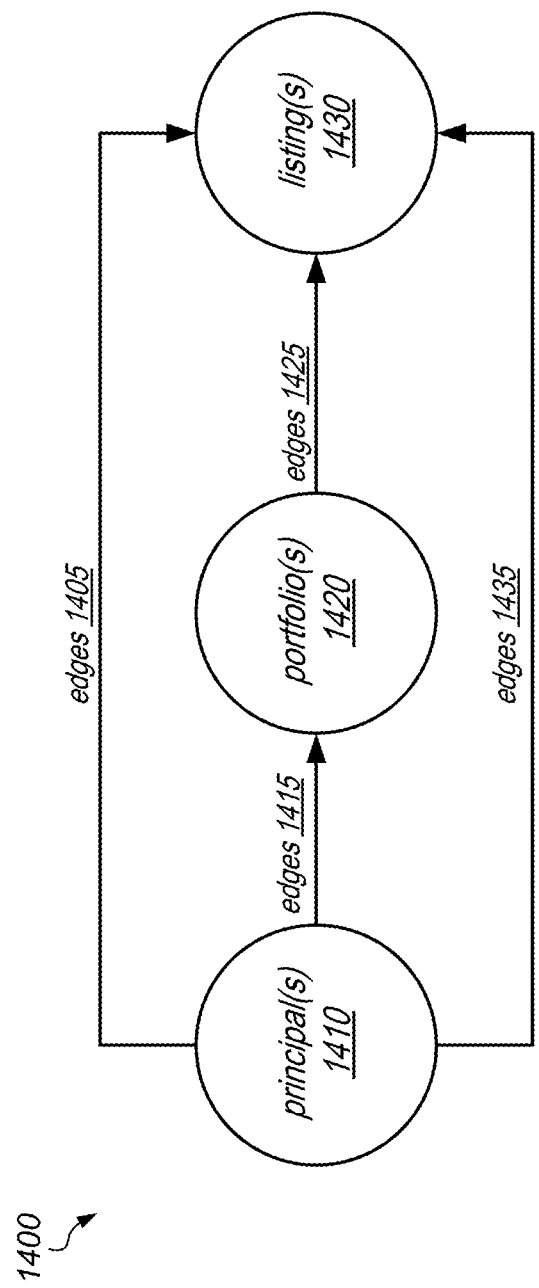
FIG. 14 is illustrates a graph data model from a query path perspective, according to at least some embodiments.

FIG. 14 is illustrates a graph data model from a query path perspective, according to at least some embodiments. It may be thought of as is a magnification of the logical data model illustrated in FIG. 13, excluding the constraints. In some embodiments, the entities may be queried by their primary keys (e.g., their principal identifiers or unique resource identifiers) as well as a subset of the attributes that will be indexed as search fields. A de-normalized 'path exists' edge may be maintained if there exists a path between a {principal, listing} pair, and attributes of the pair may be propagated to the edge and indexed in order to support the SearchListings API.

The following entities are modeled as part of the graph: portfolios, each of which may include vertex constraints (such as a portfolio identifier and an indication of whether the portfolio is shared) and edge constraints (e.g., indicating a has_listing type, has_policy type, owns_portfolio type, shared_portofolio type, has_access type, or version constraint); listings, each of which may include vertex constraints (e.g., a listing identifier, seller name, vendor name, product category, price, or type) and edge constraints (e.g., a detailed description, an indication of its last update date, or a product rating); versions, each of which may include vertex constraints (e.g., a version identifier) and edge constraints (e.g., a has_version type, or portfolio version constraint); accesses policies, each of which may include vertex constraints and edge constraints (e.g., a has_policy type); and/or principals, each of which may include vertex constraints (e.g., a principal identifier or IAM role) and edge constraints (e.g., an owns_listing type, an owns_portfolio type, and a has_access type).

FIG. 14 is illustrates a graph data model from a query path perspective, according to at least some embodiments. More specifically, FIG. 14 illustrates various relationships and query paths for one or more principals 1410, one or more portfolios 1420, and one or more product listings 1430. As previously noted, each principal may include a principal identifier (which may be a unique resource identifier within the enterprise catalog service), each portfolio may include a unique resource identifier and one or more attributes, and each listing may include a unique resource identifier and one or more attributes. Note that in some embodiments, each of the product listing nodes may be potential super nodes (e.g., nodes having an extremely high number of edges compared to other nodes in the same graph). As described below, there may be many edges from each of many vertices of one type to the vertices of another type (e.g., M . . . N edges) or there may be only one edge from a vertex of one type to multiple vertices of another type (e.g., 1 . . . N edges).

In this example, each of the edges 1415 may indicate whether a respective principal has access to (or owns) a particular portfolio (e.g., with M . . . N edges indicating that many principals can access any of the many portfolios, and 1 . . . N edges indicating that there can only be a single owner for each of the many portfolios). Similarly, each of the edges 1435 indicates whether a respective principal has access to (or owns) a product listing (e.g., with M . . . N edges indicating that many principals can access any of the many listings, and 1 . . . N edges indicating that there can only be a single owner for each of the many listings). In this example, each of edges 1425 indicates that a respective one of many portfolios contains a given one of multiple product listings (e.g., M . . . N edges). As described herein, graph data model 1400 also include de-normalized edges 1405, each of which indicates that a path exists between respective principal and a given listing (e.g., M . . . N edges). Note that, in FIG. 14, the directions of the arrows on the edges between the vertices represent the relationships between those vertices from a query flow or query path perspective. For example, a query to determine the portfolios to which a principal is entitled would start at a principal vertex 1410 and traverse the edges 1415 to locate any edges 1415 between that principal and one or more of the portfolio vertices 1420.

Figure 15:
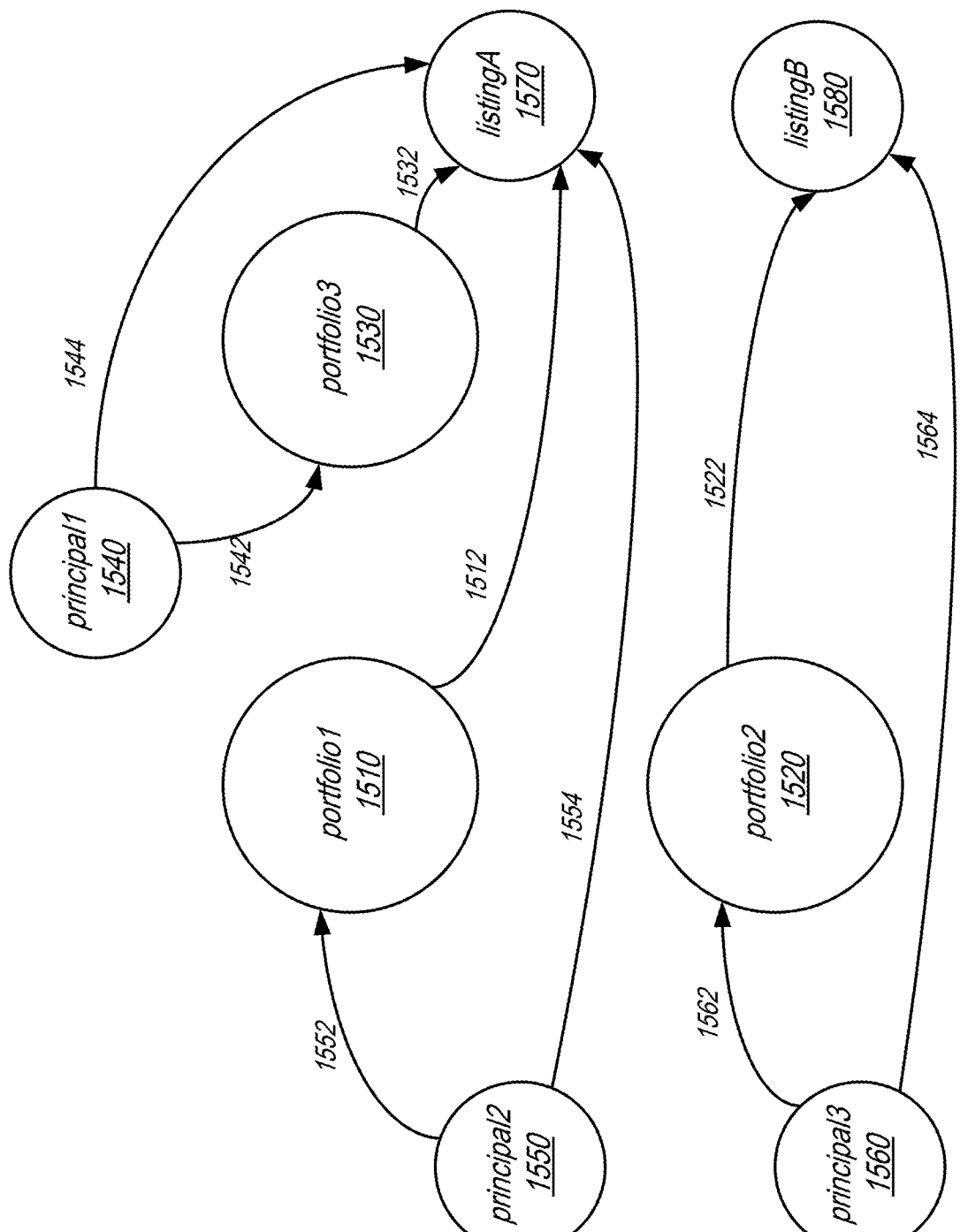
FIG. 15 illustrates an example graph representing various relationships between principals, product listings, and portfolios within an enterprise catalog service, according to at least some embodiments.

FIG. 15 illustrates an example graph representing various relationships between principals, product listings, and portfolios within an enterprise catalog service, according to at least some embodiments. This example illustrates support for cross account sharing of listings. More specifically, listingA (which is owned by account2) is being shared with a portfolio1 (which is owned by account1). In this example, the sharing is done via a portfolio (in this case, by sharing the unique resource identifier for portfolio3, which belongs to account2, the account sharing its resources). In this example, the unique resource identifier is propagated to the edge between portfolio1 and listingA. Note that such a propagation may be required for the correct operation of a GetLaunchContexts API call subsequent to the sharing, since the constraints on the portfolio via which the listing is shared will also need to be enforced.

More specifically, FIG. 15 illustrates an example graph 1500 that includes node representing portfolio1 (1510), which is owned by account1, portfolio2 (1520), which is owned by account1, and portfolio3 (1530), which is owned by account2 and is being shared. As shown by edge 1542, principal1 (1540) owns or has access to portfolio3 (1530). As shown by edge 1552, principal2 (1550) owns or has access to portfolio1 (1510). As shown by edge 1562, principal3 (1560) owns or has access to portfolio2 (1520). As shown by edge 1532, portfolio3 (1530) contains listingA (1570). As shown by edge 1522, portfolio2 (1520) contains listingB (1580). As shown by edge 1512, portfolio1 (1510) also contains listingA (1570). In this example, edge 1512 represents the propagation of the unique identifier for portfolio3 for the cross account sharing of listingA (1570). In this example, edges 1544, 1554, 1564 are de-normalized edges. More specifically, de-normalized edge 1544 indicates that at least one path exists between principal1 (1540) and listingA (1570), de-normalized edge 1554 indicates that at least one path exists between principal2 (1550) and listingA (1570), and de-normalized edge 1546 indicates that at least one path exists between principal3 (1560) and listingB (1580).

Figure 16:
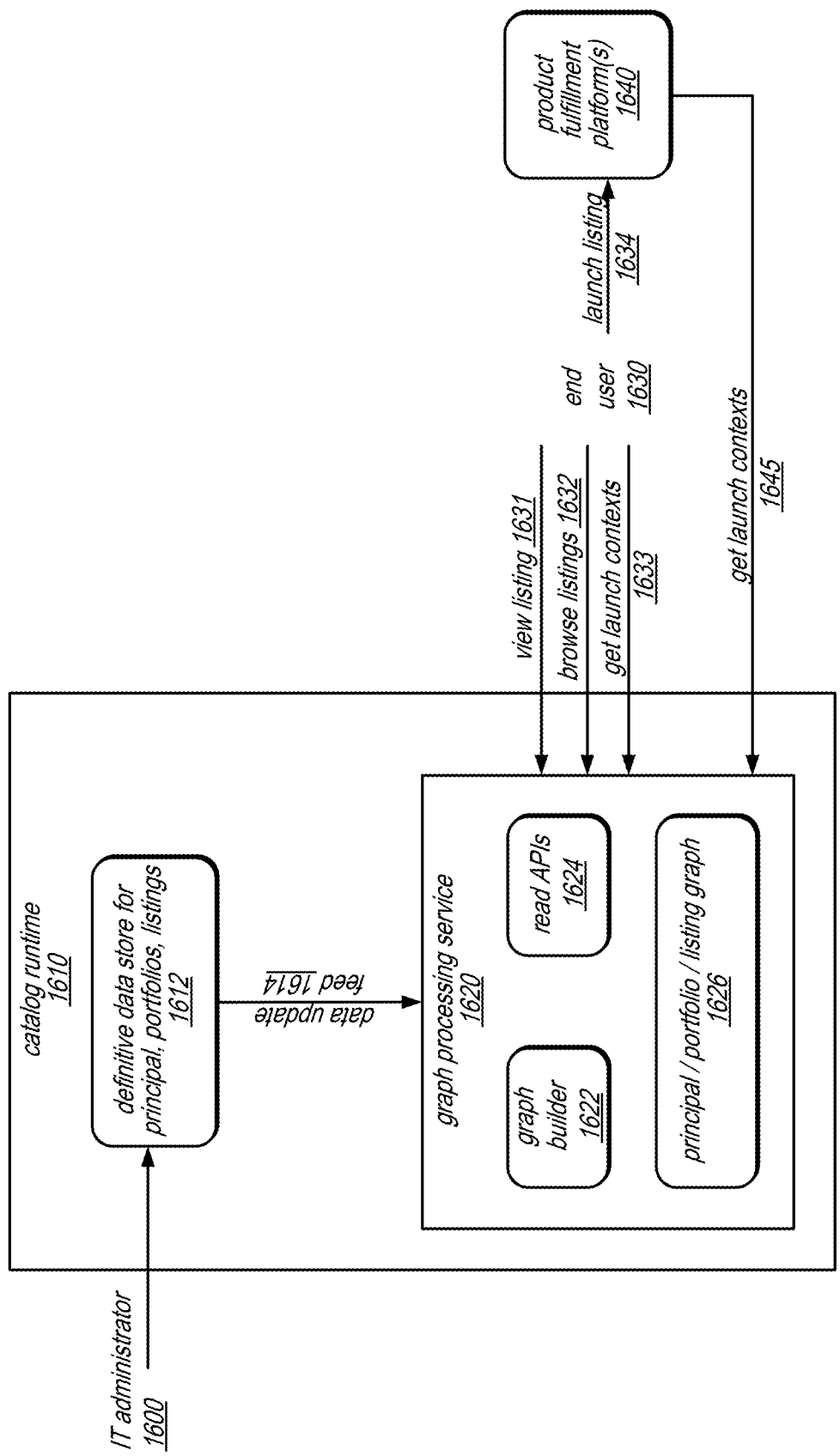
FIG. 16 is a block diagram illustrating interactions between a graph processing service and other components of an enterprise catalog service, according to at least some embodiments.

As noted above, in some embodiment, a graph processing service, such as those described herein, may be implemented as part of an enterprise catalog service platform and/or may operate in coordination with an enterprise catalog service to manage access control, launch contexts, and searches in order to fulfill requests for software products to end users in a service provider customer organization. FIG. 16 is a block diagram illustrating interactions between a graph processing service and other components of an enterprise catalog service, according to at least some embodiments. In this example, catalog runtime 1610 includes a definitive data store 1612 that serves as the source-of-truth for the data about principals, portfolios, product listings, and constraints (and relationships between them) in an enterprise catalog service, such as those described herein. Catalog runtime 1610 also includes a graph processing service 1620, which includes a graph builder portion 1622, a principal/portfolio/listing graph 1626, and multiple read APIs 1624.

As illustrated in this example, an IT administrator 1600 of a service provider customer organization may access the definitive data store 1612 (which may be a database or other key-value data store), e.g., through a service provider management console. In response to a change in the data stored in definitive data store 1612 (e.g., due to interactions between the IT administrators or users within a customer organization and the enterprise catalog service), the definitive data store 1612 may be configured to send a data update feed 1614 to the graph processing service 1620. In response, the graph processing service 1620 may be configured to update a graph representation 1626 of the data that is maintained by the definitive data store 1612. As described in more detail below, in some embodiments, principal/portfolio/listing graph 1626 (which may include multiple layers) may include an adjacency list and a secondary index that are stored by the graph processing service (not shown).

As illustrated in FIG. 16, the interactions with graph processing service 1620 that may be initiated by an end user 1630 may include an operation to browse listings (shown as 1632), an operation to view a listing (shown as 1631), or an operation to get launch contexts for a listing (shown as 1633), each of which may be initiated through an API call defined for interactions with graph processing service 1620. Note that, in this example, the "view listing" API may allow an end user 1630 to view a detail page for a specific product, while the "browse listings" API may be used for more general searches that are directed to the listings to which the end user 1630 has access. As illustrated in this example, the end user 1630 may also be able to initiate the launching (by a product fulfillment platform 1640) of a particular product listing (shown as 1634). In this example, the product fulfillment platform 1640 (e.g., a desktop application fulfillment platform such as platform 126 in FIG. 1, or a resource stack management service such as service 132 in FIG. 1) may send a request to graph processing service 1620 to retrieve any or all launch contexts (including all applicable constraints for each potential context) under which the product may be launched.

Figure 17:
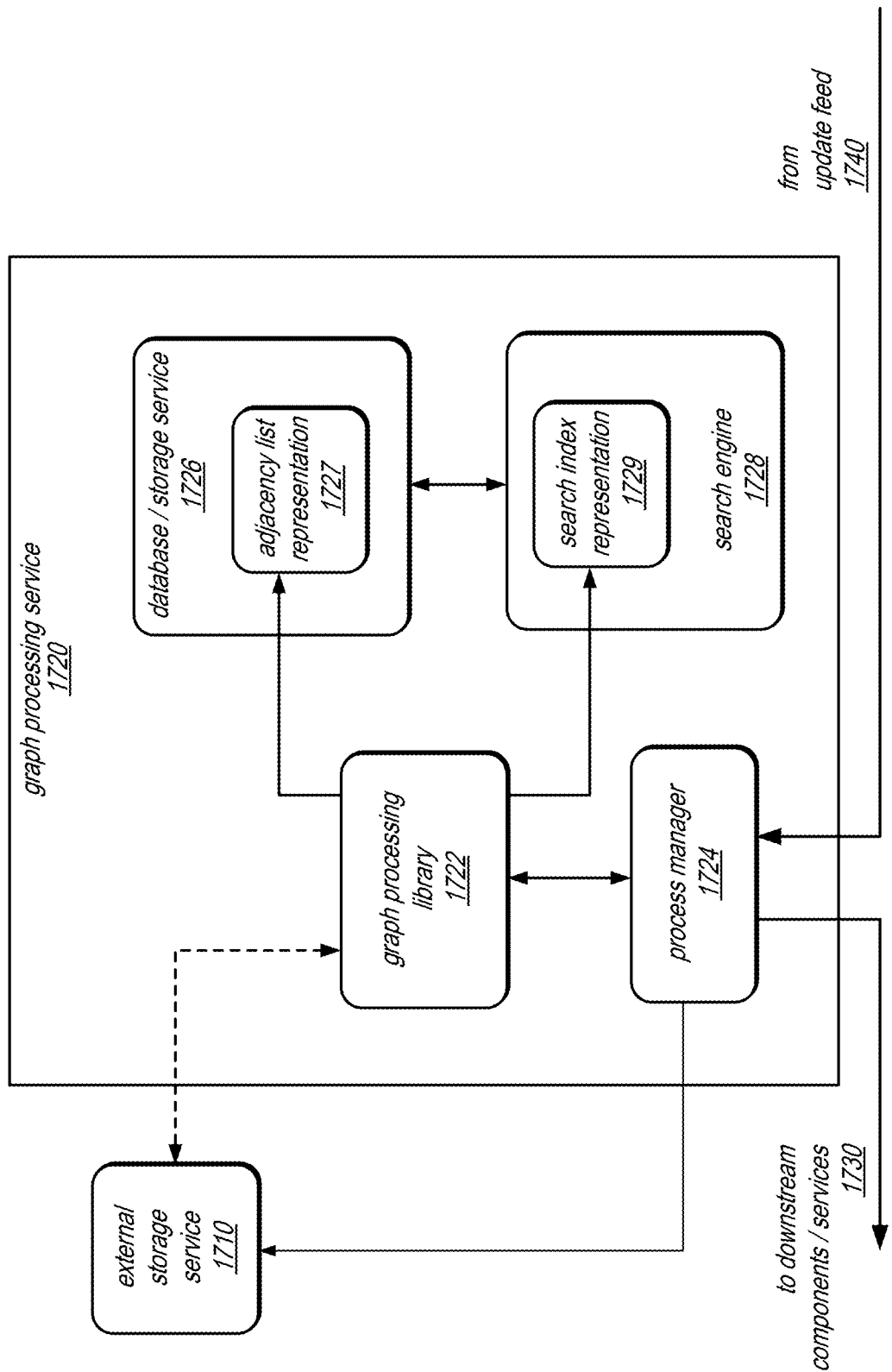
FIG. 17 is a block diagram illustrating the components of a graph processing service, according to at least some embodiments.

FIG. 17 is a block diagram illustrating the components of a graph processing service within an enterprise catalog service, according to at least some embodiments. As illustrated in this example, the graph processing service 1720 may implement (or include) a database service or another type of key-value storage service (shown as database/storage service 1726), which may be implemented locally or may be physically hosted on a computing resource instance in the cloud, in different embodiments. This database/storage service may be configured to maintain a graph representation (including, for example, an adjacency list representation 1727) of the data maintained in a definitive data store that serves as the source-of-truth for the data about principals, portfolios, product listings, and constraints (and relationships between them) in the enterprise catalog service. As described herein, in the adjacency list storage, each vertex row may contains its properties, plus its inbound and outbound edges, and for each label type in the vertex row, there may be an option to specify a sort key (e.g. timestamp) which allows range-key like operations to be performed on the edges for the label.

As illustrated in this example, graph processing service 1720 may also include a search engine component (shown as search engine 1728) that is configured to maintain a search index representation 1729 of the data in adjacency list representation 1727 and the definitive data store (e.g., in an object or document storage service). The search engine component may be implemented locally or may be physically hosted on a computing resource instance in the cloud, in different embodiments. In some embodiments, the search index document format may enable queries that include any combination of search criteria for vertex and/or edge properties.

In this example, graph processing service 1720 may also include a process management component (shown as process manager 1724), which may control and a graph processing library 1722, which may control jobs/processes for building the primary graph representation (e.g., adjacency list representation 1727) from messages 1740 received from an upstream component of the enterprise catalog service (e.g., the definitive data store), for building the search index representation 1729 from the primary graph representation (e.g., adjacency list representation 1727), and/or for performing backup and/or auditing operations (e.g., backing up the graph data that is created and maintained by graph processing service 1720 to an external storage service 1710 and/or comparing the backed up graph data to the data currently held in adjacency list representation 1727 and/or search index representation 1729). Process manager 1724 may also be responsible for communicating any changes that were made to the graph data that is created and maintained by graph processing service 1720 to other downstream components in the enterprise catalog service (e.g., various product fulfillment platforms or components thereof).

In some embodiments, process manager 1724 may send notification messages downstream in response to any the following events:
  Creation, Modification (attribute updates), Deletion of a Listing
  Assignment, Removal of a Listing from a Portfolio
  Creation, Modification, Deletion of a constraint for a given Listing-Portfolio
  Creation, Modification (attribute updates), Deletion of a Portfolio
  Assignment, Removal of an IAM user from a Portfolio
  Creation, Modification, Deletion of a constraint for a given IAM user-Portfolio
  Assignment, Removal of an IT Admin (AWS Root Account) from a Listing (Line of Business Apps)

In some embodiments, backup processes and/or auditing processes may be initiated and/or controlled by the process manager (e.g., a process for one of these operations may periodically wake up and run, using a thread from a thread pool). Note that backup of the graph representations of enterprise catalog data described herein may be performed at multiple levels. At one level, the semantics of the backup are vertices, edges, graph metadata etc. The second level may include the backend components that the graph library uses to store the raw data. In some embodiments, each of these backup processes may have a periodic job that computes the backup for each system and pushes an encrypted, backup file to a versioned object-storage service bucket.

Graph Building, Auditing, and Rebuilds

In some embodiments, the index builder component of the graph processing service described herein may be the sole writer/constructor of the secondary search index for the graph representations of enterprise catalog data. In some embodiments, it may be implemented as a long running process manager job per host/worker. As previously noted, the search index may include the de-normalized edges of the graph data model indicating that at least one path exists for a given principal-listing pair. Therefore, when building the search index, if a principal is assigned to a portfolio then all these "path exists" edges for the products within the portfolio may be added to the search index.

As previously noted, the primary graph representation may be derived from the source-of-truth maintained (e.g., in database tables or in another key-value storage system) by an upstream service of the enterprise catalog service platform, with the primary data store including standard indices and secondary indices, and an external secondary index maintained by a separate search engine. Therefore, multiple auditing processes may be used to detect and resolve discrepancies between these different representations of the enterprise catalog data.

Figure 18:
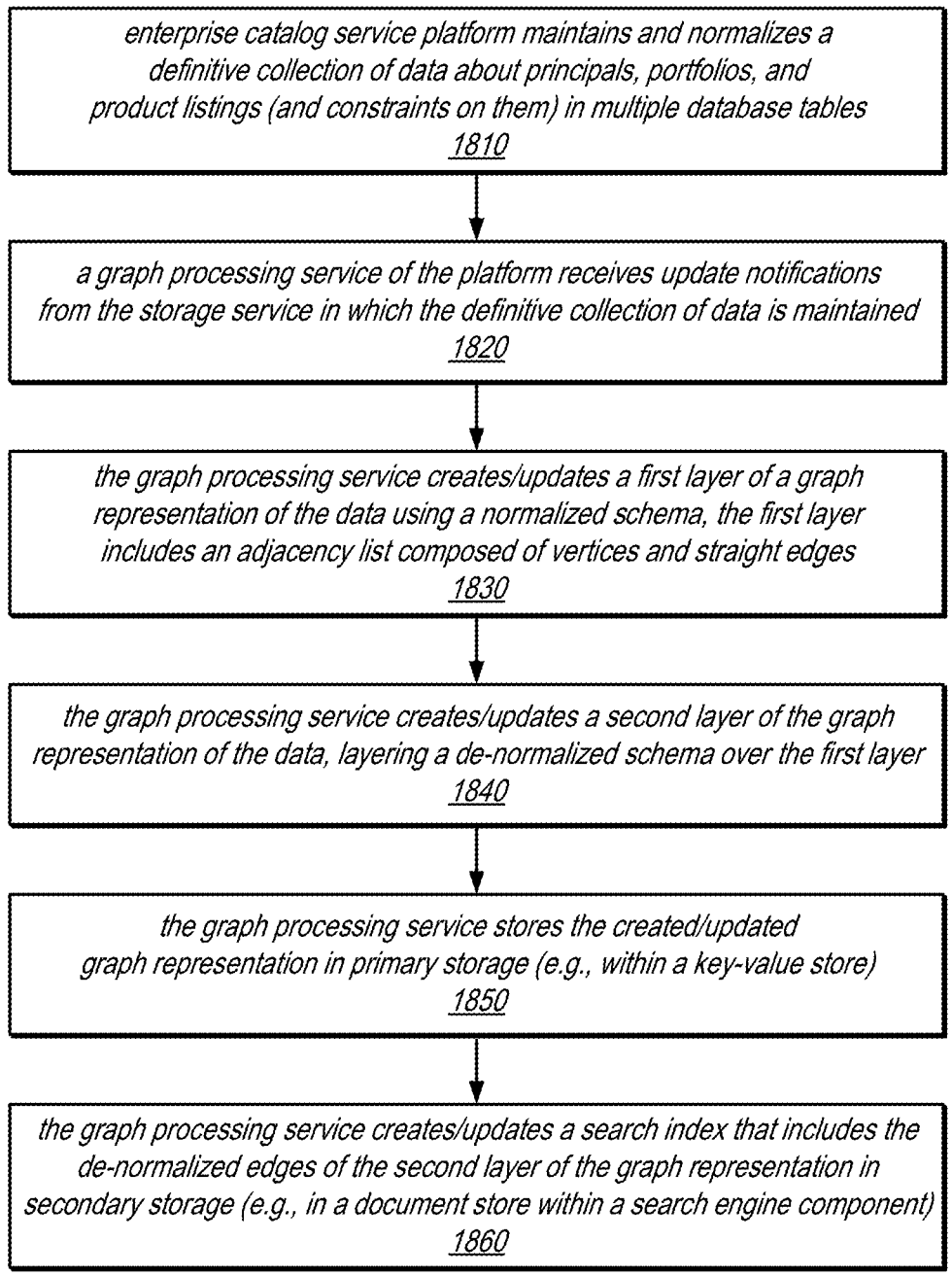
FIG. 18 is a flow diagram illustrating one embodiment of a method for updating a graph representation of data used in managing access control, launch contexts, and searches within an enterprise catalog service in an enterprise catalog service platform.

FIG. 18 is a flow diagram illustrating one embodiment of a method for updating a graph representation of data used in managing access control, launch contexts, and searches within an enterprise catalog service in an enterprise catalog service platform. As illustrated at 1810, in this example, the method may include an enterprise catalog service platform maintaining and normalizing a definitive collection of data about principals, portfolios, and product listings (and constraints on them) in multiple database tables (e.g., in a database service). The method may include a graph processing service of the platform receiving one or more update notifications from the storage service in which the definitive collection of data is maintained, as in 1820. The may include the graph processing service creating or updating a first layer of a graph representation of the data using a normalized schema, where the first layer includes an adjacency list composed of vertices and straight edges (as in 1830).

As illustrated in this example, the method may include the graph processing service creating or updating a second layer of the graph representation of the data, which may include layering a de-normalized schema over the first layer (as in 1840). The method may also include the graph processing service storing the created/updated graph representation in primary storage (e.g., within a key-value store), as in 1850. In response to creating or updating the first and second layers of the graph representation of the data, the method may include the graph processing service creating or updating a search index that includes the de-normalized edges of the second layer of the graph representation in secondary storage (e.g., in a document store within a search engine component), as in 1860. In this example, the de-normalized edges may serve as index within the primary storage (where the adjacency list portion of the graph is stored), and also as a search index in secondary storage. In other words, both layer 1 and layer 2 of the graph representation of the data may be maintained in the primary storage, but only layer 2 of the graph representation (the de-normalized edges) is included in secondary storage in the search engine component. For certain types of queries, searching the documents representing the search index (e.g., the de-normalized edges) in the secondary storage may be more efficient than searching the adjacency list representation in the primary storage. Note that, in some embodiments, any or all of the operations illustrated in FIG. 18 may be repeated (e.g., continuously, or as appropriate) in order to maintain the graph representation and the secondary search index for the enterprise catalog service.

As noted above, some of the changes to the data in the graph representation and search indexes described herein may be initiated in response to interactions between users (e.g., IT administrators or end users within a customer organization) and the enterprise catalog through the consoles of various product fulfillment platforms (or through other consoles or interface mechanisms). One embodiment of a graphical user interface (GUI) 1900 for a desktop application management module that is installed on an end user's computing resource instance, such as desktop application management module 128 illustrated in FIG. 1, is illustrated by the block diagram in FIG. 19. In this example, an end user has chosen to view applications that are assigned to the end user or are part of a private catalog or portfolio of applications made available to the end user and/or one or more other end users by an IT administrator in the same business, enterprise, or organization ("my desktop applications"). In some embodiments, the list of applications presented by the selection of "my desktop applications" may include the union of the set of applications that have been individually and directly assigned to the end user and any applications included in portfolios with which the end user is associated and for which the end user has been granted access permissions (e.g., a logical private catalog for the end user), even if the end user is not aware of these associations. For example, in some embodiments, the end user may have no knowledge of (or visibility into) the concept of a portfolio, and may not know which, if any, of the applications in the end user's private catalog are included in a portfolio. In response to this selection, a list of applications is presented to the end user. In this example, the list of applications indicates, for each application, an application name, the vendor from which the application is sourced, and an available action that can be taken for the application (e.g., "install", for an application that is not currently installed on the end user's computing resource instance, or "uninstall", for some of the applications that are currently installed on the end user's computing resource instance). Note that for several of the applications, the action is shown as "required." This may indicate that these applications must be installed on the end user's computing resource instance (e.g., they may have been installed automatically when the computing resource instance was configured or when the desktop application management module was launched) and cannot be uninstalled (until and unless this requirement changes). Note that one of the applications in the list (a task tracking tool) was developed by the end user's company and ingested by the service provider for management through the application fulfillment platform. Note also that GUI 1900 includes a user interface element whose selection allows an end user to upload an application (e.g., an application developed by the end user or by other end users in the end user's company).

In GUI 1900, applications may be listed in any order, in different embodiments, e.g., in alphabetical order by name or vendor, by application type (e.g., productivity applications, data analysis applications, line-of-business applications, etc.), or by availability (e.g., required applications, optional applications that have been installed, optional applications that have not been installed, etc.). As illustrated in this example, the end user may have the option to search the list of applications in order to display specific ones of the applications in the user interface for the desktop application management module. Note that this catalog may include customer-specific line-of-business applications (such as the task tracking tool described above); applications that were developed and/published by the service provider; applications that were developed, published, and/or otherwise sourced by an entity other than the end user's company or the service provider and that were purchased or licensed by the service provider for the benefit of service provider customer and their end users; and/or applications that were developed, published, and/or otherwise sourced by an entity other than the end user's company or the service provider and that were purchased or licensed by the end user's company for the benefit of their end users.

As illustrated in this example, an IT administrator may ingest line-of-business applications (e.g., line-of-business applications developed by their own organization) and may manage the life cycle of those applications just as they would manage the life cycle of applications sourced by other entities. For example, to ingest a new line-of-business application, the IT administrator may (e.g., through an administrator/management console of the enterprise catalog service) provide application metadata for the new application that includes a name, title, and description. An ingestion workflow may put the application through a series of automated validation steps to ensure that the software is compatible with virtual desktop instance on which it may be executed. Subsequently, once the service provider and the IT administrator approve the listing, the product may be published to the application fulfillment platform. In some embodiments, the line-of-business application may be added to an enterprise-wide or default catalog for the customer organization (e.g., one that is owned by the IT administrator and managed through the enterprise catalog service) upon ingestion, but it may be visible only within the context of the customer organization's service provider account for listing alongside other applications available to the IT administrator and end users in the customer organization in the GUI for the application fulfillment management module.

As illustrated in this example, in some embodiments the end user may (e.g., based on constraints or permissions applied by their IT administrator) have the option to view a "full application catalog." In some embodiments, this catalog may include customer-specific line-of-business applications (such as the task tracking tool described above), applications developed and/or published by the service provider, and/or applications developed and/or published by someone other than the end user's company or the service provider. However unlike in the example illustrated in FIG. 19, the full application catalog may include customer-specific line-of-business applications, applications developed and/or published by the service provider and/or third party applications that have not been assigned to the end user or that are included in a catalog that is made available to the end user by their IT administrator (including some for which the business, enterprise, or organization does not yet have a subscription or license) instead of, or in addition to, applications that are included in a catalog or portfolio of applications that have been made available to the end user and/or one or more other end users by an IT administrator (whether or not the applications are assigned to the end user). For example, the list of applications presented in the graphical user interface may include all of the applications that are listed in the display presented in FIG. 19 plus one or more applications that are not currently assigned to the end user or included in the end user's private catalog that is presented in FIG. 19. In some embodiments, the end user may select a "request" action in order to request access to (e.g., a subscription to) one of these applications. If the application has not yet been licensed by the service provider or the end user's company, selecting this action may, if the request is approved, initiate the acquisition and/or licensing of the application by the service provider or the end user's company and the ingestion of the application into the application fulfillment platform. Note that, in some embodiments, an application may be marked as having an installation type of "request access" for one or more end users, meaning that the application is discoverable by those end users, but cannot be installed or launched by those end users until or unless a request to access the application is approved (e.g., by the IT administrator).

Figure 19:
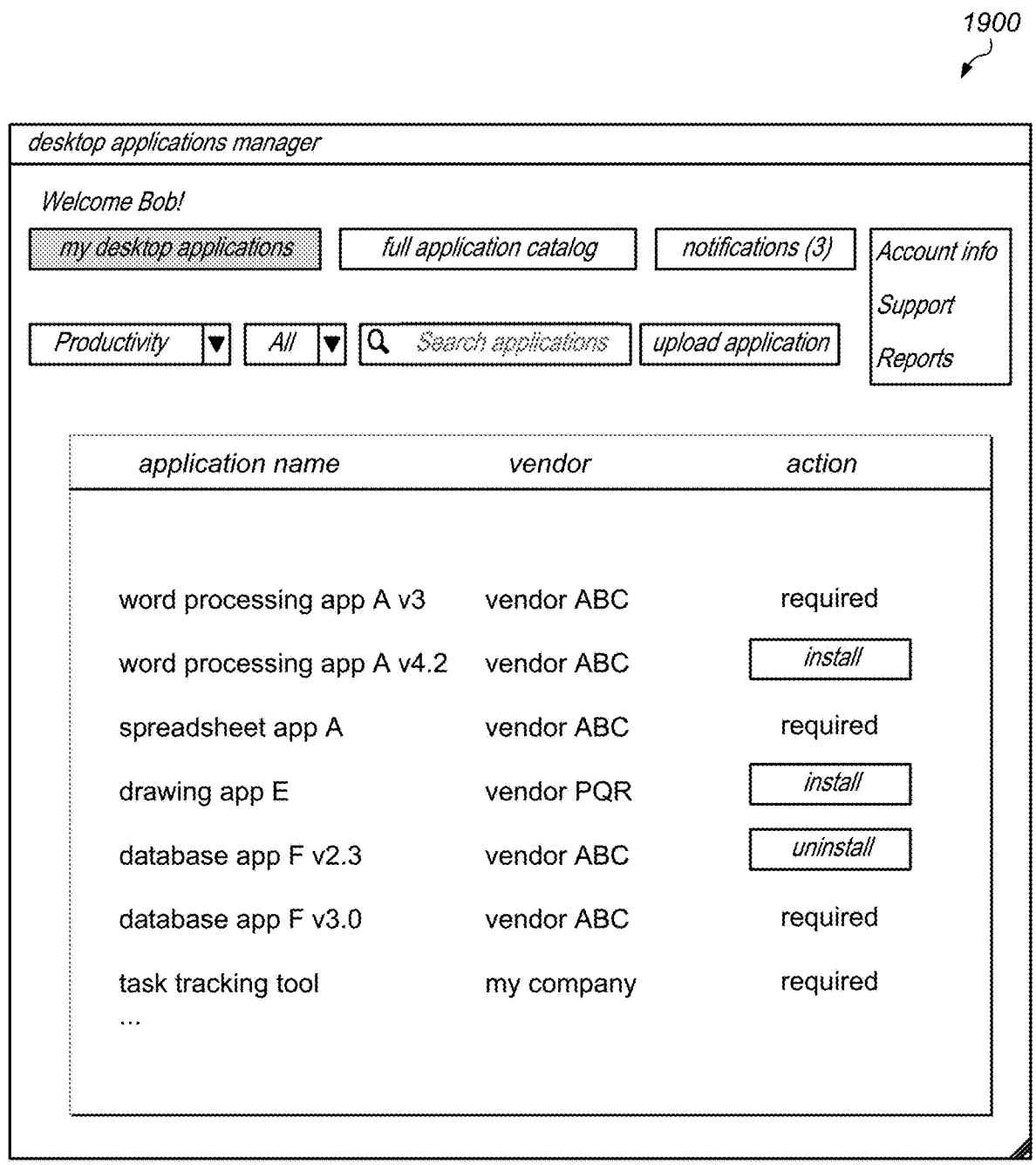
FIG. 19 illustrates an example of the information presented through a graphical user interface for a desktop application management module, according to at least some embodiments.

Note that, as illustrated in FIG. 19, in some embodiments, the end user may also have the option to view "notifications" through the user interface of the desktop applications management module. For example, the end user may receive a notification when a new application is made available to the end user individually, is added to a catalog or portfolio of applications that are assigned or are otherwise available to the end user, or is added to the full application catalog, or when a new generation or version of an application to which the end user is currently subscribed is made available.

As illustrated in FIG. 19, the end user may request one or more reports (e.g., through selection of the "Reports" item in the user interface of the desktop application management module). As described above, these reports (which provide usage information for various applications, such as those applications that are assigned or are otherwise available to the end user) may be generated on demand (e.g., in response to requests from an IT administrator or end user) or periodically, and may be presented to an IT administrator or end user when they are generated or upon request, according to various embodiments. Note that the graphical user interface 1900 may, in other embodiments, display more, fewer, or different elements than those illustrated in the example shown in FIG. 19. For example, in some embodiments, an additional user interface element may display a list of top rated (or most heavily used) applications for this enterprise or for all customers, links to ratings or reviews of applications, or any other information about applications that are currently available to (or may be request by) the end user. In addition, the user interface elements included in a graphical user interface for a desktop application management module may, in other embodiments, take different forms (e.g., as menu items, icons, radio buttons, text boxes, check boxes, or other user interface element types) and/or may be arranged in a different order or in different positions within the GUI than the order or positions in which they are arranged in FIG. 19.

In some embodiments, GUI 1900 illustrated in FIG. 19 may also include a user interface mechanism (not shown) that, when selected, allows the end user to view more information about an application (e.g., one that is assigned to them, one that is included in a catalog or portfolio of applications to which they have access, or one that they have discovered but do not currently have permission to install, subscribe to, or launch). The information presented in response to selection of this option may include a description of the application, the status of the application (e.g., indicating whether it is required, is optional and assigned to the end user, is available from the enterprise catalog service but not currently assigned to the end user, or not currently available from the enterprise catalog service, in which case the end user may request a subscription), ratings for the product, reviews of the product, subscription or licensing terms, pricing information, and/or version and life cycle information, in some embodiments.

In some embodiments, once an end user logs into the desktop application management module, their applications (e.g., any application assigned to the end user) may be available and ready to use. In some embodiments, the end user may access their application just like they access any other desktop applications (e.g., through a start menu or a desktop icon or shortcut). Through the desktop application management module, the end user may be able to select one or more of the following options:

View information about applications that were made available to the end user by their IT administrator Subscribe to optional applications Remove optional applications Request access to additional applications that are listed in the full application catalog, which may include applications sourced by the service provider and/or by third parties (if enabled by the IT administrator)

Back up their application and configurations (e.g., automatically)

Receive notification about applications and application updates

In some embodiments, if the IT administrator has designated an application as "required" for a given end user, it will be installed on an end user's virtual desktop instance by default, and cannot be removed. However, if the IT administrator has designated an application as "optional", it may only be installed on the end user's virtual desktop instance if the end users choose to subscribe to the application. As noted above, if the IT administrator has enabled the full application catalog as viewable for a given end user, user group, catalog, or portfolio, the end user may be able to discover additional applications that are sourced by the service provider and/or third parties, and select a "request application" option, which may automatically submit a request to the IT administrator for the selected application.

In some embodiments, when a software vendor provides an update to the application fulfillment platform (or to the service provider) the service provider may (e.g., through the application fulfillment platform) publish the update and make it available to end users (e.g., through the desktop application management module. In some embodiments, the IT administrator may be able to control the maintenance window in which application updates are applied to the computing resource instances of its end users. In such embodiments, if an end user is using an application that is targeted for an update during the maintenance window, the end user will not experience any interruption, because the update will occur in the background. However, the next time the end user launches the application, the update will be applied. In some embodiments, there may be a notification engine within the desktop application management module that is configured to inform end users of upcoming application updates and newly available features. The notification engine may be accessed through the desktop application management module graphical user interface (e.g., using a "notifications" tab in the corresponding GUI), or using other mechanisms, in different embodiments. For example, if the IT administrator has made new optional applications available for end users to subscribe to, they may be notified through the desktop application management module. In some embodiments, the application fulfillment platform may preserve application state by automatically backing up applications and application data for subsequent copy or restore operations. For example, if the virtual desktop instance is rebuilt, the applications and application data may be automatically restored on the virtual desktop instance. Similarly, upon rebooting an end user's machine after a failure, the virtual desktop instance may automatically be rebuilt, and the applications and application data may be automatically restored.

In one example, an end user may (through the desktop application management module) select an option to subscribe to a particular listed application. In response, a subscribe request may be sent an application fulfillment service (e.g., a service implemented by an application fulfillment platform). In this example, the subscription request may indicate that user X on machine Y connected to domain Z requests access to the selected application. The fulfillment service may verify whether the end user is entitled to use the selected application and, if so, may initiate the execution of a "create fulfillment" workflow that delivers the requested application to the end user's physical computing device or virtual desktop instance, adds it to a default catalog for the end user's organization (e.g., a catalog owed by an IT administrator), and assigns it to the end user (or multiple end users). The workflow may also include a sequence of steps to prepare the application for launching that include registering a virtual desktop session, virtualizing the selected application, generating an icon or shortcut for the virtualized application and placing it on the end user's machine (e.g., on the desktop or on the virtual desktop) and/or adding the virtualized application to a start menu or other interface mechanism, among other actions.

In some embodiments, an IT administrator may use approval chains to require a manual approval prior to a product being used or a resource stack being updated or deleted. For example, an approval chain (which includes a set of steps) may be associated with a product by the IT administrator. Each step consists of a notification sent to a user, administrator or decision maker. The notification contains a link to approve or deny the request along with information about the user and the product to inform the decision to approve or deny the request. In various embodiments, approval chains may be applied to all products in a portfolio or to individual products. In some embodiments, when an attempt is made to use a server product that has an associated approval chain or to update or delete of resource stack that has an approval chain, the resource stack may be put in an "approval pending" state until it has been fully approved through the approval chain. In some embodiments, while the resource stack is in this state, the IT administrator and/or end user who initiated the operation on the product may be able to view the current approval step through the administrator/management console or end user console to track the progress of the product through the approval process. In this example, once all approvals have been accepted, the operation will continue.

As described in detail herein, an IT administrator may in some cases retain full control of the service provider resources that are associated with a product that is provisioned for the benefit of their organization. For example, the IT administrator may have full control over the service provider accounts and roles used to provision products for their end users. The service provider resources may be provisioned in either the end user's account or in the IT administrator's account (which may be the customer organization's root account). To retain full control over the service provider resources, the IT administrator may specify (e.g., at a catalog/portfolio level or a product level), that resources should be provisioned in the IT administrator's account or the organization's root account. For example, when providing a server product that is implemented as a resource stack, the IT administrator may specify that the underlying service provider resources should be provisioned in the IT administrator's account and may provide a link to the resulting service as an "output". For such a product, end users would be able to see that the service was created (and retrieve the corresponding URL for the service), but would not be able to view or access the service provider resources.

In some embodiments, whether a product is provisioned in the end user's account or the IT administrator's account, the IT administrator can view the products that have been provisioned from a catalog or portfolio that the IT administrator owns (e.g., by specifying an identity and access management role for products that are provisioned under the end user's account). For products built from resource stack templates, the IT administrator may also track product usage through the administrator/management console. For example, the IT administrator may be able view information about the products, the account(s) in which they have been provisioned, the health state, and the costs currently associated with the product.

Figure 20:
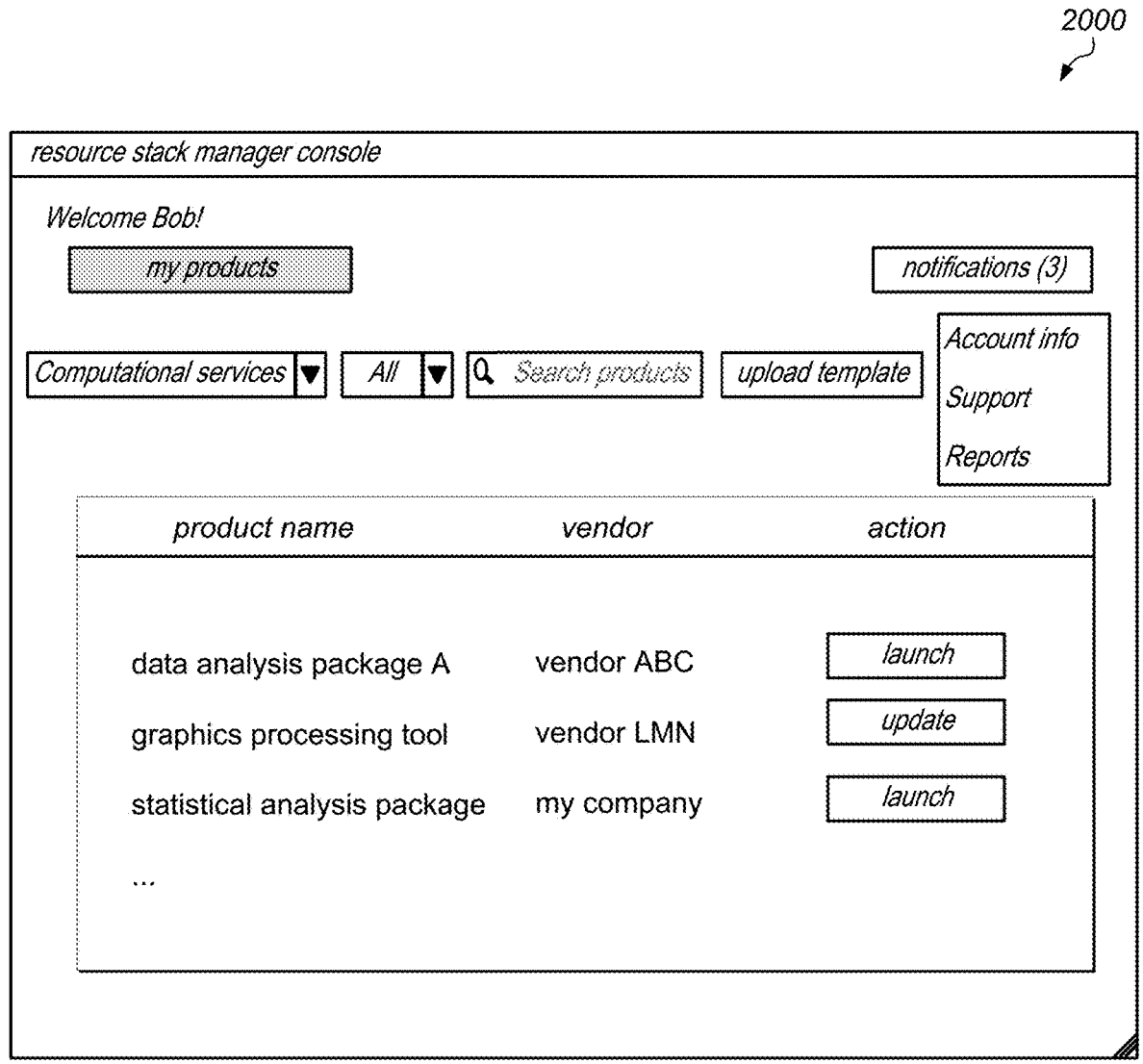
FIG. 20 illustrates an example of the information presented to an end user through a graphical user interface of a resource stack management service console, according to at least some embodiments.

FIG. 20 illustrates an example of the information presented to an end user through a graphical user interface (GUI 2000) of a resource stack management service console, according to at least some embodiments. In this example, the information may be presented to an end user who wishes to search for, select, and launch a service (e.g., a server product) that is managed by an enterprise catalog service (e.g., in response to selection of the "my products" tab near the top of the display). More specifically, the end user has chosen to filter their search results by choosing "Computational services" from among multiple product type options. In this example, GUI 2000 also presents options for the end user to upload a resource stack template ("upload template"), to generate and/or view reports (e.g., server product deployment reports), and to view (and, in some cases, take action in response to) notifications. Note that in some embodiments, the end user may also be presented with an option to create a resource stack template, while in other embodiments, only an IT administrator or other privileged user may be allowed to create a resource stack template (e.g., through a management interface of the enterprise catalog service).

The information presented in this example includes, in one portion of the display, a list of server products (e.g., server-type applications that execute on a service provider system on behalf of an end user and return a response), each of which may be constructed using a respective resource stack template, along with the vendors that developed or published the server products (or corresponding resource stack templates) and/or from which they were obtained, and user interface elements that may be selected if the end user would like to launch or update a particular one of the listed server products. More specifically, this portion of the display presents a list of computational services for selection by the end user, including a data analysis package A from vendor ABC, a graphics processing tool from vender LMN, and a statistical analysis package that was developed by the end user's organization (e.g., a customer-specific line-of-business service) and was previously uploaded to, and ingested by, the enterprise catalog service. In this example, if the end user were to select an option to launch one of these server products, this may initiate a workflow to provision and deploy a resource stack for the selected service, according to a resource stack template for the selected service (e.g., one that is stored in a private catalog or portfolio to which the end user has access).

As previously noted, products selected from the enterprise catalog service and launched on behalf of end users may be provisioned and/or executed under the end user's account, roles, and permissions or using the account, roles, and permissions of another user (e.g., the IT administrator or another user with higher permission levels than the end user). In various embodiments of the enterprise catalog service, some or all of the following use cases may be supported:

1. An end user selects and launches a product from a catalog or portfolio and the resource stack (and resources) are created in the end user's account. In this case, all operations of the resource stack management service, as well as operations of underlying services within resource stack management service and/or the enterprise catalog service, are performed as the end user (using forward access sessions).
2. An end user selects and launches a product from the catalog or portfolio that has an identity and access management (IAM) role associated with it. In this case, all operations of the resource stack management service, as well as operations of underlying services within resource stack management service and/or the enterprise catalog service, are performed using the IAM role specified by the product (e.g., by assuming that IAM role). This may enable administrators to define products that contain an array of service provider resources without the end user having IAM permissions to the underlying services. In this case, the end user may only need access to the enterprise catalog service APIs.
3. As an extension of use case 2 above, the role associated with a product may be in a different account from the end-user. This may allow for "managed service" scenarios in which the end user controls the (create, update, delete) life cycle of the resource stack, but does not have access to, or even need to know about, the resources that are being used to implement the resource stack.

In the latter two cases, the service catalog runtime may act as a trusted entity allowing administrators to define IAM policies for the roles that only allow the service catalog runtime to assume them. This may allow administrators to lock down end user accounts so that they may only launch and manage services through the service catalog. In some embodiments, the catalog service may store metadata about the product (name, description, etc.), and the service catalog runtime may be responsible for defining and storing additional information about a product. For example, the service catalog runtime may be responsible for defining the raw resource stack template that defines the resources that must be created for the product (which may include any resource supported by the resource stack management service other than IAM resources), resource stack constraints, a parameter grouping document, and/or an IAM role that the service catalog runtime will assume when the product is acted upon. Note that, although constraints live inside the template, constraints may also be added at several levels within the service catalog, and the constraints documents may be joined together as part of processing the inputs when a stack is launched or updated. Among other things, the constraints may define what values a user may pass into the parameters during construction. The parameter grouping document may define the ordering/grouping of parameters for the console when rendering them to the end user. This feature may allow the creator of the product to have some control over how these options are presented in the console when a user is creating a resource stack.

In various embodiments, the resource stack management service may expose any or all of the following APIs:
  LaunchStack—This API creates a resource stack for the provided product.
  TerminateStack—This API deletes a specified resource stack and all resources associated with it.
  DescribeStack—This API provides detailed information about a resource stack (e.g., input parameters, outputs, etc.).
  ListStackEvents—This API provides a list of events for a resource stack (e.g., resource creation, updates, etc.). In some embodiments, this list may be filtered for certain users (e.g., they may not be able to see the service provider resources).
  ListStacks—This API lists all of the resource stacks for the account, along with basic information about them.
  UpdateStack—This API updates a product to a new version of the product.
  UpdateStackConfiguration—This API allows updates to the input parameters of a stack, giving IT administrators more control over what their end users can do.

As noted above, in some embodiments, an IT administrator (or other privileged user) who defines a portfolio can share their portfolio of products, permissions, and constraints with other users (e.g., with other customer accounts) and/or replicate them across regions (or across IT administrators) as an atomic unit. Using these mechanisms, the recipients of the shared or replicated portfolio may get access to the products, and inherit the permissions and constraints that were defined by the portfolio owner without having to build or configure such portfolios themselves from scratch. As noted above, the recipients may be able to further constrain the use of the products in the shared or replicated portfolio, add users to the shared or replicated portfolio, and/or add other types of permissions to the shared or replicated portfolio (e.g., further limiting access to the shared or replicated portfolio), but may be unable to modify the existing portfolio. As described above, in order to share a portfolio, the sharer may specify an account with which the portfolio is to be shared. In some embodiments, a potential recipient of a shared portfolio may request that a particular portfolio be shared with them, as long as they know its portfolio key. In other words, a portfolio may not be discoverable except by those with whom the portfolio key has been shared. As noted above, when and if the portfolio owner modifies the portfolio, their changes may be automatically be picked up by the recipients. In some embodiments, before the portfolio is actually shared, a request to share the portfolio may need to be approved (e.g., by one or more managers within the customer organization of the sharer).

The graph processing services described herein may, in different embodiments, support a variety of query strategies for different searches relevant to the enterprise catalog service. For example, different query strategies may be employed for the SearchListings or BrowseListings APIs, depending on the level of de-normalization (user-listing edges) that are included in the model. To ensure that certain queries can be executed in real-time, some amount of de-normalization may be supported by the graph processing service, as described herein. In addition to the APIs described above (e.g., IsUserAuthorizedForListing, GetLaunchContexts, GetListingCountForPortfolio, and GetPortfolioCountForListing), other APIs that may be supported by the graph processing service may include a GetUserCountForListing API, a GetUserCountForPortfolio API, a GetAdminCountForPortfolio API, a GetInstallCountForPortfolio API, or a GetLaunchContextsDiff API, each of which may employ one or multiple query strategies to obtain the desired information.

Figure 21:
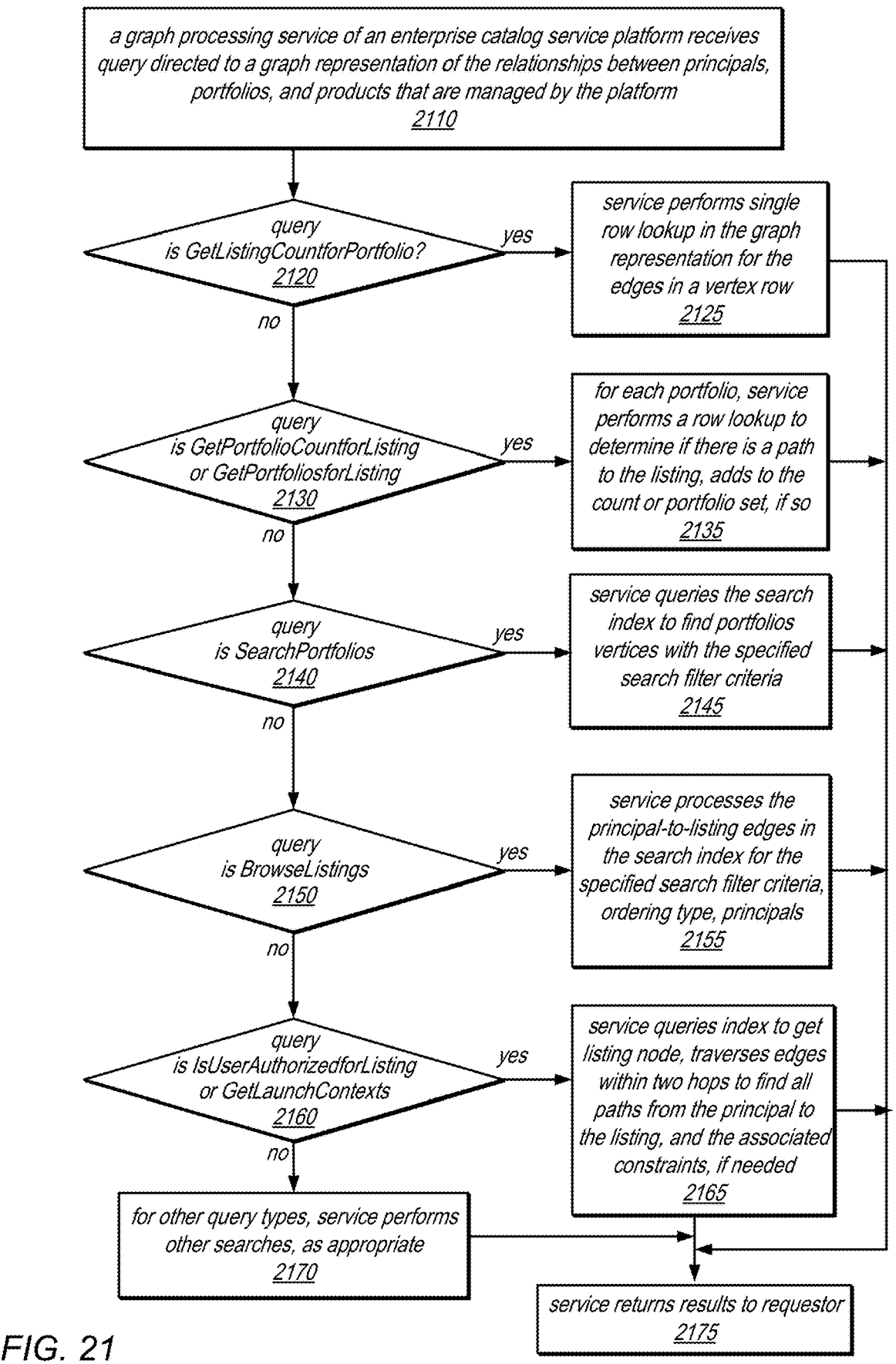
FIG. 21 is a flow diagram illustrating one embodiment of a method for handling at least some of the possible queries that may be directed to a graph processing service of an enterprise catalog service.

FIG. 21 is a flow diagram illustrating one embodiment of a method for handling at least some of the possible queries that may be directed to a graph processing service of an enterprise catalog service. As illustrated at 2110, in this example, the method may include a graph processing service of an enterprise catalog service platform receiving a query that is directed to a graph representation of the relationships between principals, portfolios, and products that are managed by the platform. If the query is a GetListingCountforPortfolio query, shown as the positive exit from 2120, the method may include the service performing a single row lookup in the graph representation for the edges in a vertex row (e.g., for the vertex corresponding to the portfolio), as in 2125.

If the query is a GetPortfolioCountforListing or GetPortfoliosforListing query, shown as the positive exit from 2130, the method may include, for each portfolio, the service performing a row lookup to determine if there is a path to the listing, and, if so, adding to the count of portfolios for the listing or adding the portfolio (e.g., an identifier of the portfolio) to a set of results, as in 2135. If the query is a SearchPortfolios query, shown as the positive exit from 2140, the method may include the service querying the secondary search index to find portfolios vertices with the specified search filter criteria, as in 2145. If the query is a BrowseListings query, shown as the positive exit from 2150, the method may include the service processing the principal-to-listing edges in the search index for the specified search filter criteria, ordering type, and principal(s), as in 2155.

If the query is a IsUserAuthorizedforListing or GetLaunchContexts query, shown as the positive exit from 2160, the method may include the service querying the secondary search index to get the listing node, and traversing the edges within two hops of that node to find all paths from the principal to the listing (and the associated constraints, in the case of a GetLaunchContexts query), as in 2165. As illustrated in this example, if the query is a query of another type, shown as the negative exit form 2160, the method may include the service performing other types of searches on the primary graph representation and/or the secondary search index, as appropriate, as in 2170. Following the handling of any of these example queries, the method may include the graph processing service returning the results to the requestor, as in 2175.

Figure 22:
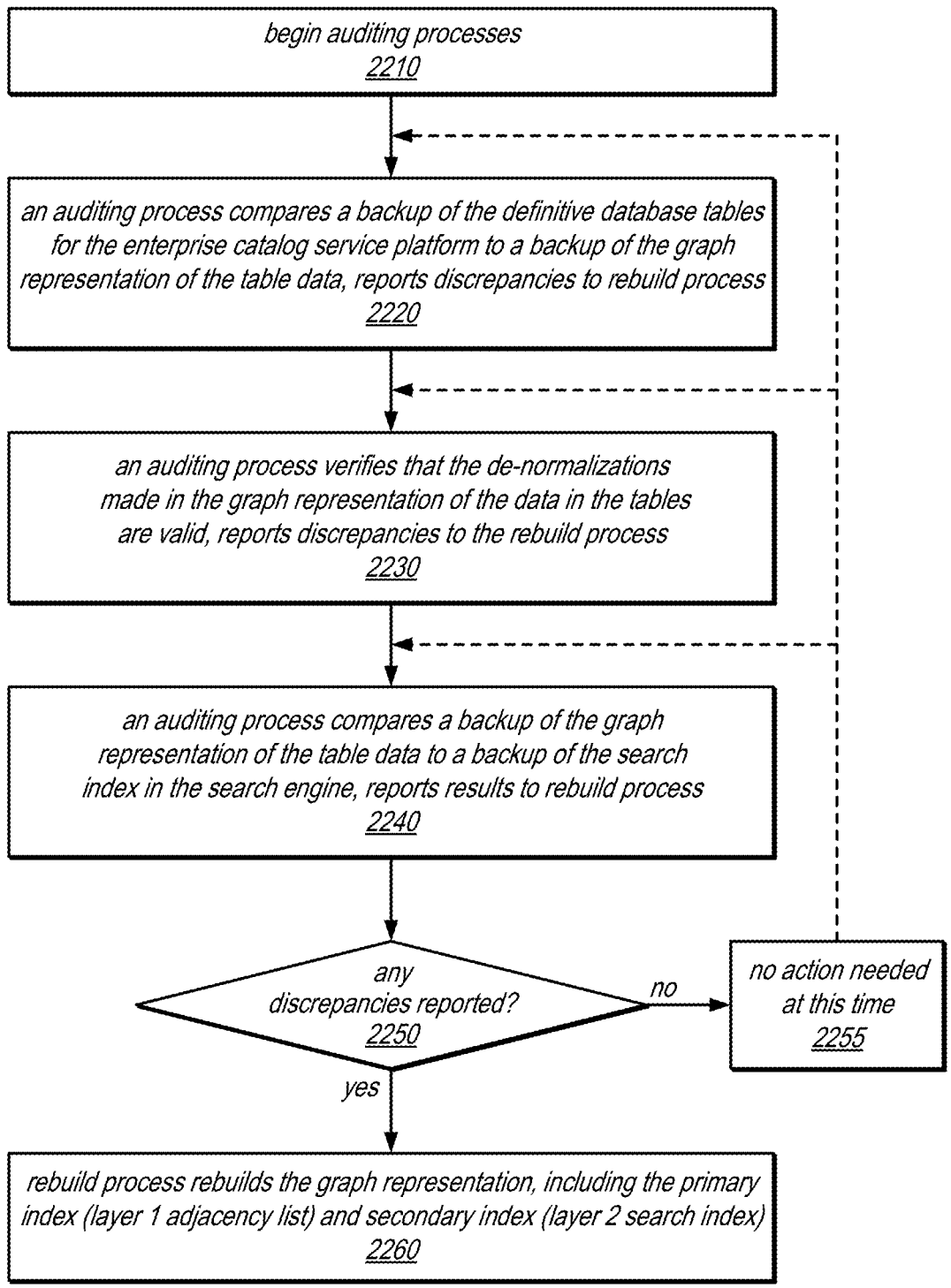
FIG. 22 is a flow diagram illustrating one embodiment of a method for performing audits and/or rebuild operations on behalf of a graph processing service of an enterprise catalog service.

FIG. 22 is a flow diagram illustrating one embodiment of a method for performing audits and/or rebuild operations on behalf of a graph processing service of an enterprise catalog service. In this example, after initiating one or more auditing processes (as in 2210), each of the auditing processes may perform different operations to determine whether or not a rebuilding operation is necessary. For example, one auditing process may compare a backup of the definitive database tables for the enterprise catalog service platform to a backup of the graph representation of the table data, and may report any discrepancies to a rebuild process, as in 2220. In other words, this auditing process may be configured to determine whether there are any discrepancies between the source-of-truth for the collection of data and the corresponding adjacency list representation that is maintained in key-value storage by comparing backups of each of these representations of the data.

As illustrated in FIG. 22, another auditing process may verify that the de-normalizations made in the graph representation of the data in the tables are valid, and may report any discrepancies to the rebuild process, as in 2230. In other words, this auditing process may be configured to compare layer 1 and layer 2 of the graph representation (e.g., as maintained in the primary storage) to determine whether each de-normalized principal-listing edge is still valid. Yet another auditing process may compare a backup of the graph representation of the table data to a backup of the search index in the search engine component, and may report the results to the rebuild process, as in 2240. In other words, this auditing process may be configured to determine whether there are any discrepancies between the secondary data store and the primary data store by comparing backups of each of these representations of the data.

As illustrated in FIG. 22, if no discrepancies are reported by any of the auditing processes, shown as the negative exit from 2250, no action may be needed at this time (as in 2255). However, if any discrepancies are reported by any of the auditing processes, shown as the positive exit from 2250, the method may include the rebuild process rebuilding the graph representation, including the primary index (layer 1 adjacency list) and secondary index (layer 2 search index), as in 2260. Note that while FIG. 22 illustrates an example in which three auditing processes are performed in a particular order, these auditing processes may be independent processes that can be performed in any order and at any time. Note that, as illustrated by the dashed lines from 2255 to 2220, 2230, and 2240, one or more of these auditing processes may be repeated (individually or collectively) in any order, periodically, and on the same or different schedules, in various embodiments.

In some embodiments, the enterprise catalog service platforms described herein may support a pay-as-you-go model in which, for example, customers are billed on a per user per month basis only for the products they use, and in which an unlimited number of a customer's own line-of-business applications may be deployed to its end users, along with any products for which the customer has procured licenses from the service provider or a software vendor. The platforms may also allow customers to track and manage software spending with detailed product and license usage reporting on a per product basis. In addition, they may allow customers to minimize up-front capital investment by using on-demand subscriptions. In some embodiments, the enterprise catalog service platforms described herein may improve end user productivity by providing self-service access to curated software products on-demand.

Illustrative System

In at least some embodiments, a server that implements some or all of the techniques for managing and deploying desktop applications and server products (including those included in various portfolios) through an enterprise catalog service as described herein may include a general-purpose computer system that includes or is configured to access a non-transitory computer-accessible (e.g., computer-readable) media, such as computer system 2300 illustrated in FIG. 23. For example, in various embodiments, any or all of the computer system components described herein (including, e.g., data center computers and/or other components on a service provider network that collectively provide virtual computing services and/or virtual storage services, virtualized computing resource instances, virtual machines, virtual machine monitors or hypervisors, and/or virtual desktop instances; or client computing devices or other components on a client network) may be implemented using a computer system similar to computer system 2300 that has been configured to provide the functionality of those components. In the illustrated embodiment, computer system 2300 includes one or more processors 2310 coupled to a system memory 2320 via an input/output (I/O) interface 2330. Computer system 2300 further includes one or more network interfaces 2340 coupled to I/O interface 2330. In some embodiments, network interfaces 2340 may include two or more network interfaces (including, e.g., one configured for communication between a virtualized computing resource hosted on the computer system 2300 and its clients, and one configured for communication between a virtualized computing resource and external resources, computing systems, data centers, or Internet destinations on networks other than the provider network and a client network on whose behalf the virtualized computing resources are hosted. In other embodiments, network interface(s) 2340 may be a single network interface.

In various embodiments, computer system 2300 may be a uniprocessor system including one processor 2310, or a multiprocessor system including several processors 2310 (e.g., two, four, eight, or another suitable number). Processors 2310 may be any suitable processors capable of executing instructions. For example, in various embodiments, processors 2310 may be general-purpose or embedded processors implementing any of a variety of instruction set architectures (ISAs), such as the x86, PowerPC, SPARC, or MIPS ISAs, or any other suitable ISA. In multiprocessor systems, each of processors 2310 may commonly, but not necessarily, implement the same ISA.

System memory 2320 may be configured to store instructions and data accessible by processor(s) 2310. In various embodiments, system memory 2320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for managing and deploying desktop applications and services through an enterprise catalog service, are shown stored within system memory 2320 as code 2325 and data 2326. For example, data 2326 may include information representing software products, virtualized application packages, resource stack templates, the assignment of selected software products to particular end users and/or user groups, constraints and/or configuration parameter settings for the selected software products, users, and catalogs or portfolios, usage data, billing information, various types of metadata that is maintained for particular software products, unique resource identifiers for products and portfolios (e.g., portfolio keys), information about entities with which constraints have been shared, and/or information about who a portfolio has been shared with and/or imported by, adjacency lists, search indexes, other graph representations data managed on behalf of an enterprise catalog service, and/or any other information usable in managing and deploying desktop applications and services, any of which may be stored in any of a variety of data structures or database tables within memory 2320 on one or more computing nodes of a service provider system and/or client computing device used in managing and deploying desktop applications and services through an enterprise catalog service, as described herein.

In one embodiment, I/O interface 2330 may be configured to coordinate I/O traffic between processor 2310, system memory 2320, and any peripheral devices in the device, including any of network interface(s) 2340 or other peripheral interfaces. In some embodiments, I/O interface 2330 may perform any necessary protocol, timing or other data transformations to convert data signals from one component (e.g., system memory 2320) into a format suitable for use by another component (e.g., processor 2310). In some embodiments, I/O interface 2330 may include support for devices attached through various types of peripheral buses, such as a variant of the Peripheral Component Interconnect (PCI) bus standard or the Universal Serial Bus (USB) standard, for example. In some embodiments, the function of I/O interface 2330 may be split into two or more separate components, such as a north bridge and a south bridge, for example. Also, in some embodiments some or all of the functionality of I/O interface 2330, such as an interface to system memory 2320, may be incorporated directly into processor 2310.

Network interface(s) 2340 may be configured to allow data to be exchanged between computer system 2300 and other devices 2360 attached to a network or networks 2350, such as other computer systems or devices as illustrated in the figures, for example. In various embodiments, network interface(s) 2340 may support communication via any suitable wired or wireless general data networks, such as types of Ethernet network, for example. Additionally, network interface(s) 2340 may support communication via telecommunications/telephony networks such as analog voice networks or digital fiber communications networks, via storage area networks such as Fibre Channel SANs, or via any other suitable type of network and/or protocol.

In some embodiments, system memory 2320 may be one embodiment of a computer-accessible medium configured to store program instructions and data as described above for implementing various embodiments of the techniques for managing and deploying desktop applications and services through an enterprise catalog service described herein. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 2300 via I/O interface 2330. A non-transitory computer-accessible (e.g., computer-readable) storage medium may also include any volatile or non-volatile media such as RAM (e.g. SDRAM, DDR SDRAM, RDRAM, SRAM, etc.), ROM, etc, that may be included in some embodiments of computer system 2300 as system memory 2320 or another type of memory. Further, a computer-accessible medium may include transmission media or signals such as electrical, electromagnetic, or digital signals, conveyed via a communication medium such as a network and/or a wireless link, such as may be implemented via network interface(s) 2340.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing nodes that provide services to a customer of a service provider, each of the computing nodes comprising at least one processor and a memory, wherein one or more of the plurality of computing nodes implement an enterprise catalog service;
a data store that stores a collection of data describing principals, portfolios, and listings, as well as corresponding relationships and constraints within a context of the enterprise catalog service, wherein a principal is a user, role, or root account; and
a graph representation data store, distinct from the data store, that stores a graph representation that comprises an adjacency list in which each of a plurality of vertexes represents a respective principal, respective group of principals, respective portfolio, or respective listing and in which each of a plurality of edges represents a relationship between two vertices; and
wherein the enterprise catalog service is configured to:
receive, on behalf of another component of the enterprise catalog service, a request for information that is directed to the collection of data;
access the adjacency list of the graph representation or a search index to obtain the requested information; and
provide, to the other component of the enterprise catalog service, the requested information.

2. The system of claim 1, wherein the request for information comprises a request for an indication on whether or not a given principal is allowed to access a specified product listing.

3. The system of claim 1, wherein the request for information comprises a request for all constraints that are applicable when launching a specified product listing on behalf of a given principal for one or more paths from the given principal to the specified product listing.

4. The system of claim 1, wherein the request for information comprises a request to query the collection of data for information using search criteria specified in the request.

5. The system of claim 1, wherein:
the data store stores a definitive view of the collection of data;
a communication feed is received from the data store in response to an administrative change made in the definitive view of the collection of data; and
the change comprises:
creation of a new product listing, portfolio, or constraint;
addition or removal of a product listing, principal, or constraint to a portfolio;
addition or removal of permission to access a product by a principal;
application of a constraint to a product listing;
share of a portfolio, product listing, or constraint with another entity; or
import of a portfolio, product listing, or constraint from another entity.

6. The system of claim 1, wherein:
the data store stores a definitive view of the collection of data; and
the enterprise catalog service is further configured to:
receive, from the data store that stores the view of the collection of data, a communication feed indicating an update to the definitive view of the collection of data;
modify, in response to receipt of the communication feed, the graph representation of the collection of data; and
send, to a downstream component of the enterprise catalog service, in response to the modification of the graph representation of the collection of data, a communication feed that indicates that the graph representation of the collection of data has been modified.

7. The system of claim 1, wherein:
the request for information comprises a search request for a list of identifiers for portfolios that meet specified filter criteria;
said access the adjacency list of the graph representation or a search index to obtain the requested information comprises query the search index to identify portfolios that match the specified filter criteria; and
said provide the requested information comprises return a list of identifiers for the identified portfolios.

8. A method, comprising:
performing, by one or more computers that implement a graph processing service of an enterprise catalog service on behalf of a service provider:
maintaining, in a graph representation data store, a graph representation of a collection of data stored in a data store distinct from the graph representation data store, the collection of data describing principals, portfolios, and listings, as well as corresponding relationships and constraints within a context of the enterprise catalog service, wherein a principal is a user, role, or root account, and wherein the graph representation comprises an adjacency list in which each of a plurality of vertexes represents a respective principal, respective group of principals, respective portfolio, or respective listing and in which each of a plurality of edges represents a relationship between two vertices;

receiving, on behalf of another component of the enterprise catalog service, a request for information from the collection of data;

accessing the graph representation of the collection of data to obtain the requested information; and providing, to the another component of the enterprise catalog service, the requested information.

9. The method of claim 8, wherein an edge between a vertex representing a given principal and a vertex representing a given portfolio indicates that the given principal owns or has access to the given portfolio.

10. The method of claim 8, wherein an edge between a vertex representing a given principal and a vertex representing a given listing indicates that the given principal owns or has access to the given listing.

11. The method of claim 8, wherein an edge between a vertex representing a given portfolio and a vertex representing a given listing indicates that the given portfolio contains the given listing.

12. The method of claim 8, wherein:

the request for information comprises a request for a count of the listings included in a specified portfolio;

said accessing the graph representation of the collection of data to obtain the requested information comprises performing a lookup operation on a vertex row in the graph representation that represents the portfolio to count edges in the vertex row, each of which represents a listing contained in the portfolio; and said returning the requested information comprises returning the count.

13. The method of claim 8, wherein:

the request for information comprises a request for a list of portfolios in which a specified listing is contained or a count of the portfolios in which the specified listing is contained;

said accessing the graph representation of the collection of data to obtain the requested information comprises performing a lookup operation on each vertex row in the graph representation for a vertex that represents a portfolio to determine whether it includes an edge between the vertex and a vertex representing the specified listing; and said returning the requested information comprises returning a count of a number of vertex rows in which an edge between the corresponding portfolio and a vertex representing the specified listing was found or a respective identifier of each portfolio for which an edge between a vertex representing the portfolio and a vertex representing the specified listing was found.

14. The method of claim 8, wherein:

the request for information comprises a request for an indication of whether a given principal is authorized to access a specified listing or to obtain constraints to be applied when the specified listing is launched by the given principal;

said accessing the graph representation of the collection of data to obtain the requested information comprises traversing the graph representation to determine whether at least one path exists between a vertex representing the given principal and a vertex representing the specified listing; and said returning the requested information comprises returning an indication of whether at least one path exists between the vertex representing the given principal and the vertex representing the specified listing or constraint information associated with the at least one path.

15. One or more non-transitory computer-readable storage media storing program instructions that when executed on or across one or more processors cause the one or more processors to implement a graph processing service of an enterprise catalog service, the graph processing service configured to:

provide an application programming interface through which one or more other components of the enterprise catalog service submit requests for information that are directed to a graph representation maintained in a graph representation data store, wherein the graph representation comprises a graph representation of a collection of data stored in a data store distinct from the graph representation data store, a collection of data describing principals, portfolios, and software products, and corresponding relationships and constraints within a context of the enterprise catalog service, and wherein a principal is a user, role, or root account;

receive, from a given one of the one or more other components via the interface, a request for information that is directed to the graph representation;

access the graph representation to obtain the requested information; and provide, to the other component of the enterprise catalog service via the application programming interface, the requested information.

16. The one or more non-transitory computer-readable storage media of claim 15, further comprising program instructions that when executed on or across one or more processors cause the one or more processors to implement the graph processing service configured to:

provide an application programming interface for managing software products that: describes a software product, describes a software product version, puts the software product, creates a listing for the software product, or updates a listing for the software product.

17. The one or more non-transitory computer-readable storage media of claim 15, further comprising program instructions that when executed on or across one or more processors cause the one or more processors to implement the graph processing service configured to:

provide an application programming interface for managing one or more of the constraints that: puts a constraint, removes a constraint, or lists one or more constraints.

18. The one or more non-transitory computer-readable storage media of claim 15, further comprising program instructions that when executed on or across one or more processors cause the one or more processors to implement the graph processing service configured to:

provide an application programming interface for searching or browsing listings of software products.

19. The one or more non-transitory computer-readable storage media of claim 15, further comprising program instructions that when executed on or across one or more processors cause the one or more processors to implement the graph processing service configured to:

provide an application programming interface to create a portfolio of software products, import a portfolio of software products, update a portfolio of software products, describe a portfolio of software products, delete a portfolio of software products, or list portfolios of software products.

20. The one or more non-transitory computer-readable storage media of claim 15, wherein:
- the graph representation further comprises one or more de-normalized edges, each representing a relationship between a principal and a listing;
- a given de-normalized edge between a vertex representing a given principal and a vertex representing a given listing indicates whether or not at least one path exists between the given principal and the given listing; and
- to access the graph representation of the collection of data to obtain the requested information, the program instructions, when executed, implement the graph processing service further configured to:
  - search the graph representation to access the given de-normalized edge.

* * * * *